(12) United States Patent
Harrison, Jr.

(10) Patent No.: US 7,704,135 B2
(45) Date of Patent: Apr. 27, 2010

(54) INTEGRATED GAME SYSTEM, METHOD, AND DEVICE

(76) Inventor: Shelton E. Harrison, Jr., 6225 Canterbury Dr. #105, Culver City, CA (US) 90230

(*) Notice: Subject to any disclaimer, the term of this patent is extended or adjusted under 35 U.S.C. 154(b) by 1282 days.

(21) Appl. No.: 11/209,489

(22) Filed: Aug. 23, 2005

(65) Prior Publication Data
US 2006/0040720 A1 Feb. 23, 2006

Related U.S. Application Data

(60) Provisional application No. 60/603,964, filed on Aug. 23, 2004.

(51) Int. Cl.
*A63F 13/00* (2006.01)
(52) U.S. Cl. .................. 463/7; 463/14; 463/2; 463/42; 463/36
(58) Field of Classification Search .............. 463/7
See application file for complete search history.

(56) References Cited

U.S. PATENT DOCUMENTS

| | | | |
|---|---|---|---|
| 4,027,535 A | 6/1977 | Swanson | |
| 4,980,519 A | 12/1990 | Mathews | |
| 5,071,136 A | 12/1991 | Lott | |
| 5,279,513 A | 1/1994 | Connelly | |
| 5,356,343 A | 10/1994 | Lovetere | |
| 5,541,358 A | 7/1996 | Wheaton et al. | |
| 5,558,327 A | 9/1996 | Hansen et al. | |
| 5,647,593 A | 7/1997 | Kamat et al. | |
| 5,662,332 A | 9/1997 | Garfield | |
| 5,740,321 A | 4/1998 | Huffman et al. | |
| 5,791,648 A | 8/1998 | Hohl | |
| 5,847,854 A | 12/1998 | Benson, Jr. | |
| 5,855,483 A | 1/1999 | Collins et al. | |
| 5,860,651 A | 1/1999 | Fierro | |
| 5,875,257 A | 2/1999 | Marrin et al. | |
| 6,000,698 A | 12/1999 | Woodward | |
| 6,077,164 A | 6/2000 | Liu | |
| 6,184,804 B1 | 2/2001 | Harrison | |
| 6,203,016 B1 | 3/2001 | Frommer | |
| 6,347,290 B1 | 2/2002 | Bartlett | |
| 6,388,183 B1 | 5/2002 | Leh | |

(Continued)

OTHER PUBLICATIONS

Unknown Author,"Scansoft Speech Recognition Incorporated in Playstation 2 Game Operator's Side Developed by Sony Computer Entertainment," ScanSoft (Scansoft.com), Mar. 12, 2003, Peabody, Mass and Tokyo.

(Continued)

*Primary Examiner*—Jeffrey K. Wong

(57) ABSTRACT

The present invention provides an integrated game with five subsystems: (i) electronic spell-casting system, (ii) card game system, (iii) user-created card system, (iv) system for replacing the use of dice and/or random number generation; and (v) board game system. Spell-casting system provides a physical input mechanism, e.g., sensor-equipped "magic wand", and a verbal input mechanism which together trigger a spell. Cards form formations affecting their powers and are marked as "spent" by being placed under another card. Users create their own cards through a Web-accessible site. Random number (generated by computer or dice) usage is replaced by "challenges," i.e., player-performed tasks. Chess pieces follow standard rules but are deployed one-by-one, as are squares of the chess board. Licensing information is available through www.inventerprise.com.

20 Claims, 56 Drawing Sheets

U.S. PATENT DOCUMENTS

| | | |
|---|---|---|
| 6,419,584 B1 | 7/2002 | Sakamoto et al. |
| 6,435,508 B1 | 8/2002 | Tavel |
| 6,471,420 B1 | 10/2002 | Maekawa et al. |
| 6,474,650 B1 | 11/2002 | Looney |
| 6,533,275 B2 | 3/2003 | Zaruba et al. |
| 6,554,702 B2 | 4/2003 | Mahar et al. |
| 6,561,513 B1 | 5/2003 | DeGeorge |
| 6,601,851 B1 | 8/2003 | Sakamoto et al. |
| 6,623,010 B1 | 9/2003 | Holland, Jr. |
| 6,696,986 B1 | 2/2004 | Harrison, Jr. et al. |
| 6,709,336 B2 | 3/2004 | Siegel et al. |
| 6,761,637 B2 | 7/2004 | Weston et al. |
| 2001/0034257 A1 | 10/2001 | Weston et al. |
| 2001/0039206 A1 | 11/2001 | Peppel |
| 2001/0039524 A1 | 11/2001 | Harrison et al. |
| 2002/0077534 A1 | 6/2002 | DuRousseau |
| 2002/0147039 A1 | 10/2002 | Mahar et al. |
| 2002/0155893 A1 | 10/2002 | Swanberg et al. |
| 2002/0169617 A1 | 11/2002 | Luisi |
| 2002/0193047 A1 | 12/2002 | Weston |
| 2003/0013508 A1 | 1/2003 | Sato |
| 2003/0094759 A1 | 5/2003 | Niedner et al. |
| 2003/0196542 A1 | 10/2003 | Harrison |
| 2003/0220885 A1 | 11/2003 | Lucarelli et al. |
| 2004/0051243 A1 | 3/2004 | Long, Jr. |
| 2004/0103055 A1 | 5/2004 | Butler |
| 2004/0166937 A1 | 8/2004 | Rothschild et al. |
| 2004/0172280 A1 | 9/2004 | Fraki et al. |
| 2004/0176170 A1 | 9/2004 | Eck et al. |
| 2004/0204240 A1 | 10/2004 | Barney |
| 2004/0207597 A1 | 10/2004 | Marks |
| 2005/0056700 A1 | 3/2005 | McKinley et al. |
| 2005/0073098 A1 | 4/2005 | Weisman |

OTHER PUBLICATIONS

Unknown Author, "The idea for a game is not protected by copyright . . . ", Library of Congress (copyright.gov), unknown date, Washington D.C.

Unknown Author, "Frequenty Asked Support Questions," Mindmaker, Inc. (gamecommander.com), unknown date, unknown city.

ASDEN@IHUG.CO.NZ, "Using Speech Recognition with Levelgames" Arcess.com, Unknown date, unknown city.

Soriano, César G, "Stamps of Individuality push the envelope," USA Today (usatoday.com), Aug. 10, 2004, unknown city.

Unknown Author, "Game Commander News," Mindmaker, Inc. (gamecommander.com), unknown date, unknown city.

Unknown Author, "Manufacturing or Marketing your own Game," Item unknown, Jul. 22, 2004 , unknown city.

Arneson, Erik; "Simon's 25$^{th}$ Anniversary," About.com (boardgames.about.com), unknown date, unknown city.

Beach, James L.R.; "A Look at Linear vs. Linear Dice Systems," unknown item, Apr. 2001, Waterville ,MN.

Smalley, Eric; "Quantum Dice Debut," Technology Research News, Jan. 14-21, 2004 , unknown city.

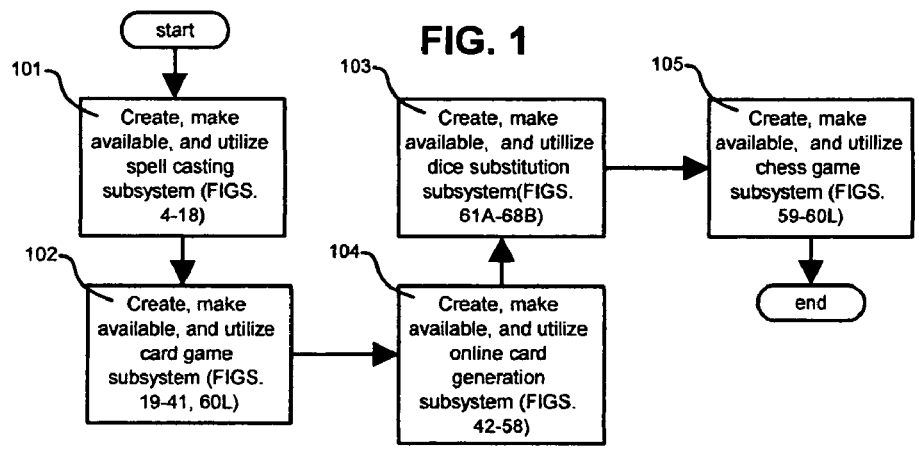
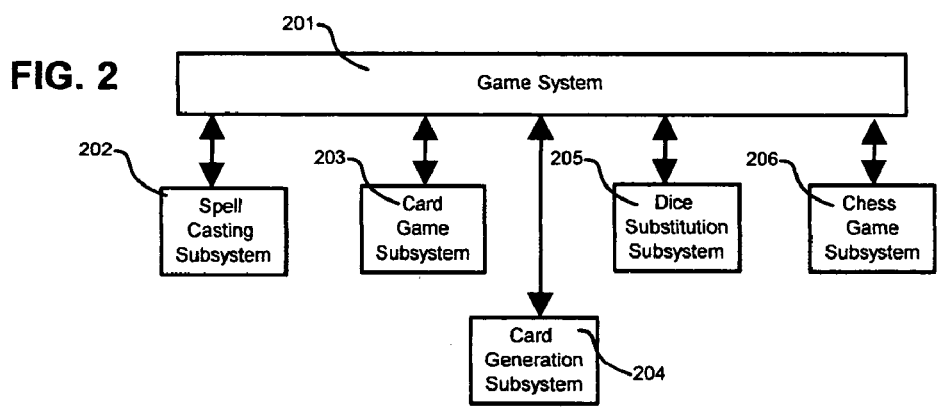
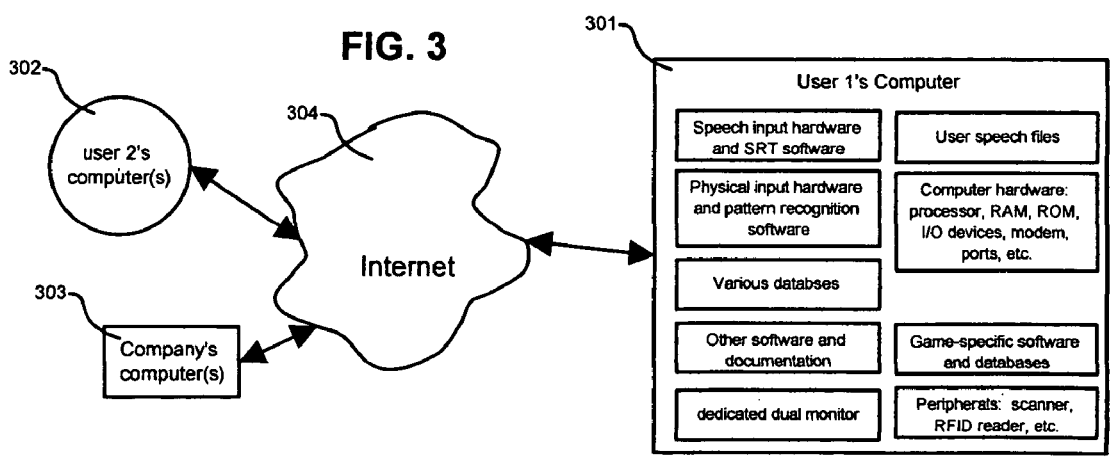

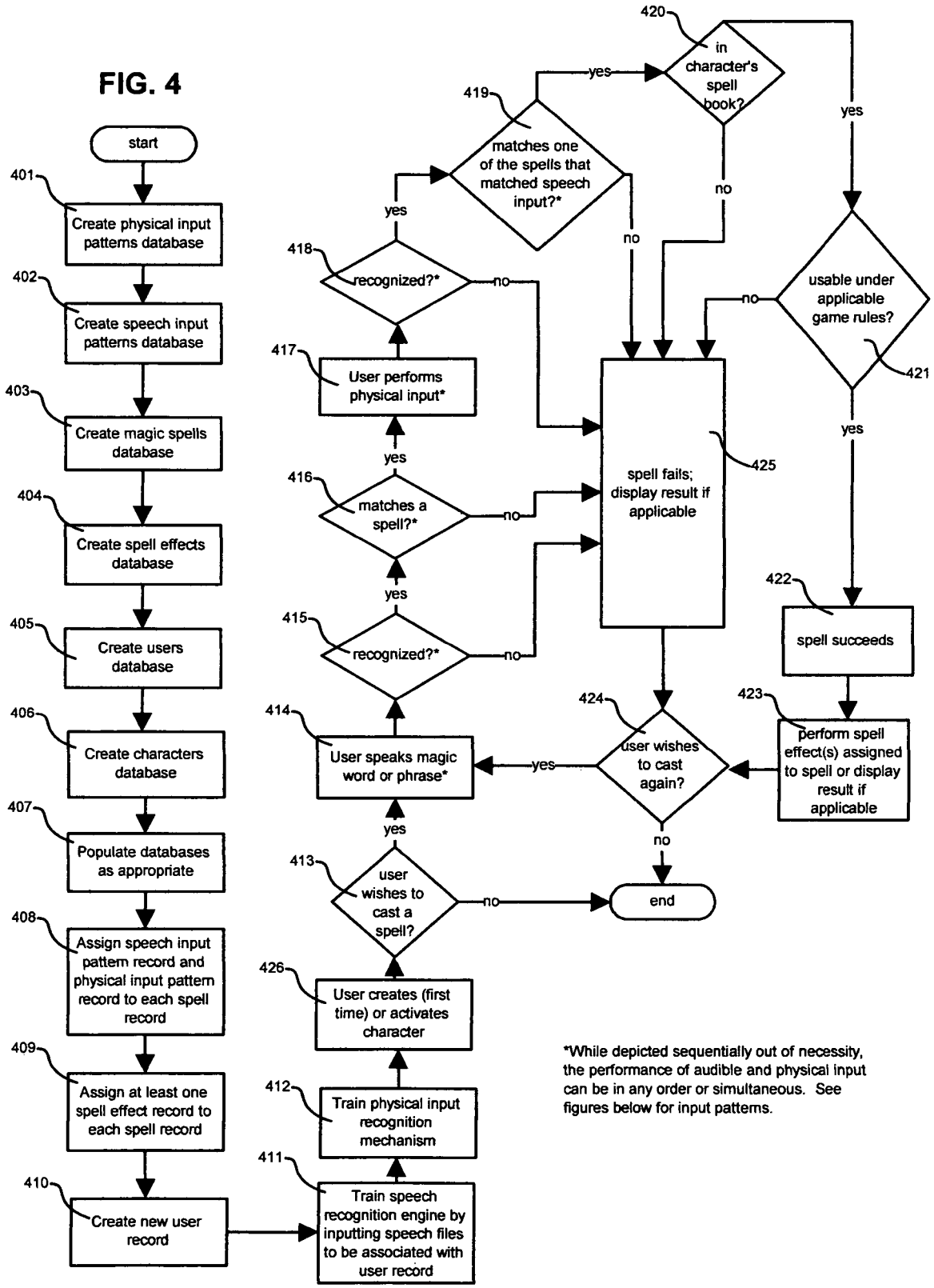

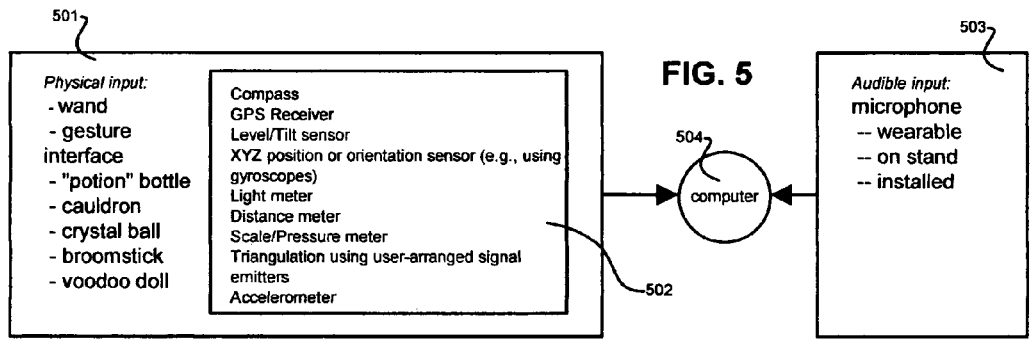
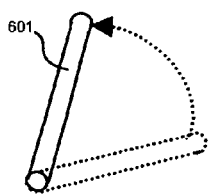 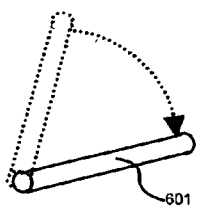 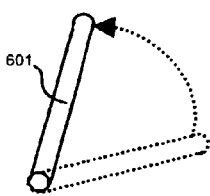
FIG. 6A — Time 1: point up
FIG. 6B — Time 2: point level
FIG. 6C — Time 3: point up
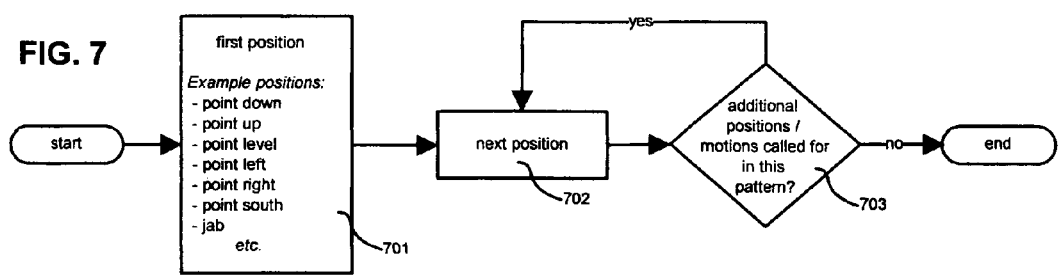

FIG. 18
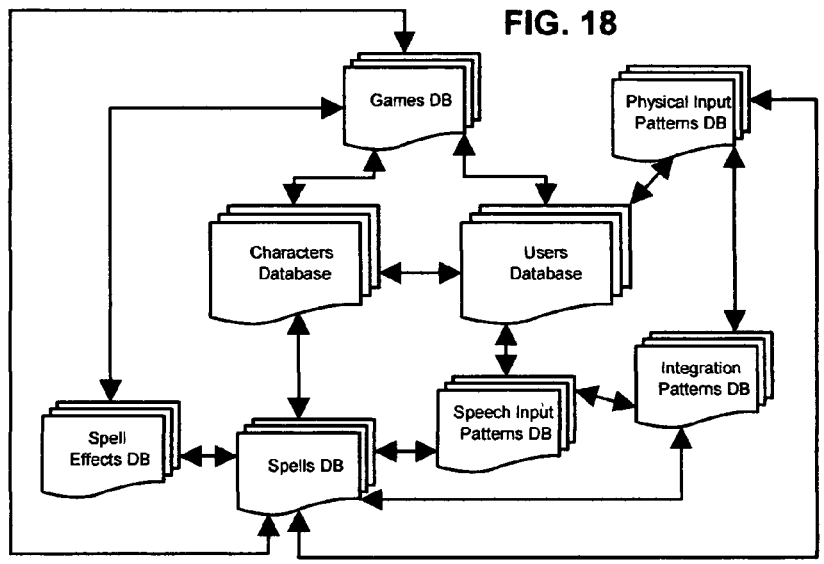
FIG. 19
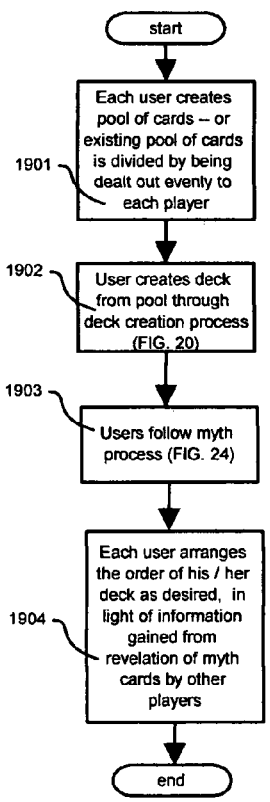
FIG. 20
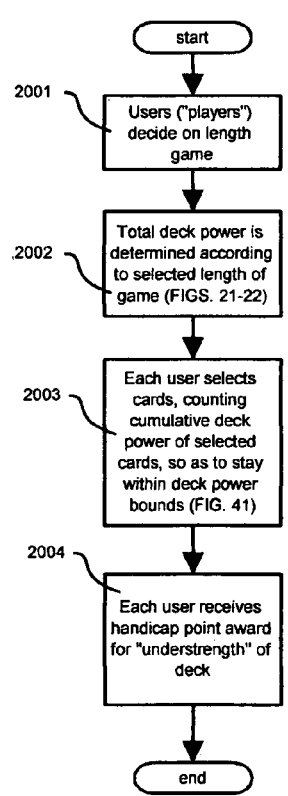
FIG. 21
| Preferred length | Total deck power points |
|---|---|
| 15 minutes | 20 |
| 30 minutes | 30 |
| 1 hour or more | 45 |
FIG. 22
| Type of card | Power points |
|---|---|
| Dragons & Grand Wizard: | 3 |
| Knights, Hippogriffs, and Wizards: | 2 |
| All others, including standing cards: | 1 |
FIG. 23
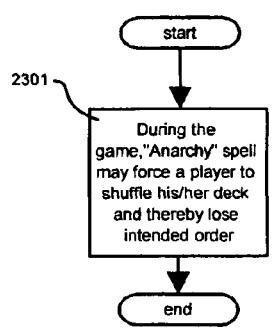

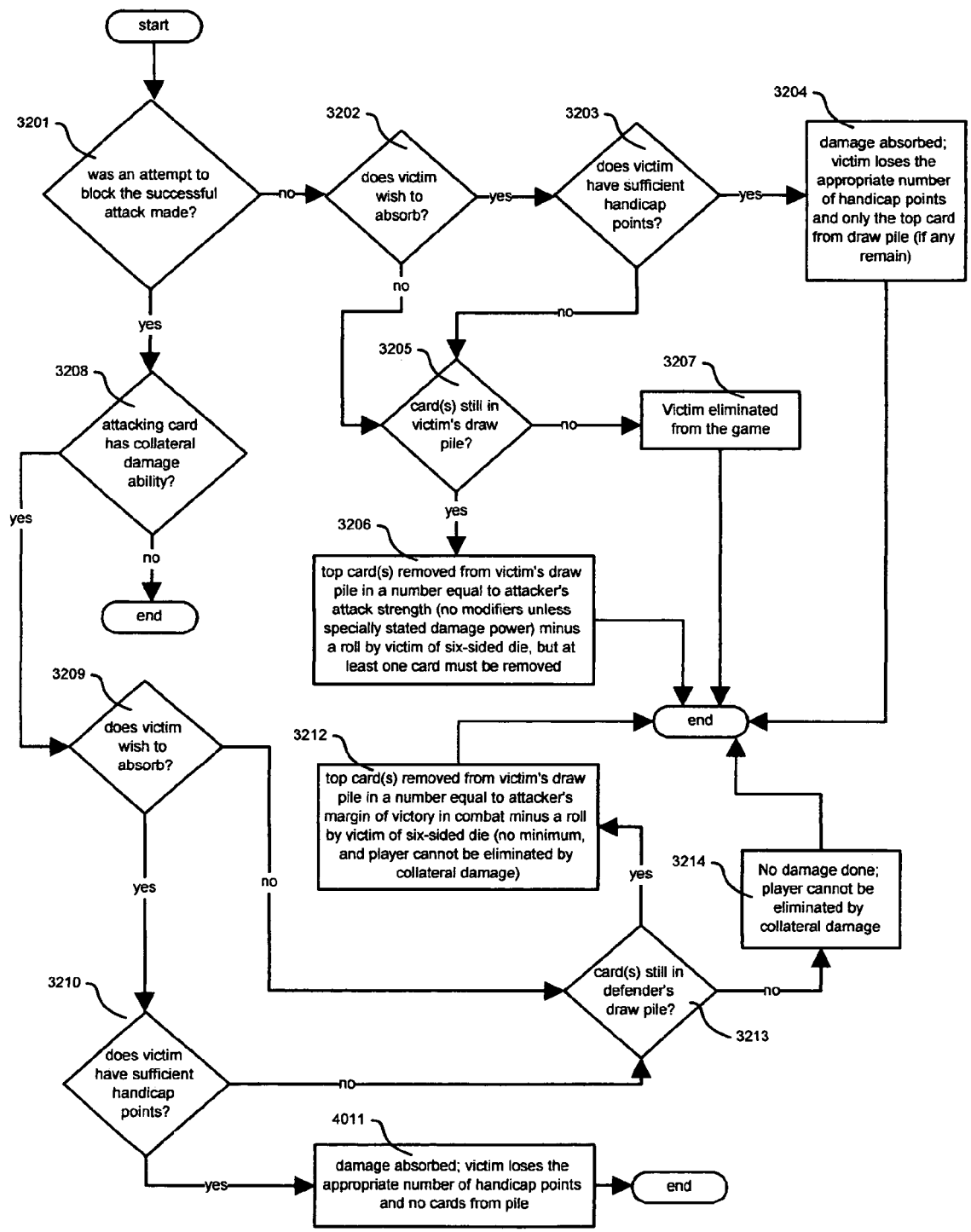

*Compound formation effects:*
X = receives no bonuses
Y = in focus of flanking formation with X and Z
Z = in focus of defensive formation with Y and P
P = in focus of flanking formation with Z and R; also in twin formation with Q
Q = in twin formation with P; also in front/back formation with R
R = in front/back formation with Q

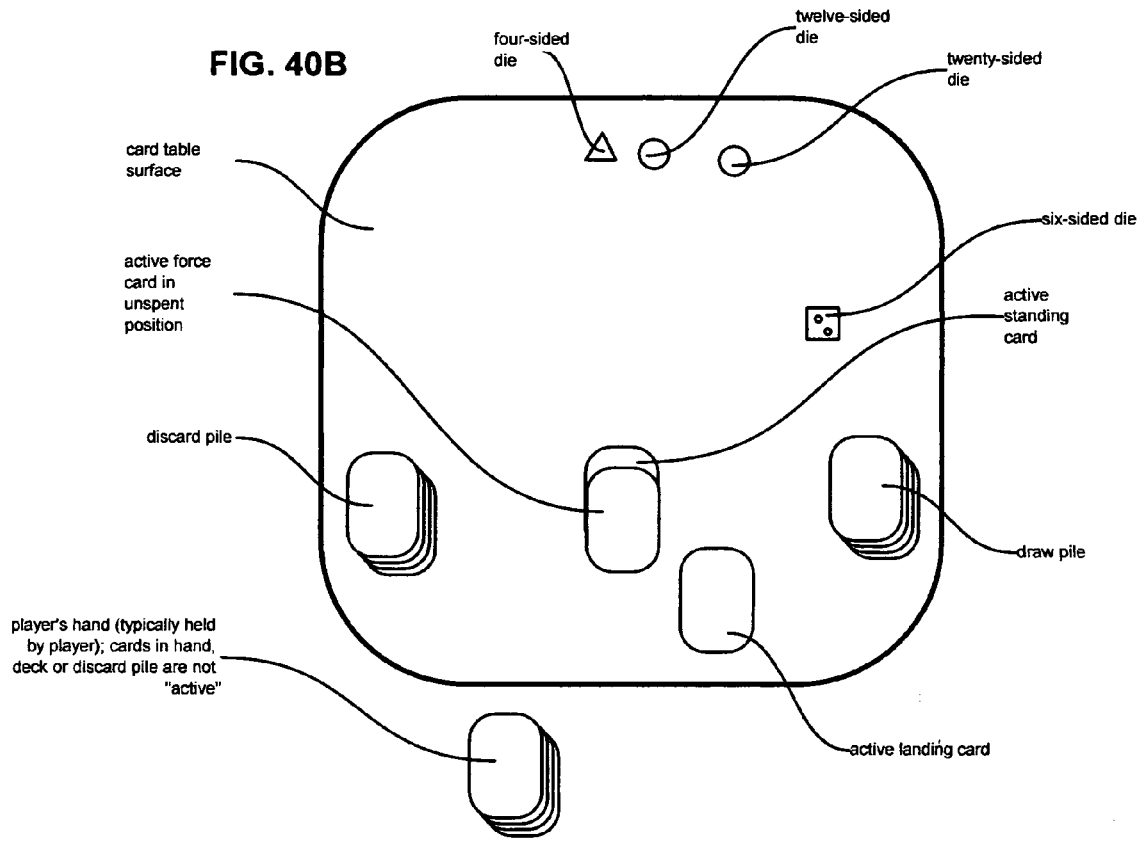

*Example Cases for Gaining Handicap Points*

1. Destroying one of the opponent's myth cards earns handicap points
2. Certain cards can produce handicap points for each turn they are in the game
3. Handicap points gained for perfect bidding
etc.

*Example Cases for Spending Handicap Points*

1. Some cards require spending of one or more handicap points in order to be deployed (as well as presence of a landing card)
2. Attacks that would result in removal of cards from deck (i.e., unblocked attacks or attacks with collateral damage) can be "absorbed" by handicap points instead of deck, at choice of defender
3. Certain cards can perform special functions with the spending of one or more points
etc.

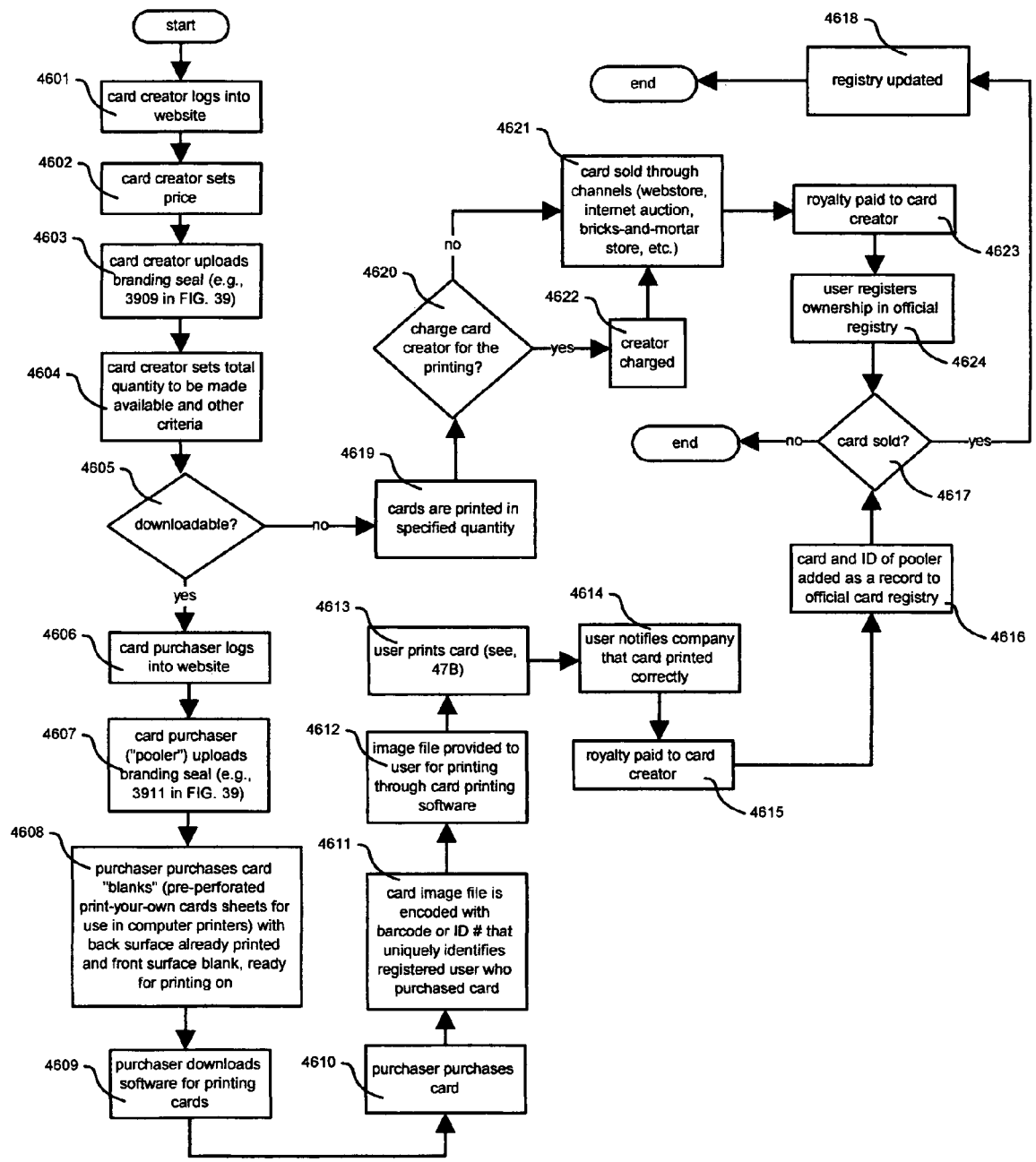

*remainging tiles and pieces not pictured

FIG. 60C
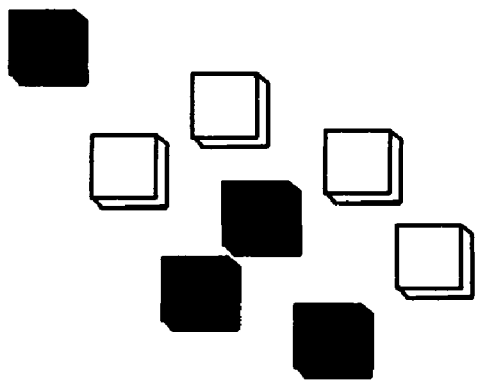
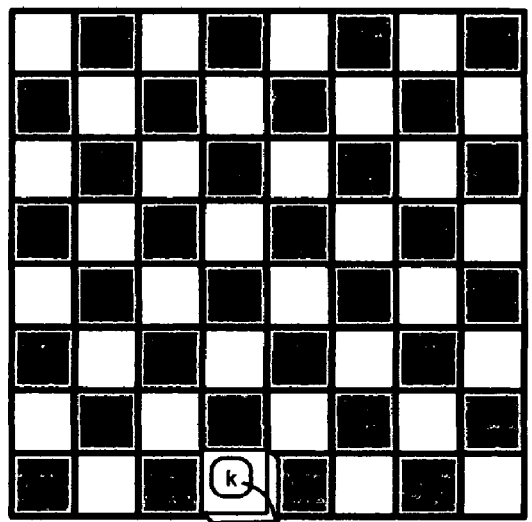
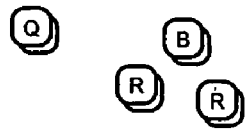
FIG. 60D
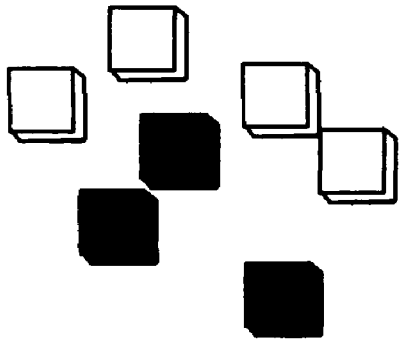
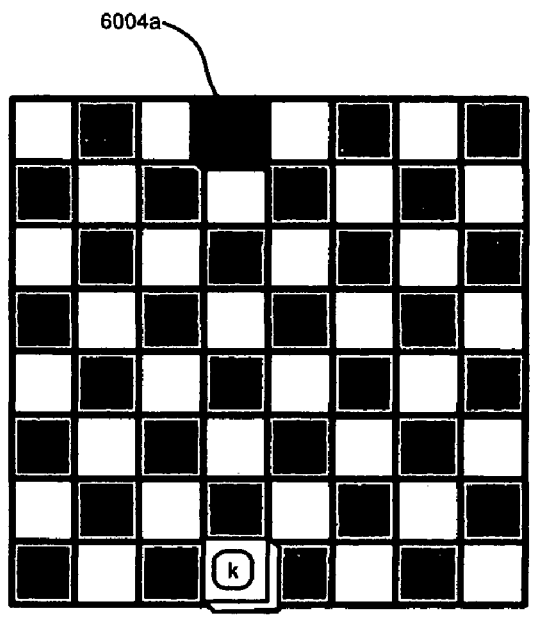
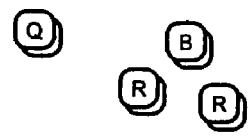

FIG. 63A

Example Challenge-Generating Event in Computer Game Embodiment
--- using as example game "Sid Meier's Civilization"

| | |
|---|---|
| 1. Event giving rise to binary challenge<br>Attack of one combat unit, e.g., cavalry, on another, e.g., rifleman | Result of challenge<br>One unit survives, other unit is destroyed (damage taken by surviving unit is determined separately by computer-generated random number) |
| 2. Event giving rise to graded challenge<br>Creation of a Wonder, e.g., the Pyramids | Result of challenge<br>If performance grade exceeds the computer-generated random number performance grades of artificial intelligence opponents (or, if applicable, the actual performance grades of live human opponents), player succeeds at building the Wonder; otherwise, the player fails and the highest-scoring opponent succeeds in building the Wonder |

FIG. 63B

Example Challenge-Generating Event in Live Human Role-Playing Game Embodiment
--- using as example game "Dungeons & Dragons"

| | |
|---|---|
| 1. Event giving rise to binary challenge<br>Saving throw, e.g., against poison | Result of challenge<br>If successful, the player character makes his or her saving throw; otherwise, the player character fails the saving throw and the associated result is incurred |
| 2. Event giving rise to graded challenge<br>Roll for ability score, e.g., charisma | Result of challenge<br>The higher the player's performance on the task, the higher the ability of player character, i.e., maximum performance yields an ability score of 18, mediocre a 10, horrible a 3, and so on |

FIG. 64A

Example Tasks for Producing a Binary and/or Graded Result
--- using pre-existing games

| | |
|---|---|
| 1. "Trivial Pursuit" Fact Recall Game | For Binary Result<br>Player must correcty answer a question that has been graded at a difficulty level commensurate with success probability of challenge-producing event<br><br>For Graded Result<br>Player is given a series of questions in a predetermined period of time; the higher the number of correct answers, the higher the grade |
| 2. "Simon" Tonal/Visual Memory Game | For Binary Result<br>Player must correctly reproduce a series of tone-color buttons that is of a difficulty level commensurate with the success probability level of challenge-producing event<br><br>For Graded Result<br>Player plays one round of Simon; the longer the last successful sequence (i.e., before the player fails to reproduce the sequence correctly), the higher the grade |

FIG. 64B

Example Tasks for Producing a Binary and/or Graded Result
--- using skills that are being developed for education purposes

| | |
|---|---|
| 1. Law School Admissions Test (LSAT) | For Binary Result<br>Player must correcty answer a logical reasoning question that has been graded at a difficulty level commensurate with success probability of challenge-producing event within a specified period of time<br>For Graded Result<br>Player must do an entire game (usually 5 to 8 questions) within a specified period of time; the more correct answers, the higher the grade |
| 2. Graduate Record Exam (GRE) | For Binary Result<br>Player must correcty answer an analogy question that has been graded at a difficulty level commensurate with success probability of challenge-producing event within a specified period of time<br>For Graded Result<br>Player must do an entire reading comprehension passage (usually 5 to 8 questions) within a specified period of time; the more correct answers, the higher the grade |

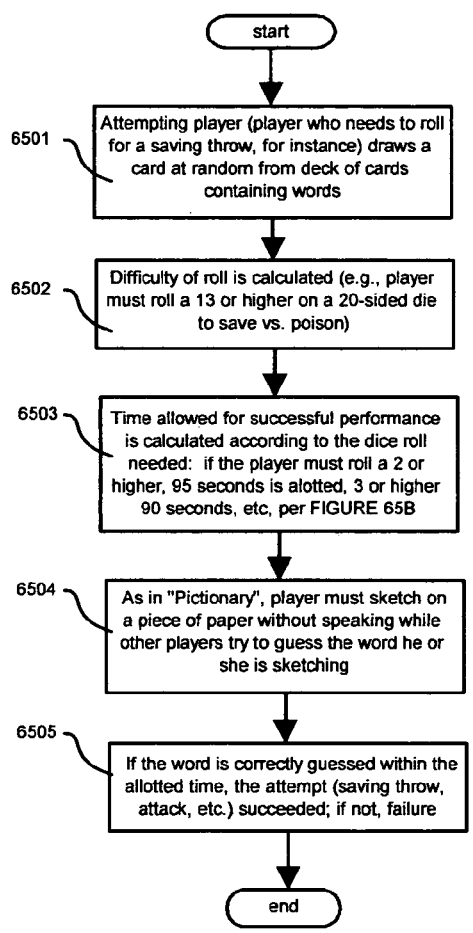

FIG. 65A

- start
- 6501: Attempting player (player who needs to roll for a saving throw, for instance) draws a card at random from deck of cards containing words
- 6502: Difficulty of roll is calculated (e.g., player must roll a 13 or higher on a 20-sided die to save vs. poison)
- 6503: Time allowed for successful performance is calculated according to the dice roll needed: if the player must roll a 2 or higher, 95 seconds is alotted, 3 or higher 90 seconds, etc, per FIGURE 65B
- 6504: As in "Pictionary", player must sketch on a piece of paper without speaking while other players try to guess the word he or she is sketching
- 6505: If the word is correctly guessed within the allotted time, the attempt (saving throw, attack, etc.) succeeded; if not, failure
- end

FIG. 65B

| Player Must Roll at least: | Seconds Allowed: |
|---|---|
| 2 | 95 |
| 3 | 90 |
| 4 | 85 |
| 5 | 80 |
| 6 | 75 |
| 7 | 70 |
| 8 | 65 |
| 9 | 60 |
| 10 | 55 |
| 11 | 50 |
| 12 | 45 |
| 13 | 40 |
| 14 | 35 |
| 15 | 30 |
| 16 | 25 |
| 17 | 20 |
| 18 | 15 |
| 19 | 10 |
| 20 | 5 |

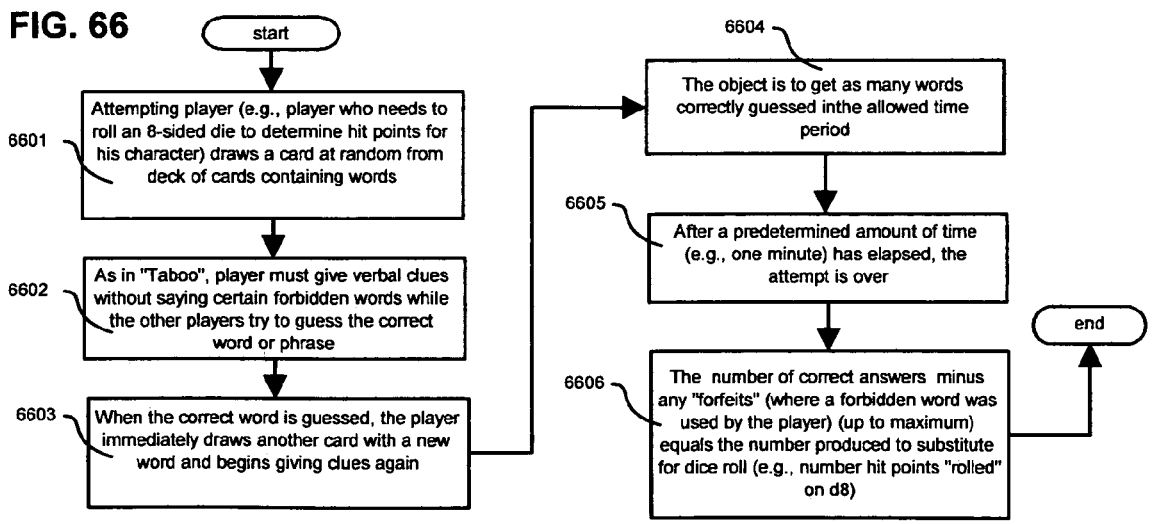

FIG. 66

- start
- 6601: Attempting player (e.g., player who needs to roll an 8-sided die to determine hit points for his character) draws a card at random from deck of cards containing words
- 6602: As in "Taboo", player must give verbal clues without saying certain forbidden words while the other players try to guess the correct word or phrase
- 6603: When the correct word is guessed, the player immediately draws another card with a new word and begins giving clues again
- 6604: The object is to get as many words correctly guessed in the allowed time period
- 6605: After a predetermined amount of time (e.g., one minute) has elapsed, the attempt is over
- 6606: The number of correct answers minus any "forfeits" (where a forbidden word was used by the player) (up to maximum) equals the number produced to substitute for dice roll (e.g., number hit points "rolled" on d8)
- end

INTEGRATED GAME SYSTEM, METHOD, AND DEVICE

CROSS REFERENCE TO RELATED APPLICATIONS

Priority filing of U.S. provisional patent application 60/603,964, filing date Aug. 23, 2004, entitled "Integrated Gaming Technology System, Method and Device", is claimed. Said provisional patent application is hereby incorporated by reference in its entirety into the present disclosure.

A portion of the disclosure of this patent document contains material which is subject to copyright protection. The copyright owner has no objection to the facsimile reproduction by anyone of the patent documents or patent disclosure, as it appears in the patent and trademark office patent file or records, but otherwise reserves all rights whatsoever.

The inventor wishes to thank Paul Dowell, Jody Frease, Steve Werth, Golnar Zahedin, and Irina Lymar.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING APPENDIX

Not applicable.

BACKGROUND OF THE INVENTION

1. Field of the Invention

The present invention relates to human-implemented and computer-implemented game processes and games.

2. Description of Related Art

Laser tag systems, which include a gun, vest, and a central scoring computer, are known. Speech recognition (SRT) software and interfaces are known. Hand gesture computer interfaces are known. Fantasy games, such as Dungeons and Dragons, and fantasy books, such as Harry Potter, both of which involve the casting of spells, are known.

In fantasy games, literature, and folklore, spells are typically cast by usage of a verbal component and a physical component, the former being a magic word or phrase, and the latter being a series of hand motions, a wand, or a potion.

Role-playing games typically involve the use of dice at crucial junctures during the game, such as melee in Dungeons and Dragons. A typical dice roll situation in "d20" games such as Dungeons and Dragons involves the calculation of a threshold which the given player's roll must exceed or meet (saving throw, etc.) and then the rolling of a 20-sided die to see whether the player succeeds at meeting the threshold. The player can use his knowledge of the game to affect that threshold, by selecting certain weapons that have a greater likelihood of hitting an opponent, for instance; but a player cannot affect the dice roll itself. His fate is ultimately left the chance.

UV/IR barcodes are known, as are digital watermarking techniques for use in antipiracy.

Computer network games ("World of Warcraft", "EverQuest") have become increasingly popular. These games are conducted as single-user games except that some of the characters or creatures that a given player encounters in the virtual world of the computer game are controlled by other human beings.

SRT programs such as Dragon NaturallySpeaking include a function ("wake-up" and "go to sleep") whereby a user can tell the software to ignore accidental audio input.

The videogame can be a first person "shoot'em up" type game, such as "Doom," or a third person fighting game, such as "Soul Caliber," or another type of videogame. Videogames are typically controlled through use of a videogame controller, such as a joystick, mouse, handheld game dedicated controller, or keyboard.

BRIEF SUMMARY OF THE INVENTION

The present invention provides an integrated gaming system, method, and device composed of five major subsystems: (I) an electronic spell-casting system, (II) a card game system, (III) a user-created card system, (IV) a system for replacing the use of random numbers in the context of a game; and (V) a board game system.

The spell-casting system provides a physical input mechanism, such as a wand equipped with motion and/or position sensors, and a verbal input mechanism, such as a microphone for use with speech recognition technology (SRT). In order to trigger a spell, a user inputs a physical input pattern and a verbal input pattern; if and only if the user input is recognized by the computer as the predetermined combination of patterns assigned to a spell, the spell is triggered, i.e., successfully cast.

The collectible card game provides several novel game mechanics, such as card deployment and card formation methods, that are used in a combat game in which players attempt to eliminate other players through successful attack and defense.

The user-created card system provides a Web-accessible server that a user can access so as to create his or her own card, download and print this card, and make it available to the public for use in the above card game.

The system for replacing or supplementing the use of dice or computer-generated random numbers in a game provides a mechanism through which a user can undertake a task instead of relying upon chance. The results of the task—success or failure (binary), or a degree of success or failure (graded)—are treated just as if these results were attained through the use of a dice roll or a computer-generated random number.

The board game provides a standard chess game with standard chess pieces subject to standard chess rules, with two major exceptions: (i) the chess board is "played" one square (a "tile") at a time by the players, and (ii) all chess pieces must be deployed into the game one by one. Once a chess piece, e.g., a queen, is in the game, it behaves just as it does in a regular game of chess, but it can only access or move across squares that are also already in the game.

BRIEF DESCRIPTION OF THE SEVERAL VIEWS OF THE DRAWINGS

FIG. 1 is a high-level overview of the present invention construed as a method.

FIG. 2 is high-level overview of the present invention construed as a system.

FIG. 3 is a high-level overview of the present invention construed as an apparatus.

FIG. 4 is a flowchart depicting a process whereby a spell is cast according to the present invention.

FIG. 5 is a schematic diagram of the means whereby physical input and verbal input is input to a computer according to the present invention.

FIGS. 6A through 6C depict a magic wand position at three different times.

FIG. 7 is a flowchart depicting a physical input pattern for use with a wand-based function of the present invention.

FIG. 18 is a chart depicting primary relationships between a series of databases according to the present invention.

FIG. 19 is a flowchart depicting a process whereby a user prepares a deck for a game according to the present invention.

FIG. 20 is a flowchart depicting a process whereby a user creates a deck for a game according to the present invention.

FIG. 21 is a chart depicting relationships between various preferred lengths of game and total deck power points according to the present invention.

FIG. 22 is a chart depicting relationships between types of cards and power points according to the present invention.

FIG. 23 is a flowchart depicting a method whereby a spell is cast so as to affect a player's arrangement of a deck of cards according to the present invention.

FIG. 32 is a flowchart depicting a method whereby direct damage results are determined in a game according to the present invention.

FIGS. 34 through 37A depict cards in different formations according to the present invention.

FIG. 40B is an anterior view of a tabletop upon which are situated various game materials used in a game according to the present invention.

FIG. 40C is a chart depicting example events for gaining and losing handicap points in a game according to the present invention.

FIG. 46 is a flowchart depicting a method whereby a user-created card is made available to the public according to the present invention.

FIGS. 60A through 60E depict a board and other game materials in use according to the present invention.

FIG. 63A is a chart depicting example events giving rise to random number replacement challenges according to the present invention within the context of an example pre-existing computer game.

FIG. 63B is a chart depicting example events giving rise to dice replacement challenges according to the present invention within the context of an example pre-existing role-playing game.

FIG. 64A is a chart depicting example tasks to be performed for producing a binary or a graded result according to the present invention using pre-existing games.

FIG. 64B is a chart depicting example tasks to be performed for producing a binary or a graded result using academic, educational, or standardized testing subject matter according to the present invention.

FIG. 65A is a flowchart depicting a method whereby a player together with other players in a role-playing game context participates in a challenge for determination of a binary result in a dice replacement function of the present invention.

FIG. 65B is a chart of relationships between dice values and time values for use in a method according to the present invention.

FIG. 66 is a flowchart depicting a method whereby a player together with other players in a role-playing game context participates in a challenge for determination of a graded result in a dice replacement function of the present invention.

DETAILED DESCRIPTION OF THE INVENTION

The present invention provides an integrated gaming system that includes five major subsystems that can be used together or separately. These systems are:
 electronic spell-casting system
 physical or electronic card game system
 dice and random number replacement system
 electronic collectible card and card game creation system
 physical or electronic chess game system Integration of the subsystems allows substantial synergistic effects, as in the case of spells that can only be cast after a physical collectible card has been inserted into a scanner, magnetic strip reader, RFID tag reader, etc., to verify the presence of the card.

Figure 71:
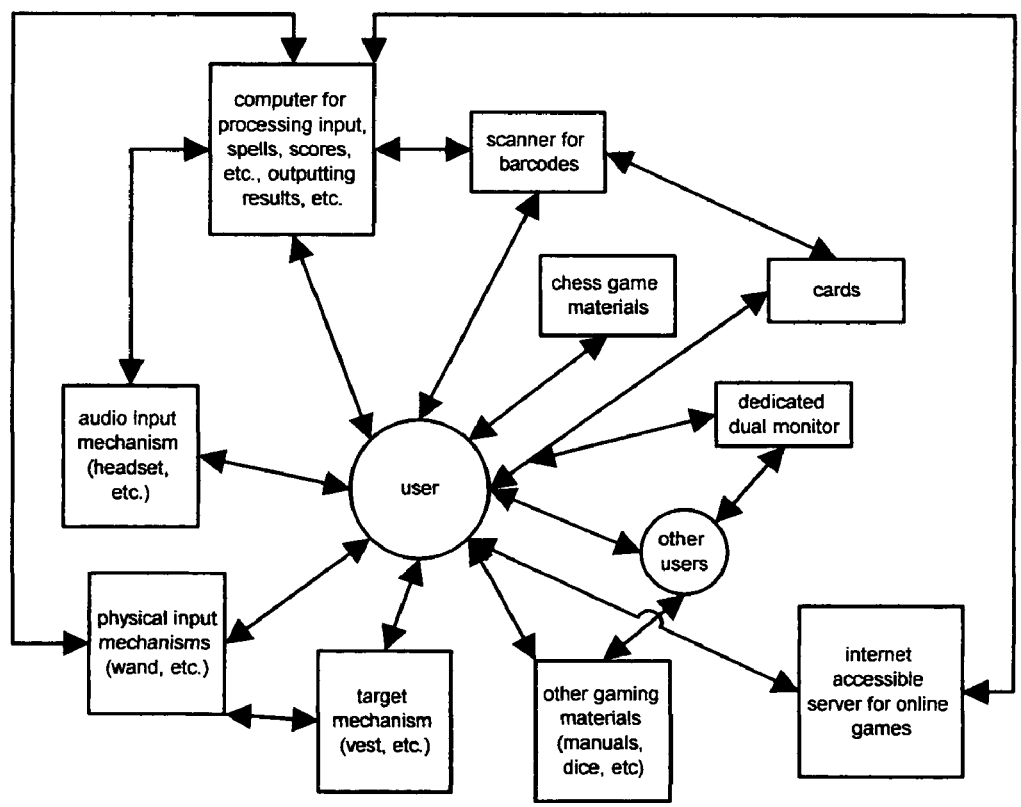
FIG. 71 is an interactivity diagram depicting interactive relationships between elements of the current invention.

FIG. 1 depicts the present invention construed as a method, in which the steps of each submethod disclosed herein are executed. FIG. 2 depicts the present invention construed as a system, in which each system or part interacts with the whole. FIG. 3 depicts the present invention construed as an apparatus, in which a user's computer contains sets of computer instructions, such as speech recognition software and game software, and appropriate hardware for proper execution and support of the processes disclosed herein. Interactive relationships between components of the present invention when construed as an apparatus are depicted with more specificity in FIG. 71.

Turning now to the details of each system:

I. Electronic Magic Spell-Casting System

A disclosed electronic magic spell-casting system for use in a game provides disclosed hardware and software suitable for execution of steps of a disclosed method in which a user provides disclosed physical and audible input to a data processing system so as to produce a disclosed result in the game.

The user inputs information to the data processing system through the use of two primary mechanisms: (i) a "prop", for physical input, and (ii) a microphone, for audible, i.e., verbal input. The prop can be in the form of a magic wand, hand gesture interface, magic potion bottle, crystal ball, spoon, voodoo doll, or other magic item. The prop includes a position-sensing mechanism, such as a compass, gyroscope, tilt sensor, GPS receiver, or other position-sensing mechanism. The microphone can be worn on the head of the user, lapel, or other body part or can be supported by a microphone stand or can be an area microphone built into data processing equipment, e.g., a computer, itself.

Physical and audible input is received by the computer and compared against patterns in a pattern database. If the user inputs a sequence of physical and audible input that is recognized as matching a pattern, a spell may be triggered under certain game conditions. Effects of the spell are implemented according to the rules of the game and displayed to the user as appropriate.

FIG. 4 depicts the basic steps for creation, deployment, and usage of a wand-based function of the present invention. A database of integration patterns is established 400. A database of wand input patterns is established 401. A database of speech input patterns is established 402. A database of magic spells is established 403. A database of magic spell effects is established 404. A database of users/players is established 405. A database of characters is established 406.

The databases are populated with information such as spell names 407. Each record in the magic spell database is assigned, through relational database "key" relationship, an integration pattern, which is a pattern for integration of an assigned speech input pattern and an assigned physical input pattern 408. Recognition of these patterns is the mechanism through which spells are triggered. Each record in the magic spell database is also related to one or more records in the magic spell effects database 409.

When a person is ready to play the game, he or she creates 410 a record in the users/players database and trains 411 the speech recognition engine by reading a number of prescribed words or sentences so as to establish speech files uniquely associated with his or her given player record. He or she also trains 412 the wand input recognition engine by performing a number of movements.

The user than creates or activates a character 426 and begins playing a game with which the present invention is to be used. If the user wishes to cast a spell 413, he or she inputs physical and verbal input. Different integration patterns require different sequences of input: some patterns call for verbal input to precede physical input; some patterns call for physical input to precede verbal; some call for overlap.

Figure 12:
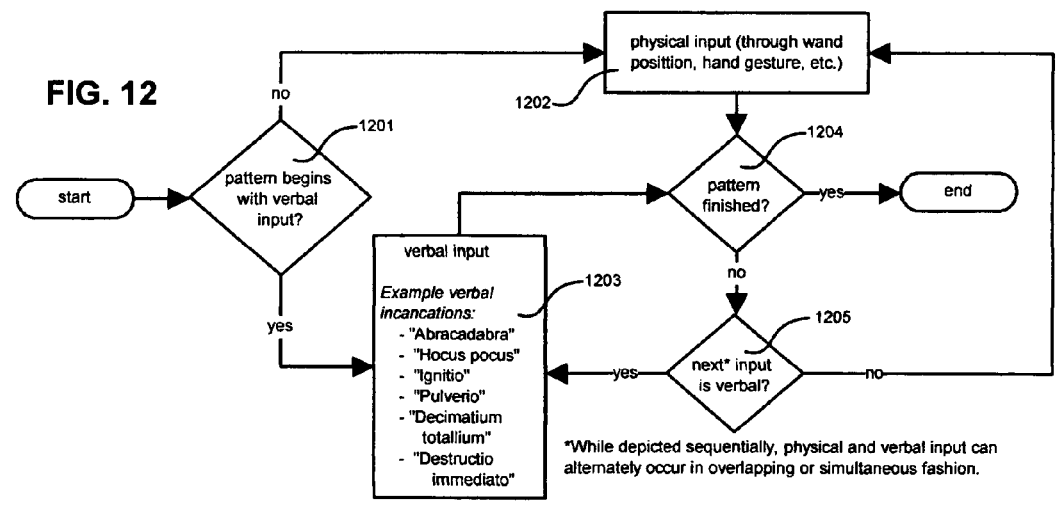
FIG. 12 is a flowchart depicting a process whereby a physical input and a verbal input are integrated into an integration pattern according to the present invention.

In FIG. 4, a user speaks 414 a "magic" word or phrase, such as the examples 1203 in FIG. 12. If this word or phrase is recognized by the speech recognition engine 415, the speech input is compared to speech input patterns in the speech input patterns database 416 to find any matching spells. The user then performs physical input 417 by moving the wand in a pattern such as the example depicted in FIGS. 6A, 6B, and 6C. If the physical input is recognized 418, the physical input pattern is compared to those of the set of spells that matched the speech input pattern 419 to find the identified spell. Only one spell will be identified by a particular combination of speech and physical input.

If both the physical and speech input have matched a spell, the spell identified is compared 420 against the character's spell book to verify that the given character can cast the identified spell under game rules. If so, any applicable game rules are applied 421 to verify that the spell can be cast under the current game conditions. If so, the spell succeeds 422, and one or more spell effects associated with the spell that has been cast are applied 423 in the game and displayed, if displaying such effects is part of the game. If the user wishes to cast another spell 424, he or she begins the spell-casting process again. If any step is failed, the spell fails 425.

Note that, by design, it is possible for a user to cast a spell that is not the spell that he or she intended to cast; failed or unintended spell-casting is part of the fun and the challenge, since the risk of failure forces players to improve their pronunciation of magic words and cadence of verbal phrasing and to master physical gestures, spacing and timing of motions.

Note also that, as depicted in the example patterns for integrating speech input patterns with physical input patterns, the steps of providing audible input and providing physical input can be performed in any order.

The motion-sensing or position-sensing physical input apparatus 501 can be a wand or any other "magical" item, such as those depicted in FIG. 5. This apparatus 501 includes one or more motion or position sensors 502, such as a tilt sensor. Data is input to the computer 504 via such an apparatus 501 so as to convey relative or absolute position or motion information, such as XYZ coordinates, acceleration, or other position or motion-related data as measured by the sensor 502. Verbal input is provided through an audio input device 503, such as a headset microphone. The computer 504 is equipped with suitable speech recognition software to recognize and process such input.

FIGS. 6A through 6C depict an example of a wand pattern. From a level position, the wand 601 is pointed upward at time 1 as depicted in FIG. 6A. Then it is moved into a level position as depicted in FIG. 6B at time 2 before being moved to point upward again at time 3 as depicted in FIG. 6C. This physical input pattern, therefore, is (i) point up, (ii) point level, (iii) point up, which is one of an infinite number of physical input patterns that can be input through the process depicted in FIG. 7: a physical input device is moved into a first position 701, moved into another position 702, and, if more positions are called for in a given pattern 703, moved into another position 702, and so on.

Figure 8A:
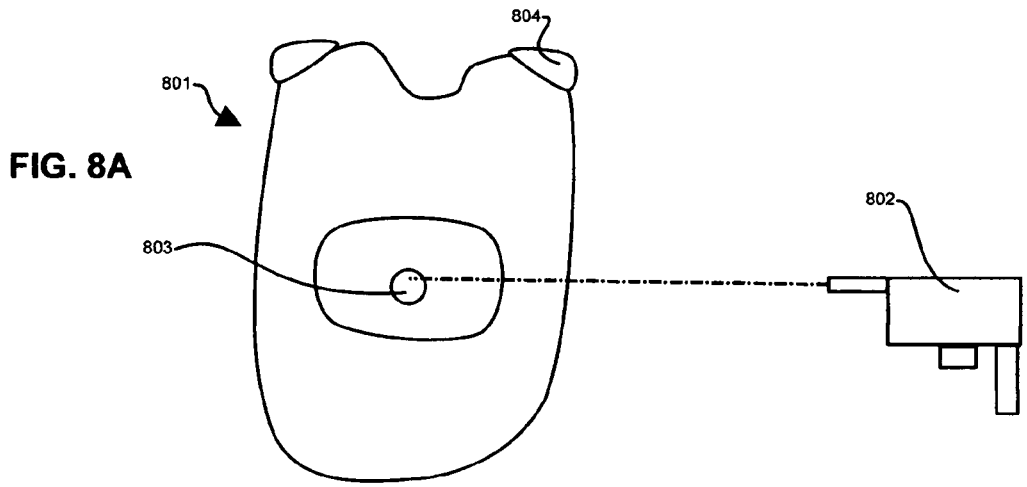
FIGS. 8A through 8B depict a laser tag gun shooting a laser tag vest.
Figure 8B:
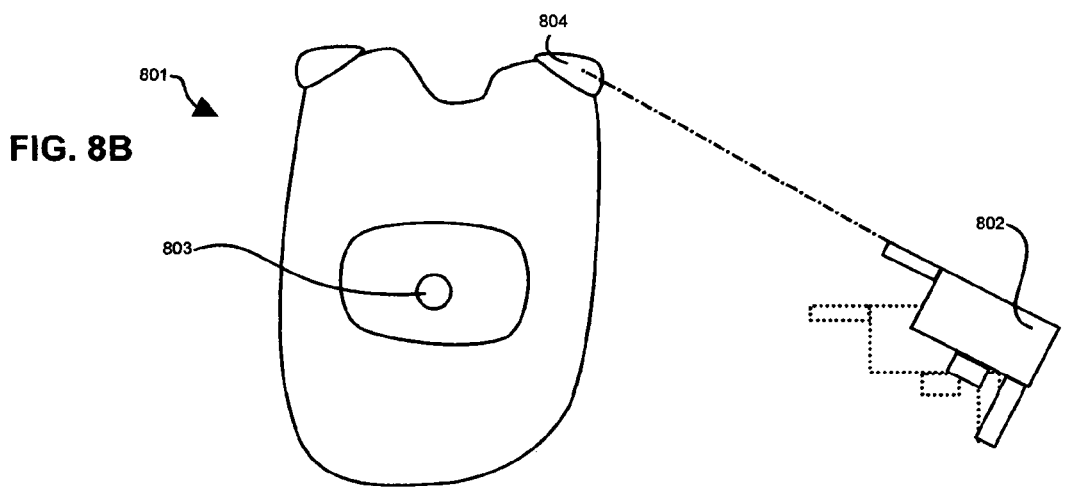

An alternative function provides for the use of a laser-tag device instead of a wand. FIG. 8A depicts a laser tag vest 801 for use with a laser tag gun 802. The vest 801 includes target points in the abdomen 803, shoulders ("epaulets") 804, etc. Physical input patterns using this type of physical input device are input by "shooting" target points in the target vest 804 in a particular order or combination. For instance, abdomen-epaulet-abdomen can serve as a first pattern; abdomen-abdomen-epaulet can serve as a second pattern. FIG. 8A depicts the physical input apparatus 802 shooting the vest 801 in the abdomen target 803. FIG. 8B depicts the physical input apparatus 802 shooting the vest 801 in the epaulet 804. Thus the action depicted in FIG. 8A and the action depicted in FIG. 8B together form a physical input pattern, namely, abdomen-epaulet.

When using the laser apparatus instead of the wand apparatus, not only is the spell identified by the physical input pattern but also the target of the spell is so identified: whoever is wearing the vest that a player shoots in order to perform a physical input pattern is the target of a spell so triggered. This dual usage for the information has obvious advantages when the present invention is used in a multiplayer setting. However, certain spells do not involve a target, have a default target (e.g., all evil characters), or the target is inherently the spell caster; in such cases, the sensor-based wand may seem more appropriate and intuitive to users.

Figure 9:
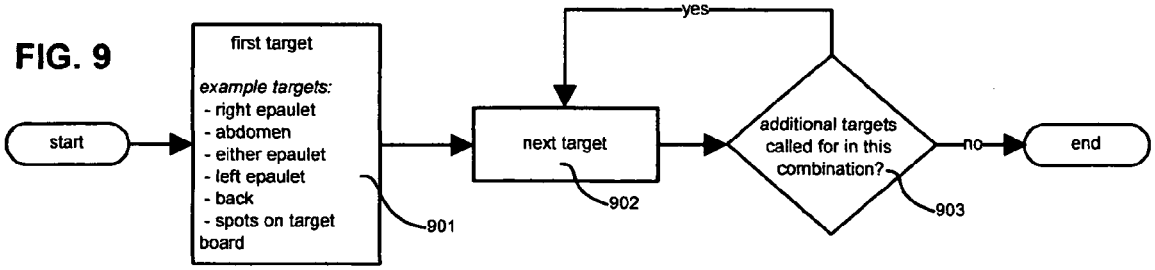
FIG. 9 is a flowchart depicting a physical input pattern for use with a laser tag based function of the present invention.

A method for inputting physical input patterns for use in the laser-based function of the present invention is depicted in FIG. 9: a user shoots a first target 901, then another target 902, and then, if the desired physical input pattern calls for more targets in this combination 903, another target is shot 902, and so on.

Figure 10:
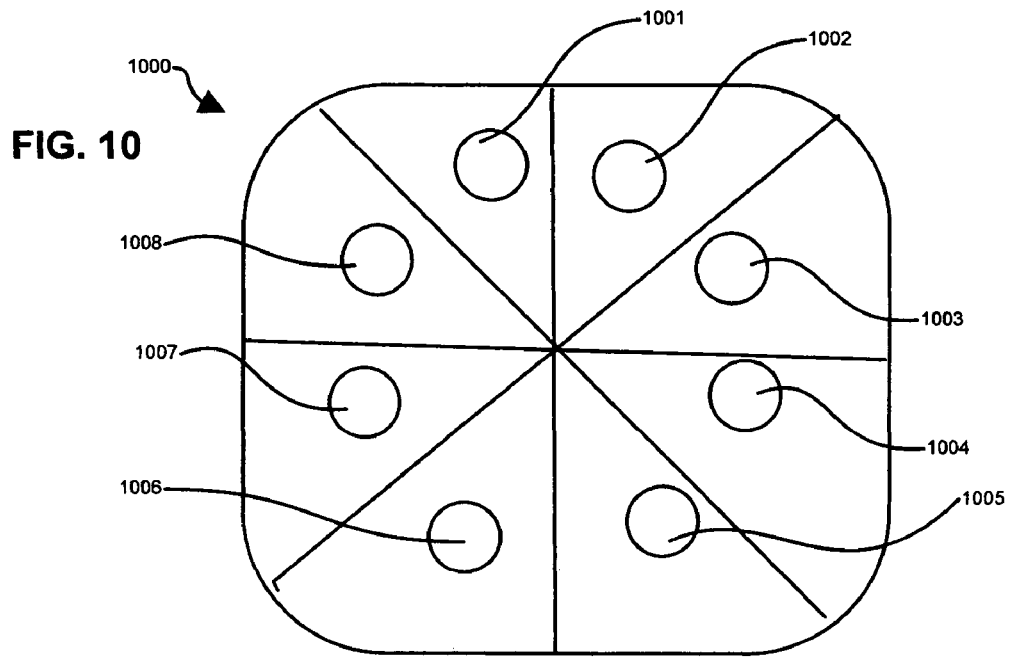
FIG. 10 is depicts an example dummy target board for use in a laser tag function of the present invention.

A dummy target board 1000 in FIG. 10 can be used with the laser-based input device for spells that do not involve a target or for use in solo play. The dummy target board 1000 includes target points 1001-1008 which serve in the stead of abdomen, epaulet, back, and any other target points that may be included in an input pattern.

Figure 11A:
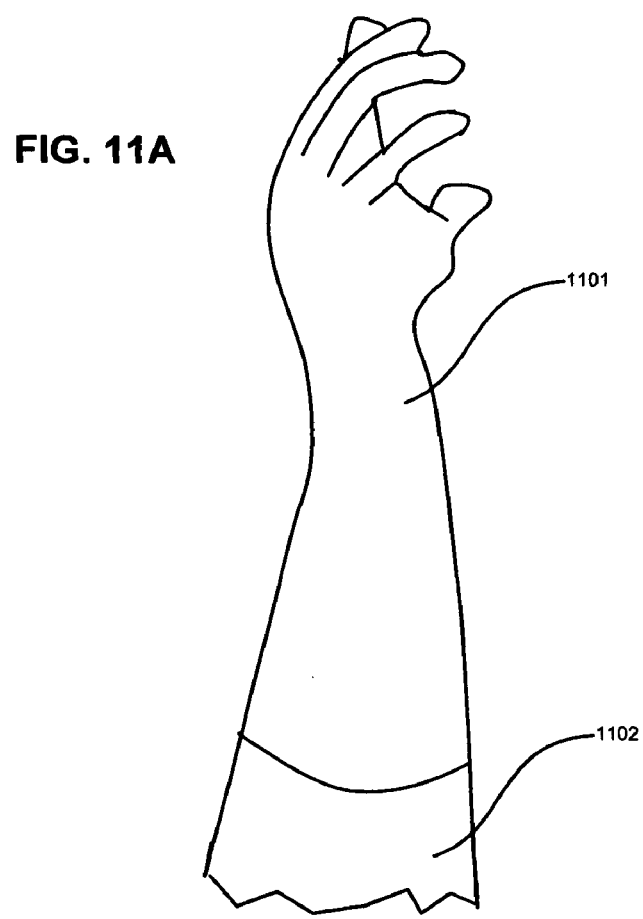
FIG. 11A depicts an example gesture interface being worn by a user for use in a gesture interface function of the present invention.
Figure 11B:
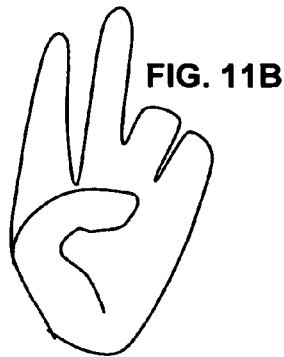
FIGS. 11B and 11C depict example hand gestures for use in casting spells according to the present invention.
Figure 11C:
Figure 11D:
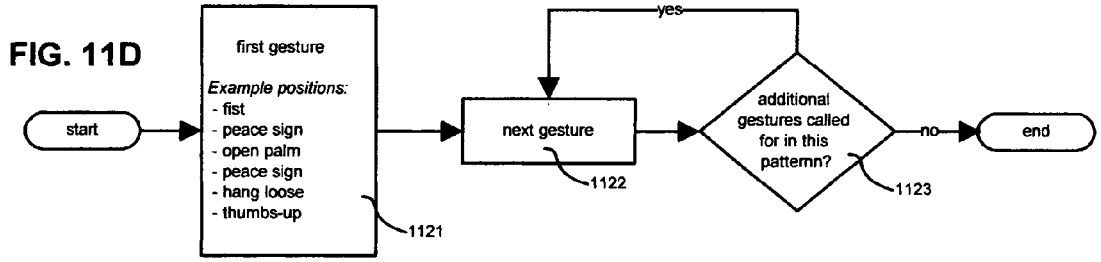
FIG. 11D is a flowchart depicting an example physical input pattern for use in a gesture-interface-based function of the present invention.

Other physical input devices can be used. One particularly attractive choice is that of a gesture interface suitable for input of hand signals. In this function, a gesture interface 1101 depicted in FIG. 11A captures positional and motion data as input by the hand of a user 1102. Example hand gestures for use with the gesture interface input apparatus appear in FIG. 11B (a "peace sign") and FIG. 11C (a "hang loose" sign). FIG. 11D depicts the process for inputting a physical input pattern via gesture interface: a first gesture is made 1121, another is made 1122, and, if the desired input pattern calls for additional gestures 1123, these gestures are made 1122.

Like the wand, the gesture interface is particularly attractive as an input device because hand gestures are treated as a crucial component of spell-casting in many fantasy literature and game settings.

FIG. 12 depicts a method of integrating speech input patterns and physical input patterns. If the integration pattern begins with verbal input 1201, a verbal input pattern, such as "Abracadabra" or other verbal incantation as shown in FIG. 12, is input 1203 into the computer. Then, if the integration pattern has not yet been finished 1204 and the next input required in a desired integration pattern is nonverbal 1205, then an appropriate physical input pattern is input 1202. The process continues according to depicted steps until completion.

Figure 13:
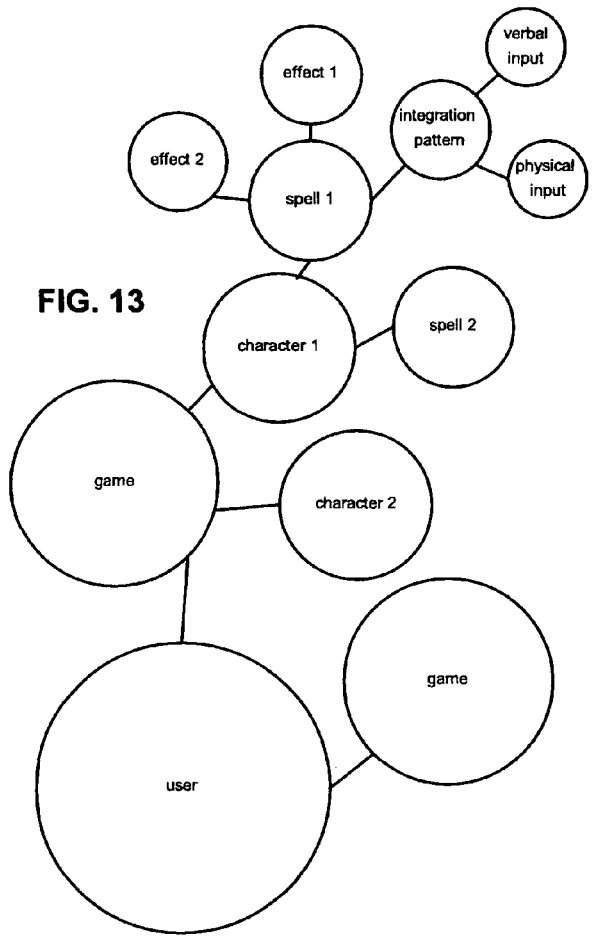
FIG. 13 is a chart depicting relationships between a user and elements of a game according to the present invention.

FIG. 13 depicts a set of abstract logical relationships between a single user/player and multiple games that he or she can play; multiple characters he or she can play within the context of a specific game; multiple spells that a specific character can cast; multiple spell effects associated with a specific spell; an integration pattern associated with the specific spell; and verbal and physical input patterns associated with the specific integration pattern.

Figure 14:
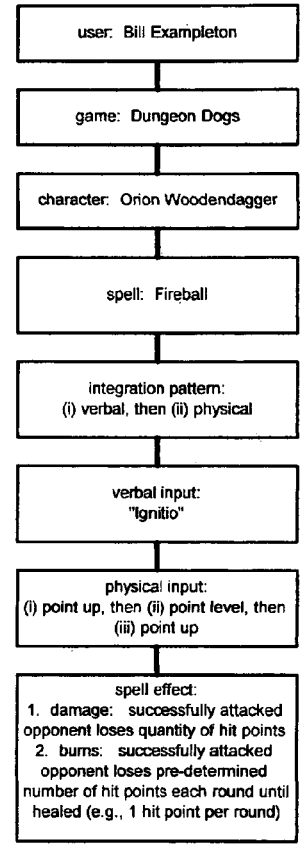
FIG. 14 is a chart depicting specific information relationships between a user and elements of a game according to the present invention.

FIG. 14 depicts an example of the abstract relationships depicted in FIG. 13, wherein a particular user plays a particular game using a particular character to cast a particular spell that is associated with a particular integration pattern, in which is combined a particular verbal input pattern and physical input pattern; casting of the spell produces particular spell effects in the game context.

Figure 15:
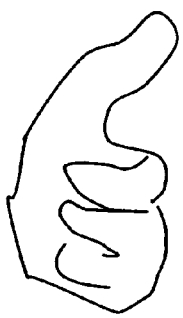
FIG. 15 is a hand gesture for use in a gesture-interface-based function of the present invention.

FIG. 15 depicts an additional hand gesture ("thumbs-up") for use with a gesture interface physical input apparatus.

Although not necessary, it may be useful to include a "reset word" function for use in verbal input patterns. When the reset word is spoken, the user has a predetermined period of time within which to perform physical and speech input. After this time period has expired, extraneous input—accidental spoken words or movements of the wand, for instance—will be ignored until the reset word is spoken again.

Figure 16:
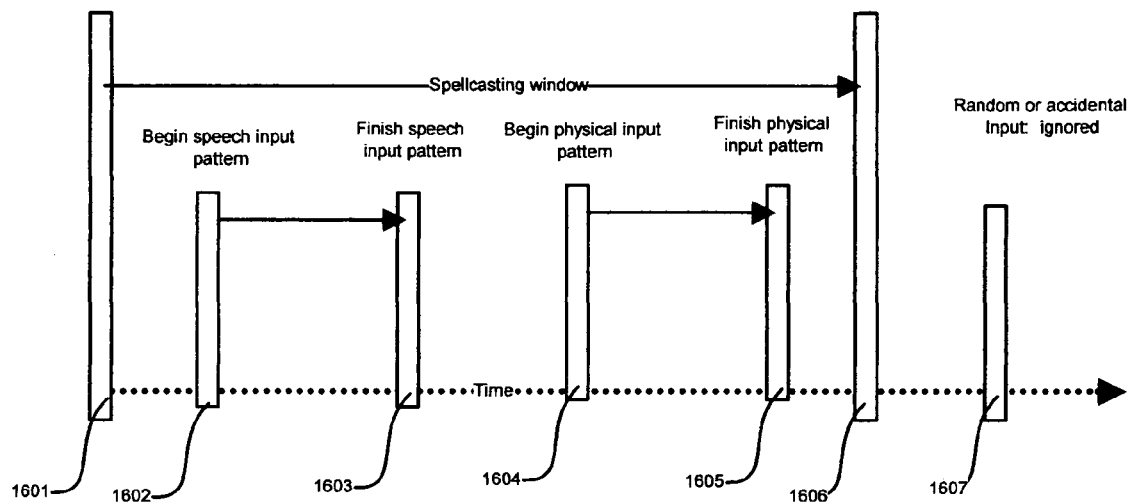
FIG. 16 is an example timeline for use in a spell-casting process according to the present invention, where the entire verbal and physical input must occur within a spell-casting window time period according to the present invention.
Figure 17:
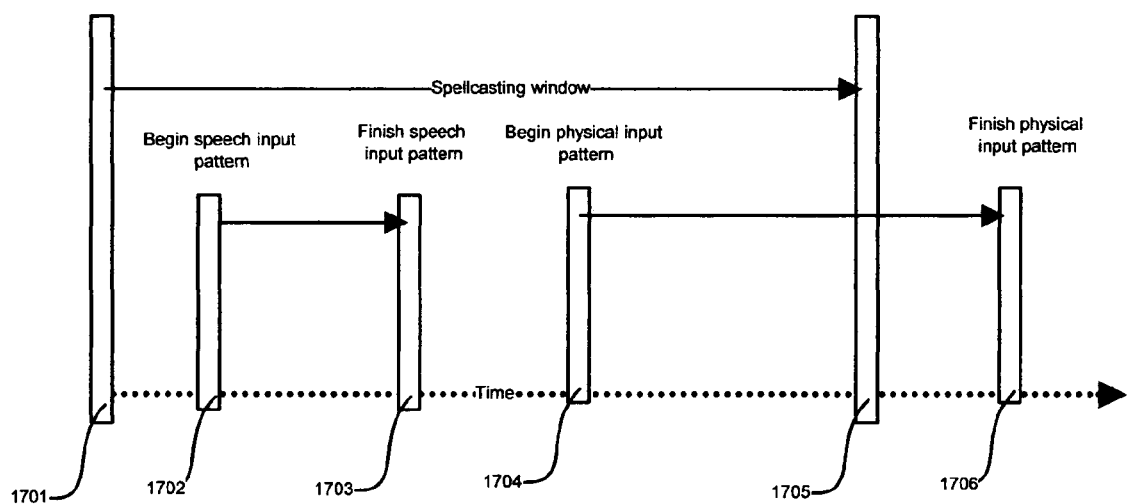
FIG. 17 is an example timeline for use a spell-casting process according to the present invention, where valid input must begin within spell-casting window time period but need not be completed before the window closes according to the present invention.

FIGS. 16 and 17 depict two possible timelines applicable when the reset word function is used. When the reset word function is used as it is in FIG. 16, the entire speech input pattern and physical input pattern must be input by the user prior to the ending of a predetermined period of time after speaking of the reset word; this period of time is called a "spell-casting window". In FIG. 17, the last input pattern, whether physical or verbal, in a desired integration pattern must be begun before the end of the spell-casting window but need not be completed prior to that time.

The present invention involves numerous databases related to each other in primary ways as depicted in FIG. 18, which databases serve to make available to a user the complex of logical relationships depicted in FIG. 13. As will be plain to one skilled in the art, these databases and the relationships therebetween can be modified, omitted, or supplemented as necessary for a particular application of the present invention.

Numerous gaming scenarios for use of the spell-casting system are possible, including, (i) individual human player against computer opponents; (ii) multiple human players against each other in a computer environment (e.g., virtual reality); (iii) multiple human players against each other in a physical environment; (iv) multiple human players in a pre-existing role-playing game, wherein the present invention serves as but an enhancement to the pre-existing game. Each of the scenarios and the processing routines associated with each are described in detail below.

Single user play: In single user play, a videogame includes a spell-casting feature. The videogame can be a first person "shoot'em up" type game, a third person fighting game, or a role-playing game, or other type of videogame.

The player plays the game using conventional controllers for conventional features such as navigation, attacking with a gun or other weapon, etc. When the user wishes to cast a spell, however, he or she uses the speech input microphone and the wand or gesture interface to input data into the computer. This data is processed per the present invention, and the results of spells are incorporated into the game (e.g., causing damage to opponents, causing regeneration of the player's character's hit points, etc.).

Multiple human players in virtual environment: In this application, humans play against each other online conventionally. However, when a given player wishes to cast a spell, he or she does so through the present invention.

Multiple human players against each other in a physical environment: In this application, humans play against each other in a facility created for such play, such as a laser tag arena. Laser tag guns and vests are used as in typical laser tag games. However, when a given player wishes to cast a spell, he or she does so through the present invention.

Multiple human players in a pre-existing role-playing game: In this application, users play the pre-existing role-playing game, such as Dungeons and Dragons, as usual. However, when a player wishes to cast a spell, he or she does so per the present invention, with the dedicated dual monitor 6801 depicted in FIG. 68A, with included computer processor, serving to process physical and verbal input. The computer 6801 outputs a simple message, visually or aurally (e.g., an explosion sound), indicating whether the spell has been successfully cast. If the spell has been successfully cast, the dungeon master applies the effects of the spell in the game as per the rules of the given role-playing game.

Card game: In this application, cards in a card game display the word or words to be spoken by the player and/or the gesture or wand motion to be executed by the player in order to cast a spell identified by the card. When a player wishes to cast the spell, he or she does so as in the role-playing game scenario above. If successful, the spell is cast, and its effects are incorporated into the card game as per the rules of the game.

Board game: Spell-casting can be incorporated into a board game as it is in the card game scenario above.

II. Physical or Electronic Card Game System

A disclosed card game system, which can be embodied as a physical card game or as a computer "card" game, provides disclosed card face structures which include a number of disclosed features for use with numerous disclosed methods that together form a game.

According to the present invention, a face of a playing card is partitioned into discrete segments. A deck consists of several playing cards with such partitioned faces, and each player has a separate deck. The game proceeds in rounds, with each player having a turn within each round.

A six-sided die is rolled at the beginning of each round. For the remainder of that round, cards in a player's hand have the abilities described in a single face segment that is identified by a number that matches the number rolled on the die.

Turning now to the FIG. 5, a user creates and arranges a deck according to the steps of the flowchart in FIG. 19 so that the user's cards are arranged in whatever sequence he or she prefers; however, during the game, the user-intended deck order may be undone if the user is forced to shuffle his or her deck per the process in FIG. 23.

Unlike conventional collectible card games, the number of cards in a deck is not predetermined. Rather, a maximum of power rating points establishes the limit of the sum total of power ratings of individual cards allowed in a deck. The size of each player's deck is thus determined by the length of game the players want to play, as depicted in the flowchart in FIG. 20 with reference to a time-to-deck-power chart in FIG. 21 and a card-type-to-power chart in FIG. 22.

Figure 24:
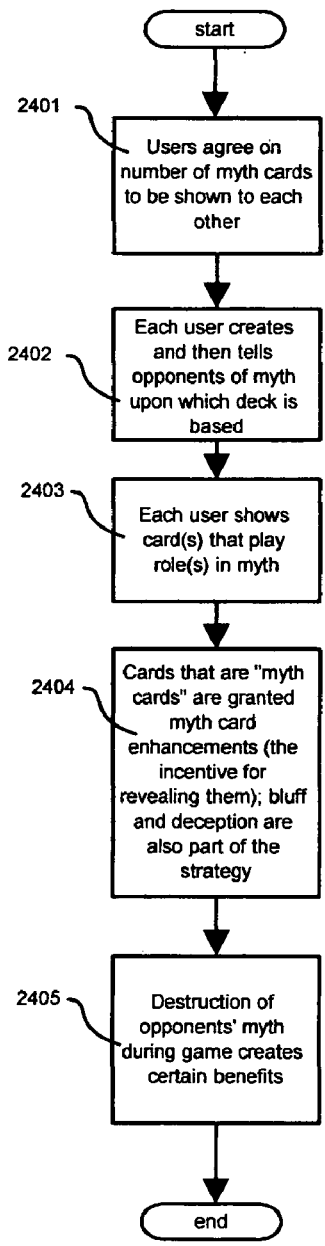
FIG. 24 is a flowchart depicting a method whereby a user-generated myth is incorporated into a game according to the present invention.
Figure 25:
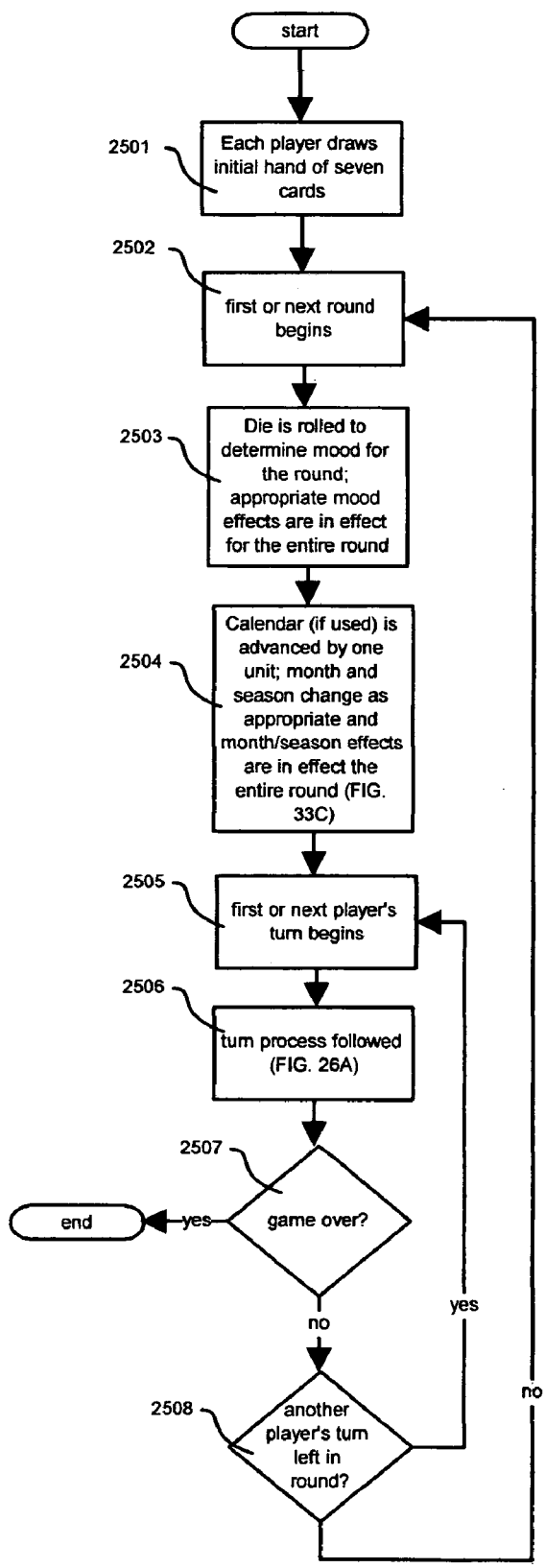
FIG. 25 is a flowchart depicting a method whereby a game is played according to the present invention.

Each player creates and relates to the other players a myth, incorporating certain cards in his or her deck into the myth per steps indicated in the flowchart in FIG. 24. The game is then played according to a process depicted in FIG. 25. A player wins when he or she eliminates all other players; a player is eliminated 3207 per a process in FIG. 32.

Figure 26A:
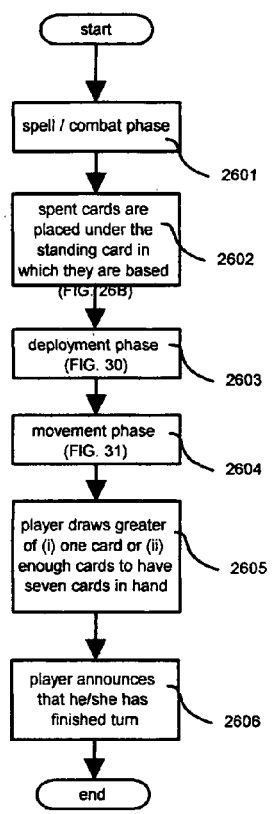
FIG. 26A is a flowchart depicting a method whereby a user/player plays his or her turn in a game according to the present invention.
Figure 27:
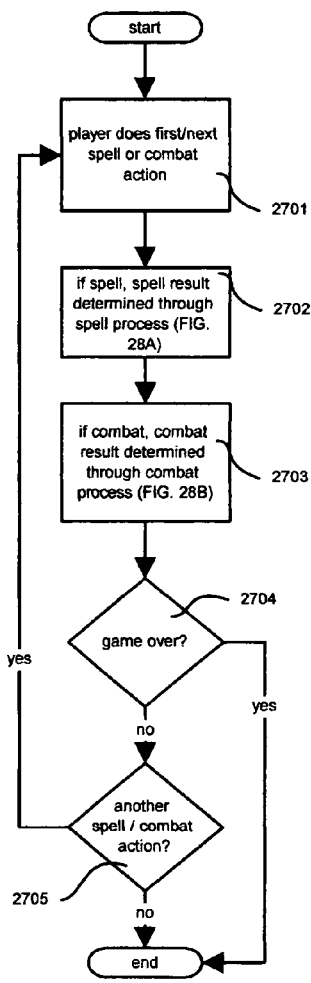
FIG. 27 is a flowchart depicting a method whereby a player conducts his or her spell/combat phase of his or her turn in a game according to the present invention.
Figure 28A:
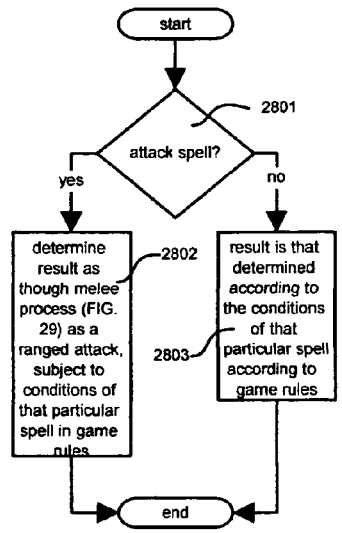
FIG. 28A is a flowchart depicting a method whereby a result of a spell is determined in a game according to the present invention.
Figure 26B:
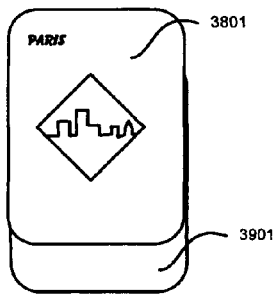
FIG. 26B is an anterior view of a landing/standing card covering a spent force card according to the present invention.
Figure 28B:
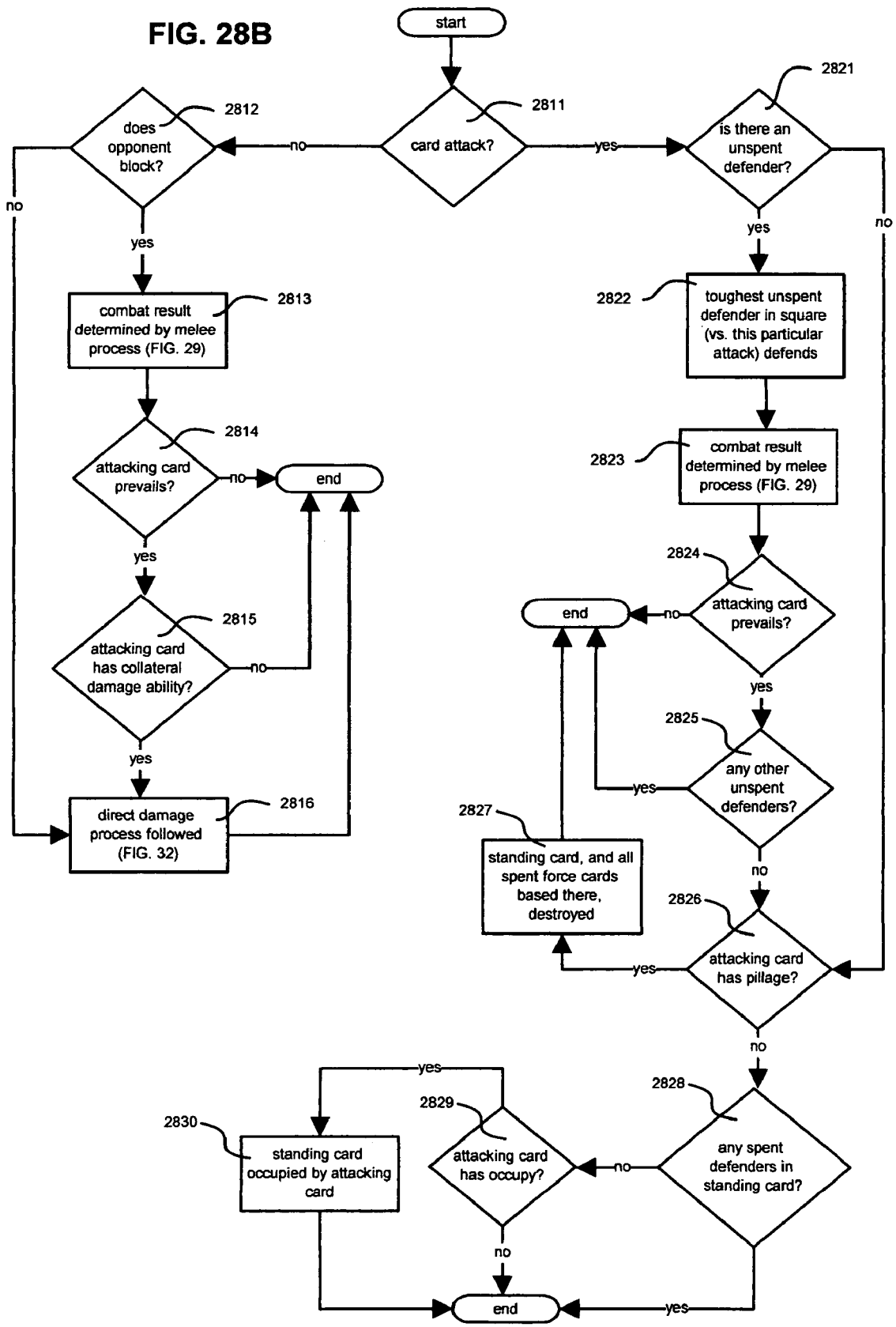
FIG. 28B is a flowchart depicting a method whereby a result of combat is determined in a game according to the present invention.
Figure 29:
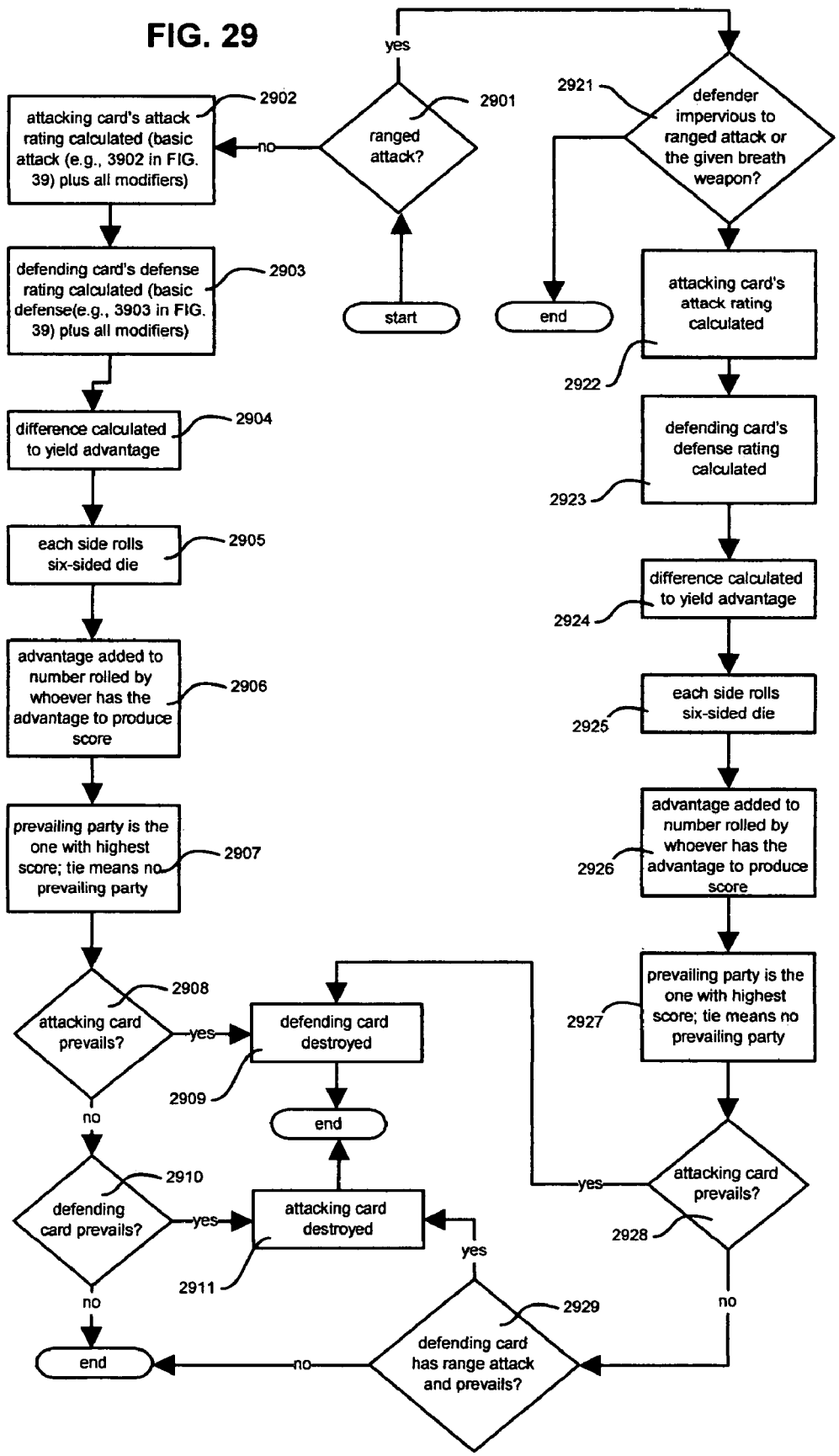
FIG. 29 is a flowchart depicting a method whereby melee results are determined in a game according to the present invention.
Figure 30:
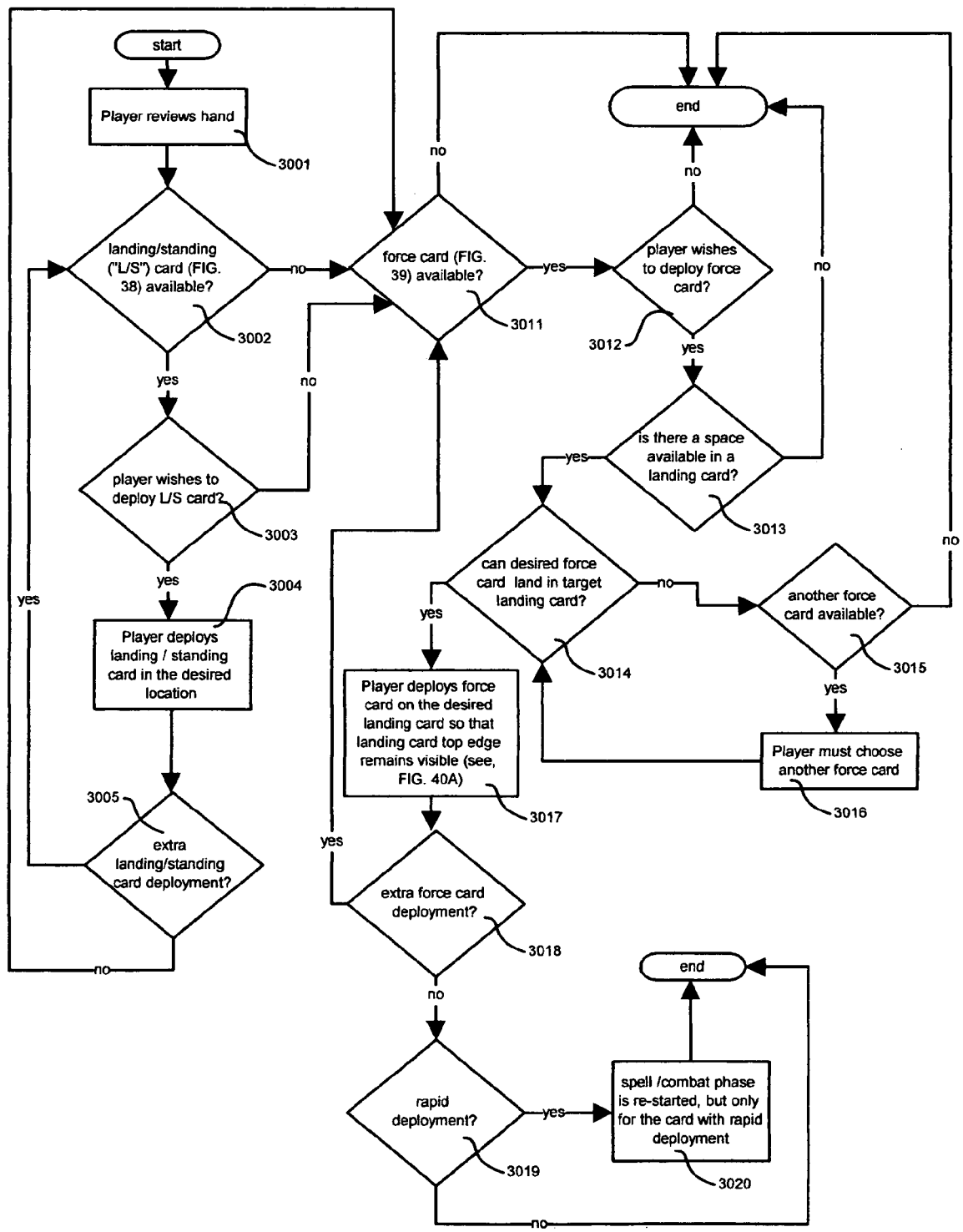
FIG. 30 is a flowchart depicting a method whereby a player deploys cards according to the present invention.
Figure 31:
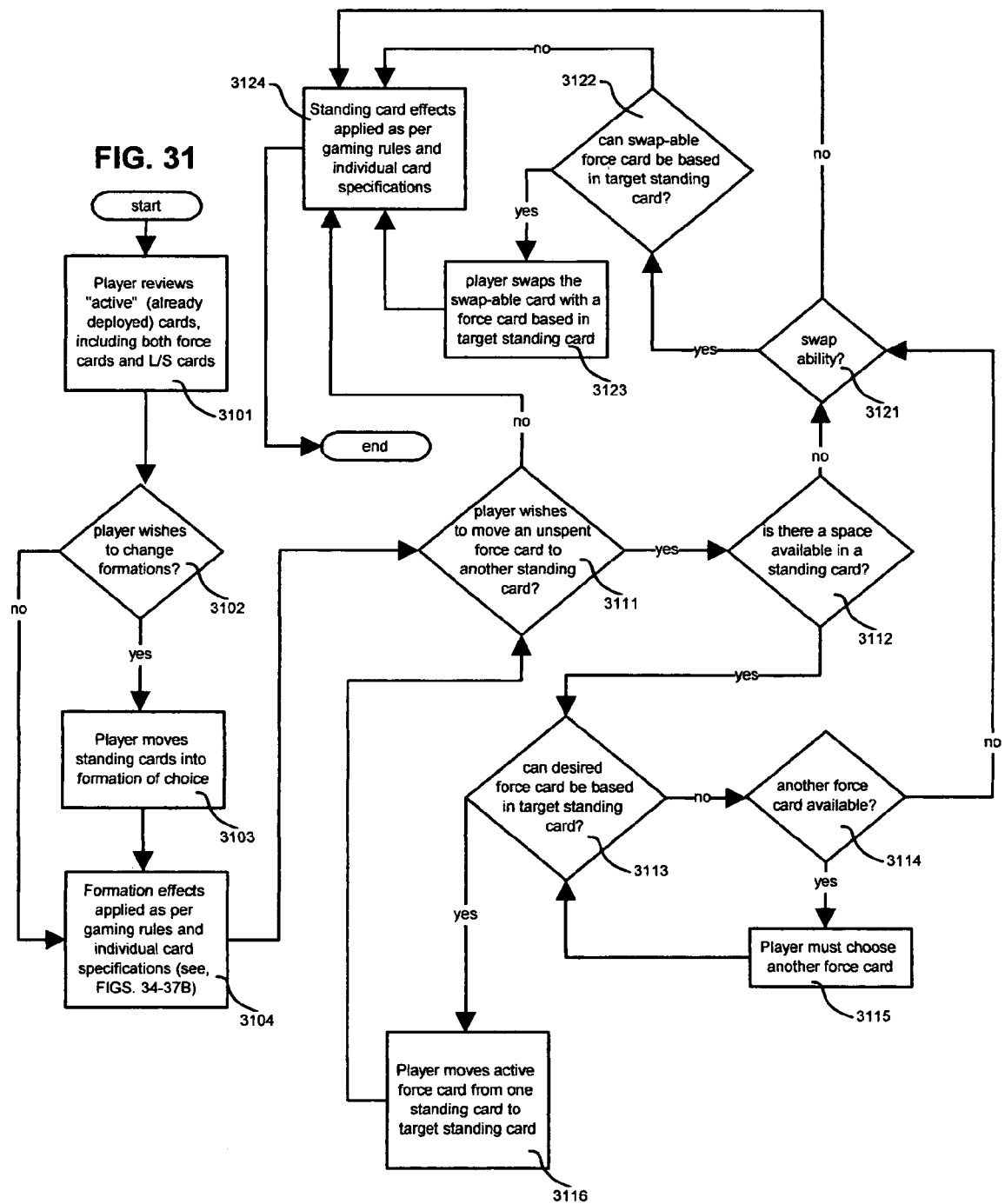
FIG. 31 is a flowchart depicting a method whereby a player moves cards according to the present invention.

During the game, each player's turn proceeds according to the process in FIG. 26A: spells and combat actions are executed 2601 as per FIG. 27, with reference to FIGS. 28A, 28B and 29; presuming that these actions do not end the game, spent cards, i.e., cards which have already attacked or blocked during the turn, are then placed 2602 under standing cards in which they are based as shown in the example in FIG. 26B; cards are then deployed 2603 from the user's hand so as to become active according to a process depicted in FIG. 30; then, force cards are moved to other standing cards 2604, and standing cards are moved into different formations 2604 per a process in FIG. 31; and then a user draws a card or cards to replenish his or her hand 2605.

Figure 40A:
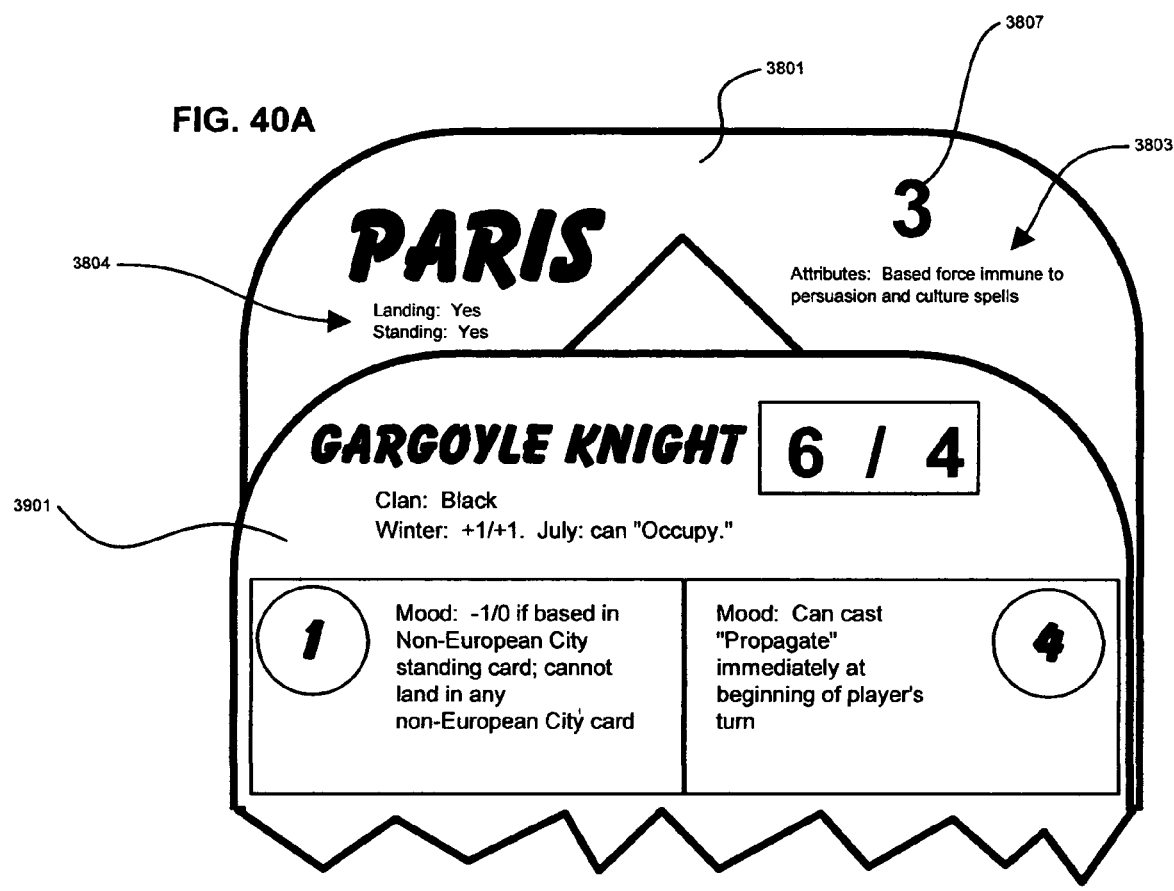
FIG. 40A is an anterior view of an unspent force card in position on top of a landing/standing card so that crucial information of the landing/standing card can be viewed even while the force card is based in the landing/standing card.
Figure 41:
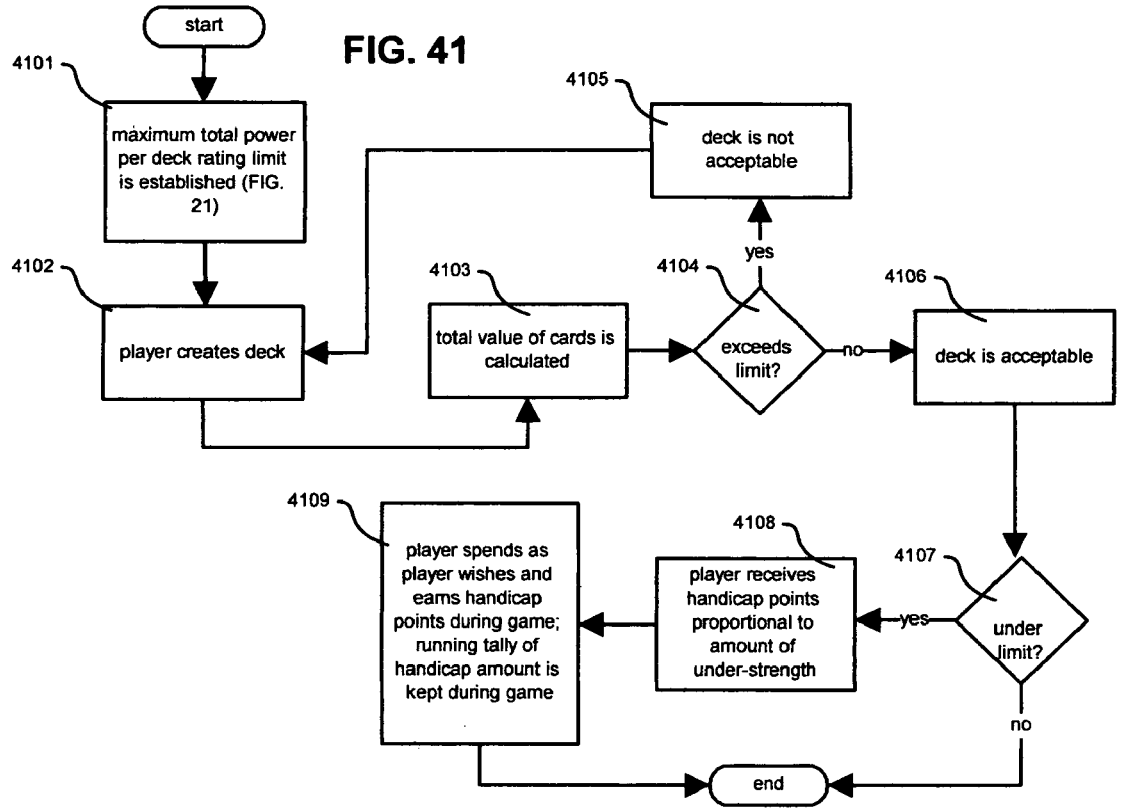
FIG. 41 is a flowchart depicting a method whereby total deck power is calculated and used according to the present invention.

Of particular importance is the spell/combat phase of a user's turn. Combat attacks are divided into two types: (i) card attacks and (ii) direct attacks. Card attacks are directed at a particular landing/standing card of an opponent. A direct attack is simply directed at an opponent, which opponent may elect to block the direct attack with any of his or her unspent active force cards. In certain cases, a direct attack can result in direct damage or player termination per the process in FIG. 32. Handicap points, which can be gained at the beginning of the game by constructing an "understrength" deck according to a process depicted in FIG. 41 as well as at other times during the game according to the chart in FIG. 40C, are particularly important in avoiding direct damage.

Figure 33A:
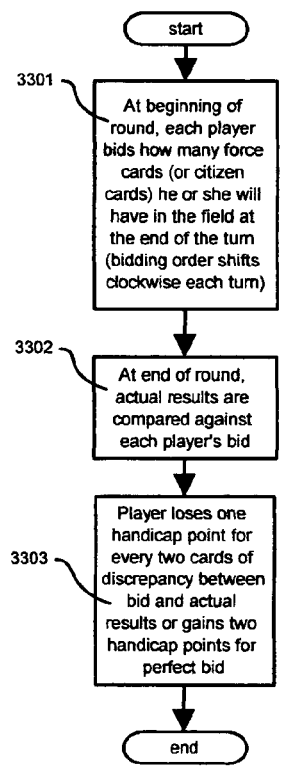
FIG. 33A is a flowchart depicting a method whereby bidding is used in a game according to the present invention.
Figure 33B:
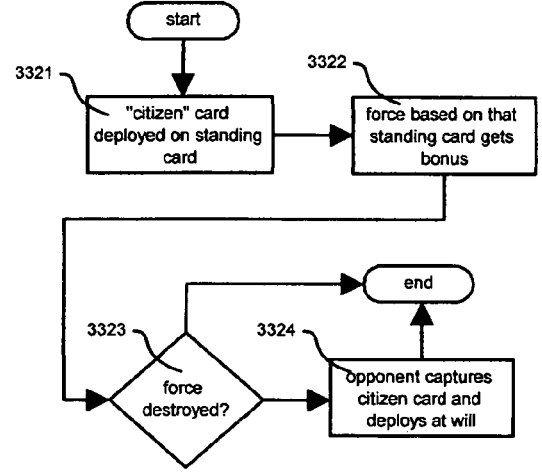
FIG. 33B is a flowchart depicting a method whereby citizen cards are used in a game according to the present invention.
Figure 33C:
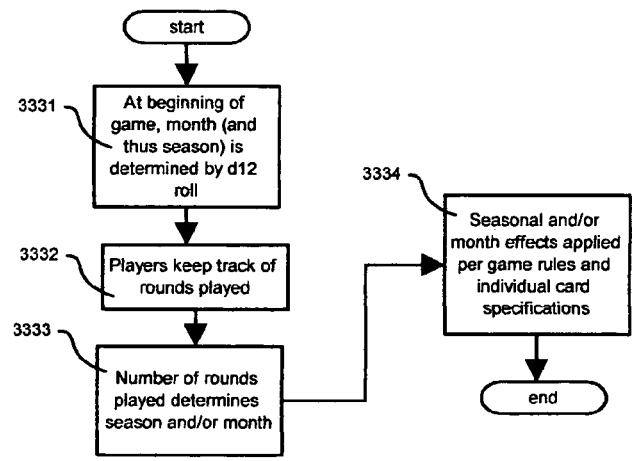
FIG. 33C is a flowchart depicting a method whereby months and seasons are used in a game according to the present invention.

Advanced users may incorporate additional methods of play, which are optional, including the use of bidding per a process in FIG. 33A, the use of citizen cards (which are not force cards but which are based in standing cards) per a process in FIG. 33B, and the use of months and seasons per a process in FIG. 33C.

Figure 34:
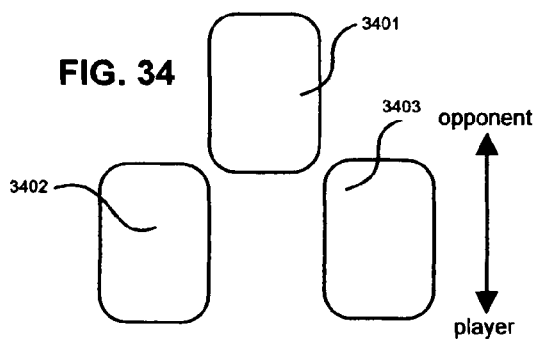
Figure 35:
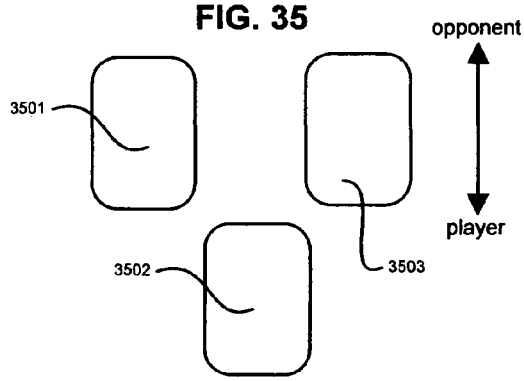
Figure 36:
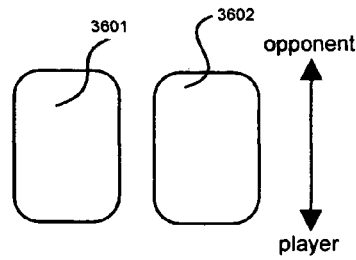
Figure 37A:
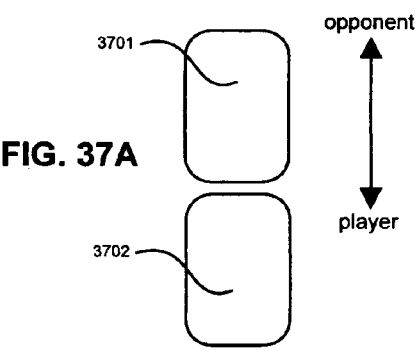
Figure 37B:
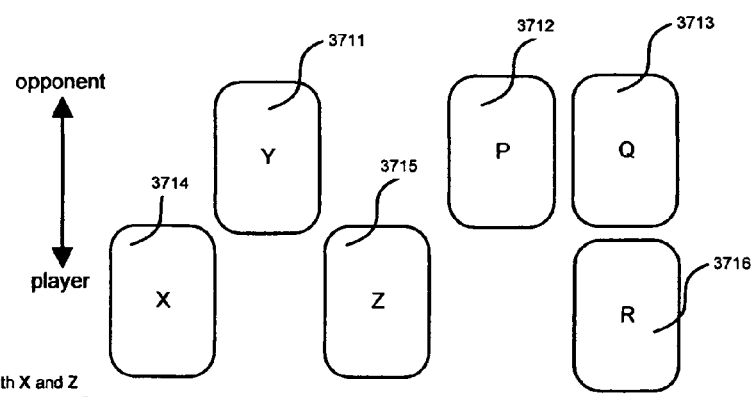
FIG. 37B depicts an example of the use of combinations of card formations according to the present invention.

Whatever the case, the spatial relationship between standing cards directly affects the strength of force cards based therein. FIG. 34 depicts "flanking formation", which affords benefits to the card in focus position 3401. FIG. 35 depicts "defensive formation", which affords benefit to the card in focus position 3502. FIG. 36 depicts "twins formation", which affords benefit to both cards 3601 and 3602. FIG. 37A depicts a front-back position, which affords benefit to the card in back 3702. Formation effects can be used in combination with each other, as depicted in FIG. 37B.

Figure 38:
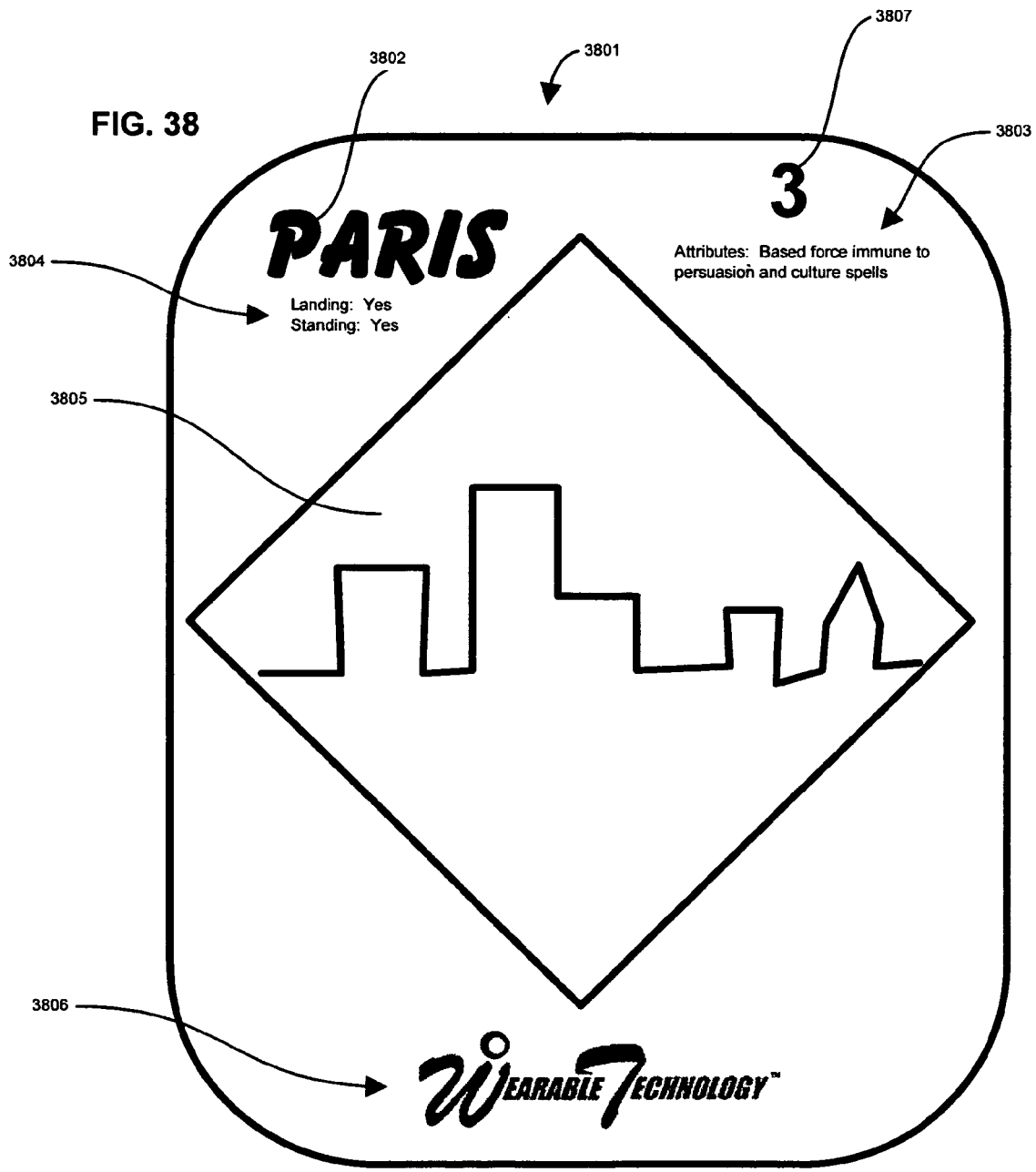
FIG. 38 is an example of a landing and standing card according to the present invention.

FIG. 38 depicts an example landing/standing ("L/S") card 3801. The face of this card 3801 provides crucial information for use in the game. A name of the card 3802 appears at the top, as does a number 3807 that indicates the "force capacity" of this standing card 3801. The force capacity number 3807 indicates how many force cards can be based in this standing card 3801. Thus, since the force capacity number 3807 depicted is "3", a maximum of three force cards can be "based in", i.e., placed on top of, this L/S card 3801.

An "attributes indicator" 3803 also appears on the face of the card, indicating benefits that all forces based in, i.e., placed on, the depicted card 3801 gain while based therein.

A "landing/standing capacity indicator" 3804 also appears on the face of the card 3801. Some L/S cards are landing cards but not standing cards; some cards are standing cards but not landing cards; and some cards are both. If this indicator 3804 indicates that the card has "landing" capacity, a force card can be initially deployed on this card 3801; however, if this indicator indicates that a L/S card has no such landing capacity, a force card cannot be directly deployed on that L/S card, i.e., cannot be moved directly from a user's hand to that card 3801 during the deployment phase of a user's turn; rather, a force card can only be moved to a non-landing L/S card 3801 during the movement phase of a user's turn.

A graphic image 3805 appearing on the face of the card 3801 indicates that the depicted card is a "city" card. Other types of L/S cards include forest, coast, mountain, plain, and riverbank cards.

Figure 57:
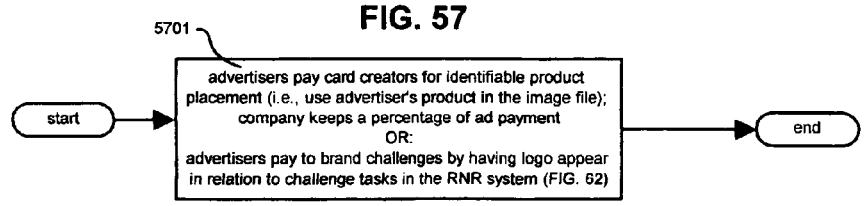

A company logo 3806 can also be emblazoned on the face of the card for revenue generation per the process depicted in FIG. 57.

Figure 39:
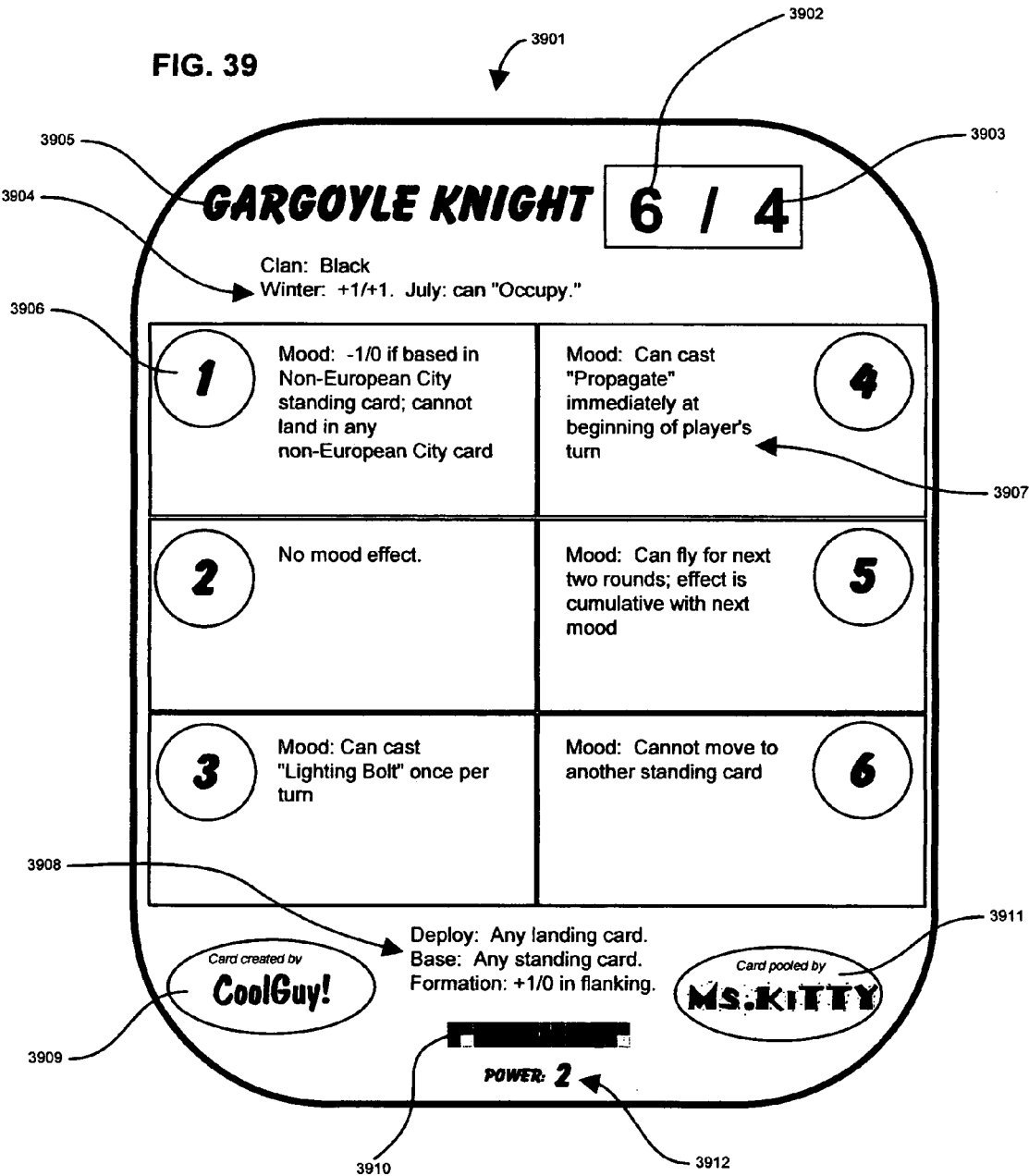
FIG. 39 is an example of a force card according to the present invention.

FIG. 39 depicts an example force card 3901. The face of this card 3901 provides crucial information for use in the game. A name of the card 3905 appears. A basic attack (or offense) strength number 3902 and a basic defense strength number 3903 appear for use in melee per the process depicted in FIG. 29.

An indicator 3904 of the clan to which the card belongs and month and seasonal effects on this card 3901 appears. An indicator 3908 of the kinds of L/S cards upon which this card 3901 can be deployed and based also appears; this indicator 3908 also indicates any special formation benefits this card 3901 receives above and beyond normal formation benefits.

A logo 3909 submitted by a creator of the card through the process depicted in FIG. 46 appears, as does a logo submitted by an original purchaser ("pooler") of the card. An indicator 3911 of a power rating of the card also appears, as does a barcode 3910 identifying this card.

The face of this card 3901 also includes several surface segments indicating mood effects 3907 on the abilities of this card; each mood effect is identified by a mood number 3906. A mood of a round of play is determined 2503 at the beginning of the round as per the process depicted in FIG. 25. A mood effect associated with the mood number that is the mood of a given round of play applies to this card 3901 for the entire round.

When an unspent force card is based in a L/S card, the force card is placed on top of the L/S card in such a way as to leave the top portion of the L/S card uncovered. Such placement allows pertinent information appearing on the face of the L/S card to remain visible to users. An example of proper placement of an unspent force card 3901 based in a L/S card 3801 so as to reveal the force capacity number 3807 and other indicators of the L/S card appears in FIG. 40A.

A playing surface and various materials for use in the game are depicted in FIG. 40B, which elements are labeled in FIG. 40B itself, e.g., dice used in the game and an example of the various states in which cards can be in the game: a draw pile, which comprises cards that have not yet been drawn by the user into his or her hand; a user's hand, which the user can view and from which cards can be selected for deployment; a deployed ("active") landing card; an active standing card; an active, unspent force card based upon a standing card; and a discard pile, into which cards are put once they have been "destroyed" during play.

Dice, besides the six-sided die used to determine moods and resolve combat, are optional. Uses for optional dice include: (i) d20—keep running tally of total handicap points available to a player (i.e., when a point is spent, the die is moved to the number that is the new remaining number of points); (ii) d12—randomly determine opening month and then keep track of the current month thereafter by turning the die each turn to a number of a new month (i.e., "4"=April); and (iii) d4—keep track of season.

For further elaboration on the foregoing discussion, the official rules of a preferred embodiment of the present invention as of the time of this writing are inserted below. Note that in this preferred embodiment, some implications have been used: (i) the distinction between a L/S card with landing capacity and one without landing capacity has been eliminated, i.e., all standing cards have landing capacity (but a given force card may still be limited in its deployability for other reasons); instead of six mood partitions, only two appear on each force card; when a mood is rolled for a turn that does not match either mood partition on a given card, no mood is in effect for that card for that turn; and (iii) other variations.

Myths & Magicry™: The Collectible Card Game of Royalty

Object of the Game

To eliminate the other players by removing their cards from the game and then making a final attack.

Number of Players

Two to four.

Estimated Playing Time

Varies according to players' choice of deck size, ranging from fifteen minutes to two hours.

Game Requirements

A pool of Myths & Magicry™ cards; one six-sided die ("d6"); and a Myths & Magicry™ rulebook.

Also recommended: one counter per player for tracking handicap points (e.g., beads, pennies, 10-sided die ("d10") or 20-sided die ("d20")).

For advanced play, add: one twelve-sided die ("d12") for tracking months and one 4-sided die ("d4") for tracking seasons.

Overview of Basic Play

Players are dealt pools of cards, consisting of force cards and standing cards. Each player selects a clan (black, blue, red or white) and cards from the pool to be included in his or her playing deck, subject to power-rating constraints.

Each player then tells the other players the "myth" upon which his or her playing deck is based. During the telling of the myth, the player shows the other players three cards—the "myth cards"—from his or her playing deck. Having viewed each others' myth cards, the players stack their decks as they wish. Play then begins.

Play proceeds by rounds, with each player having one turn within each round. At the beginning of each round, the six-sided die is rolled to determine a "mood" (1-6) for the round. Each force card in the game has two mood effects that appear on the face of the card. When the mood for the turn matches a mood effect on a given force card, that mood effect applies to that card for the entire round.

Player turns comprise various phases: the spell/combat phase; the deployment phase; and the movement phase. During his or her spell/combat phase, a player can cast whatever spells are available through his or her active force cards and/or attack an opponent through combat. During the deployment phase, a player can deploy a standing card and a force card from his or her hand, which typically comprises seven cards. During the movement phase, a player can move force cards from one standing card to another and can move standing cards into different formations to achieve formation effects.

Cards are removed from an opponent's playing draw pile through attacks that go unblocked or through attacks that deal collateral damage. An opponent is eliminated on the first direct attack that goes unblocked and unabsorbed after he or she no longer has any cards remaining in his or her draw pile.

Building a Deck

Each player selects certain cards from his or her pool of cards to form a playing deck. Playing decks are limited in power to a maximum total of power points, depending on how long of a game the players wish to play:

15 minutes: 20 power points per playing deck 30 minutes: 30 power points 1 hour or more: 45 power points Power points are calculated as follows:

Dragons and the Grand Wizard: 3 points

Knights, Hippogriffs, and Wizards: 2 points

All others, including standing cards: 1 point

After having selected all the cards for his or her deck, the player creates a "myth" that includes three of the cards in his or her deck. Once a player has viewed the other players' myth cards (see, "Myths and Myth Cards"), he or she arranges the order of his or her playing deck prior to the commencement of play.

A player receives two handicap points (see, "Handicap Points") for every point of "understrength" his or her playing deck has. For instance, if the player's final deck is only 19 power points strong in a game where 20 power points is the maximum deck strength, that player receives two handicap points at the start of the game for being one point understrength.

Drawing a Hand

At the beginning of the game, each player draws the top seven cards from his or her draw pile to form a hand. The player will know in advance what these seven cards will be, since the player has stacked the playing deck. Thereafter, however, an "Anarchy" may force the player to shuffle his or her draw pile.

At the end of his or her turn, i.e., after all spells, combat attacks, deployments and movements have been made, the player draws the greater of (i) one card or (ii) enough cards to have a hand of seven cards, presuming that there are still cards left to draw from the player's draw pile.

Discarding

When a force card is destroyed through combat or otherwise or when a standing card is destroyed through pillage, the destroyed card is placed in the owning player's discard pile. These cards are out of the game, unless revived per the effects of a spell, such as "Resurrection."

Standing Cards

There are two types of cards: standing cards and force cards. Standing cards are the fundamental building blocks of a player's engagement capabilities. At least one standing card must be in play before any force cards (see, "Force Cards") can be deployed.

Each standing card is either a city or non-city. Non-city standing cards include forests, mountains, coasts, plains, and riverbanks. Each standing card is also classified as either water-accessible or not water-accessible.

Each standing card has a maximum capacity of force cards that it can accommodate. Non-city standing cards can only accommodate one force card each, whereas city standing cards can accommodate either two or three force cards.

Certain standing cards impart a bonus to certain types of force cards.

Standing cards can be arranged in a variety of formations that yield certain benefits when there are force cards based in these formations (see, "Formation Effects"). An example standing card appears in FIG. 38.

Force Cards

Force cards are the cards which actively engage the opponent, either through spell, attack, defense, or block. A force card can only be deployed on a standing card that is already in play. A force card is said to be "based" on the standing card upon (or under) which it is stacked.

Each force card has several features, including:
attack strength
defense strength
two mood effects
special attributes ("incidentals") unique to that card card type
indicator of whether the force can fly An example force card appears in FIG. 39.

Myths and Myth Cards

After selection of his or her playing deck but prior to arranging the order of the playing deck, each player tells the others the myth behind his or her deck. During the telling of the myth, the player displays three "myth cards." These cards should represent characters in the myth.

The advantage of showing myth cards: Myth cards get a +2/+2 bonus (i.e., an increase of its basic attack strength points and basic defense strength points by 2 units each) throughout the game.

The disadvantage: The other players get a preview of what they are facing.

Moods

At the beginning of each turn, a d6 is rolled to determine a mood for the round. The mood lasts the entire round.

Each card has two mood effects, each of which is associated with a particular mood number ranging from 1 to 6. The mood for the round determines which mood effects are active with respect to each card as displayed on the individual card itself.

For instances if the mood for a round as rolled on the d6 is "3," then all cards that have mood effects for "3" are affected for that round. Cards without mood effects matching "3" receive neither any bonuses nor any penalties for mood that round.

Deployment

During each turn, after spells and combat attacks have been made using active force cards, a player may deploy at least one standing card, if any are available in his or her hand.

Thereafter, a player may deploy at least one force card, provided that the player has a force card in his or her hand. However, a force card can only be deployed on an active standing card that still has available capacity. For instance, a "Coast" standing card has a capacity of one force card; thus, if a force card is already based in a coast standing card, no additional force card can be deployed to that standing card.

Some force cards have a "rapid deployment" ability. These cards can act (attack, etc.) immediately upon deployment as though, for that one card only, the spell/combat phase for that player's turn resumes.

Instead of deploying any cards, a player may discard one card from his or her hand, placing it in the discard pile, and draw one card from the top of his or her draw pile. This action uses up his or her entire deployment phase for the turn.

Movement

During the movement phase of a player's turn, that player's standing cards can be moved into whatever formation the player desires.

That player's force cards can be moved to any of that player's standing cards that still have excess capacity available. Force cards cannot move to a standing card that is already at full capacity unless a "swap" power is invoked, which only a few force cards have. Using the swap power, the two force cards involved in the swap are exchanged between two standing cards. Only one of the two force cards involved in a swap must have the swap power in order for a swap to be possible.

Formation Effects

Standing cards can be arranged in formations so as to create certain offensive or defensive bonuses; however, these bonuses only apply when at least one force card is based in each of the standing cards in the formation. There are four formations:

Front-back formation—back force card gains an extra attack each turn, if and only if it has a range weapon attack, which term also includes a breath weapon (FIG. 37A)

Twins formation—each force card member of twin formation gains a bonus of +1/+1 (FIG. 36)

Flanking formation—focus force card gains bonus of +3/0 (FIG. 34)

Defensive formation—focus force card gains a bonus of 0/+3 (FIG. 35)

Bonuses from formations are cumulative as shown in FIG. 37B. For instance, a card could be in twin formation with respect to one card and defensive formation with respect to two others, and thus receive a total bonus of +1/+4.

A force card is said to be in "isolation" when it is based in a standing card that plays no role in any formation.

Spells

Certain cards have the ability to cast spells during the spell/combat phase of a user's turn. There are three types of spells:

Battle
Cultural
Persuasion

For each type of spell, there are approximately six spells, each having unique effects as described in the Spellbook (below). When casting a spell, a player designates the target of the spell as per the conditions of the spell. When a card indicates that it is "immune to" a certain type of spell, the meaning of that immunity is detailed in the description of the spell itself.

Spell attacks are treated as combat attacks, except that the spellcaster is not at risk of destruction. For instance, if a spell of 5/0 is cast against a force with a defense strength of 6, the attacking and defending players each roll a six-sided die, and the defending card gets a +1 (6−5=1) advantage. If the defending card loses or ties, it is destroyed. If it wins, nothing happens.

Spell-casting cards can only cast one spell per round unless otherwise noted on the card. Casting a spell does NOT prevent a card from undertaking a combat or movement action (attack, block or move to another standing card), i.e., does not result in the card being "spent."

Combat: Card Attack

During the combat phase of the player's turn, he or she may elect to make a "card attack" or a "direct attack." In a card attack, a particular standing card of an opponent is identified and attacked with a particular force card of the attacking player. Combat then occurs as follows.

The attack rating, with all modifiers, of the attacking card is compared to the defense rating, with all modifiers, of the toughest defensive force card on the standing card being attacked. (Cards that are "spent" cannot defend.) The difference is found to produce an "advantage." For instance, if a dragon with an attack strength of 10 attacks a knight with a defense strength of 7 and bonus of 0/+1 (making for a total defensive strength of 8), the difference is 2 (10−8=2), making for an advantage of "2" for the dragon.

Each player then rolls a d6 and the advantage is added to the roll of the card with the advantage. The highest total roll, i.e., number rolled plus, in the case of the card with the advantage only, the number of advantage, wins. Thus, in our example, if the dragon rolls a 2 and the knight rolls a 3, the dragon, with an advantage of 2, will have a total roll of 4 and will therefore prevail over the knight's roll of 3. If a tie results, both cards are destroyed. Destroyed cards are placed in the player's discard pile.

If the attack is successful, the attacking card is placed under the standing card on which it is based for the remainder of the round, to indicate that the card is "spent" for that round, i.e., it cannot attack, block or defend again. Cards with the special ability of having more than one attack per round are not spent until they have used all their attacks per the instructions on the card itself. A successful defending card is not spent; a card can defend infinitely without being spent, although blocking results in a card being spent.

Combat: Direct Attack

In a direct attack, the attacking player designates an opponent and an attacking card. The selected opponent then decides whether to "block" the attack or to let the attack pass through. The defending opponent can block with any active, unspent force card. If he or she blocks, combat is followed as in a card attack, except that the blocking card, if it survives, is spent after the successful block, unless it has a special ability of being able to engage in more than one block per round.

If the direct attack is not blocked, then the opponent being attacked can choose to "absorb" the attack.

If the attack is absorbed, the defending player loses a number of handicap points that equals the number of basic attack points—without ANY modifiers—the attacking card has. If a player does not have enough handicap points, an attack cannot be absorbed.

If the attack is not absorbed, the defending player loses cards directly from his or her draw pile itself in a number that equals the number of the basic attack strength of the attacking card minus a roll of one d6, but at least one card is lost.

A player is eliminated by the first direct attack against that player that goes unblocked and unabsorbed when that player has no draw pile remaining at the time of the direct attack.

Collateral Damage

Certain force cards have the ability of collateral damage, which means that, when a direct attack is blocked but results in destruction of the blocking card, victory margin points, if any, can cause direct damage.

For instance, if a dragon with collateral damage ability destroys a blocking rider by a total roll of 7 to 2, a margin of victory of 5 points results, meaning that 5 points of direct attack are lodged at the attacked opponent, who must either absorb the attack or lose cards in the amount of 5 minus a d6 roll. In the case of collateral damage however, there is no minimum number of cards lost; if a 5 or 6 is rolled in our example, all 5 direct attack points are neutralized.

Collateral damage cannot be blocked, but certain cards have a special ability to absorb collateral damage that would have otherwise occurred.

Pillage

Certain force cards have the ability of pillage, which means that, when a card attack is successful such that a defending card is destroyed, if there are no remaining, unspent defenders in the standing card attacked, the standing card is destroyed and placed in the discard pile. Any spent forces based in the standing card that is pillaged are also destroyed. A card with pillage automatically destroys an undefended standing card that it attacks.

Pillage damage cannot be avoided except by deployment of cards which have a special ability to prevent pillage that would otherwise occur.

Occupy

Certain force cards have the ability of occupy, which means that, when a card attack is successful such that a defending card is destroyed, if there are no remaining spent and unspent cards based in the attacked standing card, the attacking player can base forces in the attacked standing card unless or until it is recaptured. However, no benefits are received from an occupied standing card for based forces, and it cannot be used in a formation.

Handicap Points

Handicap points can be gained through a number of ways, such as selecting a playing deck that is understrength or through deploying a card that causes periodic gains of handicap points.

A maximum of ten or twenty (set by user choice) handicap points at any given time is allowed. Any gains in excess of this maximum are lost immediately.

Handicap points have a number of uses. One crucial use for handicap points is that of absorbing of direct attacks. Absorption prevents the loss of cards out of a player's draw pile that would have otherwise occurred through a direct attack. Handicap points may also be exchanged for certain benefits available to a given card as specified on the card itself.

"Spent"/"Unspent"

Force cards are said to be spent after they have been used to attack or block in a turn. Spent cards are placed under the standing card in which they are based until the beginning of the player's next turn. They cannot defend against attacks upon the standing card in which they are based, nor attack, block or move again during that round (unless the given card has multiple attacks or blocks per round and has at least one such action remaining).

Spent cards are moved out from under the standing card in which they are based at the beginning of a player's turn and returned to "unspent" position, from which they can act again, i.e., attack, block, or move.

Casting a spell does NOT cause a card to be spent. And if a card has the ability to cast a spell that can be cast during another player's turn, such as the spell "Virtue," then the card can still cast that spell, regardless of whether it is in spent or unspent position.

Advanced Game Enhancements

Players who have mastered the basic game may wish to incorporate additional elements as described below.

Bidding

At the beginning of each round, each player bids the number of force cards he or she expects to have active at the end of the round. Bids are then compared to the actual number of force cards each player has in the game at the end of the round. Perfect bids gain the player 3 additional handicap points. Inaccurate bids lose the player the number of handicap points equaling the margin of error of the bid. For instance, if a player bids "3" and has "5" at the end of a round, he or she loses 2 handicap points.

Months

At the beginning of the game, a d6 is rolled to determine the starting month of the game, January (a roll of 1) through June (6). At the beginning of each turn thereafter, the month advances by one month. A twelve-sided die is turned each round to indicate the month by number.

Some force cards have month modifiers, specified on the card itself, such that, during that month, certain additional effects are in force with respect to that card.

Seasons

The season is determined by the current month:

December-February: Winter
March-May: Spring
June-August: Summer
September-November: Fall Some force cards have a seasonal modifier, specified on the card itself, such that, during that season, certain additional effects are in force with respect to that card.

Formation Effect Modifiers

Some force cards have formation effect modifiers, specified on the card itself, such that, when the card is in a given formation, certain additional effects are in force with respect to that card.

Standing Card Deployment/Basing Limitations

Some force cards can only be deployed and/or based in certain types of standing cards. These limitations are specified on the card itself and apply throughout the game.

Spellbook

Battle Spells

Lightning Bolt

Attack of 5/0 delivered against designated card, unless immune to battle spells. Attack can be blocked by card of opponent's choice, but blocking card must roll a "2" or higher (d6) or be immediately destroyed, regardless of defense points.

Warhammer

Designated opponent must roll a "2" or higher (d6) or casting player gets to move up to three of opponent's standing cards that are in a single formation into isolation. Formations in which all standing cards have at least one based force card that is immune to battle spells cannot be broken up by this spell.

Thunder

Each knight, rider and ranger card of a designated opponent must roll a "2" or higher (d6). Failing forces, except those immune to battle spells, lose control of their mounts and return to the given opponent's hand.

Virtue

Player selects one card for a 0/+4 bestowal that lasts the entire round. This spell can be cast during an opponent's turn in response to a spell or a combat attack by an opponent. This bestowal can be used to benefit any card, even those that are "immune to all spells."

Hail Storm

Designated opponent must roll a "2" or higher (d6) or designated opponent's range and breath weapon attacks are nullified and range-weapon-using forces are neutralized (cannot block or attack but CAN defend themselves) for entire round, except those immune to battle spells.

Landslide

Designated opponent must roll a "2" or higher (d6) or lose a standing card of player's choice, except one in which is based a force card that is immune to battle spells (or all spells). If a force card is based on the removed standing card, the based force card is returned to opponent's hand.

Cultural Spells

Propagate

Upon casting, player can deploy an additional standing card from his or her hand.

Clairvoyance

Player gets to view the top card of designated opponent's draw pile. If the viewed card is not immune to cultural spells, player gets to view the next card, and so on until a card that is immune to cultural spells appears. (Opponent does not get to see any of the cards that casting player sees.) Once viewing is stopped, cards are returned to opponent's deck in original order.

Opportunity

Player can rearrange all formations at beginning of his or her turn. Formation effects apply immediately.

Renaissance

Player must sacrifice one card randomly selected from draw pile but then can re-stack draw pile as he or she wishes. If randomly selected card is immune to cultural spells, the spell is effective but the card drawn is not sacrificed but rather returned to the bottom of the draw pile after restacking.

Broken Heart

Designated card must roll a "2" or higher (d6) or suffer an attack of 9/0. If saving roll fails, formation effects do not apply to defense points. This spell CANNOT be used against wood creatures or Valkyrie.

Rejuvenation

Player gains +1 handicap point.

Persuasion Spells

Resurrection

Player can spend five handicap points to attempt to return top card of discard pile to the bottom of the draw pile. If top card of discard pile is immune to persuasion, attempt fails.

Anarchy

Designated opponent must roll a "2" or higher (d6) or draw top card of draw pile. If card drawn is not immune to persuasion, designated opponent must shuffle deck. If immune to persuasion, top card is returned to top of deck.

Numbness

Designated opponent must roll a "2" or higher (d6) or cannot move standing cards this turn. Force cards that are immune to persuasion can still move from one standing card to another.

Summon Allies

Player can deploy an additional force card this turn, except one that is immune to persuasion.

Guillotine

Designated royalty, courtier or courtesan card in opponent's hand must roll a "2" or higher (d6) or be immediately destroyed, unless it is immune to persuasion.

Propaganda

Designated opponent must roll a "2" or higher (d6) or immediately discard one force card from current hand that is not immune to persuasion. If opponent's hand holds no force cards that are not immune to persuasion, spell is repulsed automatically.

Undead Army

This spell enables player to attack once with top card from player's own discard pile, unless it is immune to persuasion After attack is completed, card is returned to top of discard pile.

Backstabbing

Designated card must roll a "2" or higher or suffer an attack of 9/0 as if delivered by an assassin, unless the attacked card is immune to persuasion. Spell can be blocked by forces with assassin-blocking abilities. If saving roll fails, formation effects do not apply to defense points.

For more information on Myths & Magicry™, contact:
Inventerprise®
www.inventerprise.com
©2004-2005 Inventerprise®. All rights reserved.

III. User-Created Card System

A disclosed method provides a user access to an Internet-accessible site through which he or she may create a custom card for use in a collectible card game that is acceptable under the rules thereof, submit this card for approval by the gaming community, and earn a royalty through distribution and sale of this card. Numerous disclosed methods allow revenue generation in connection with user-created cards while also allowing disclosed methods of preventing piracy of such cards.

Figure 42:
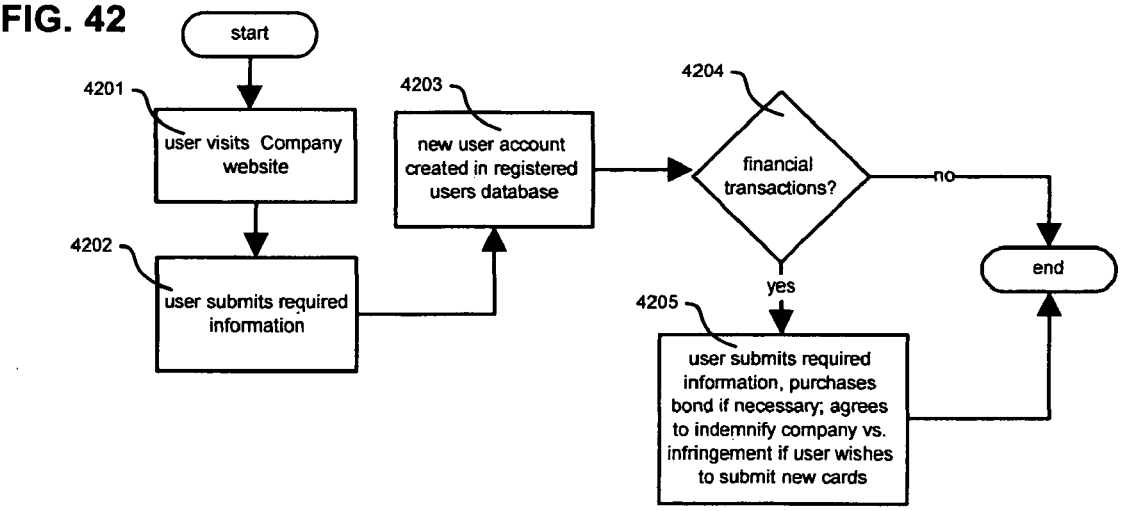
FIG. 42 is a flowchart depicting a method whereby a user registers to use a company web site according to the present invention.
Figure 43A:
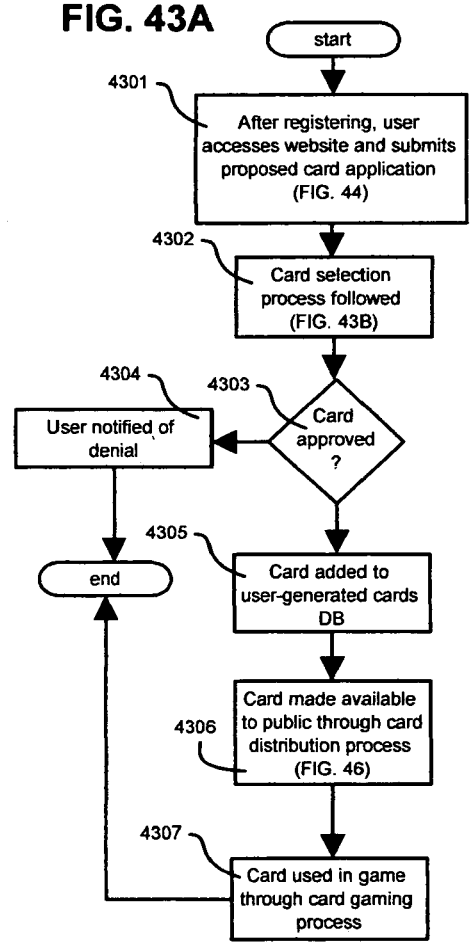
FIG. 43A is a flowchart depicting a method whereby a user-created card is added to a set of officially sanctioned cards according to the present invention.
Figure 44:
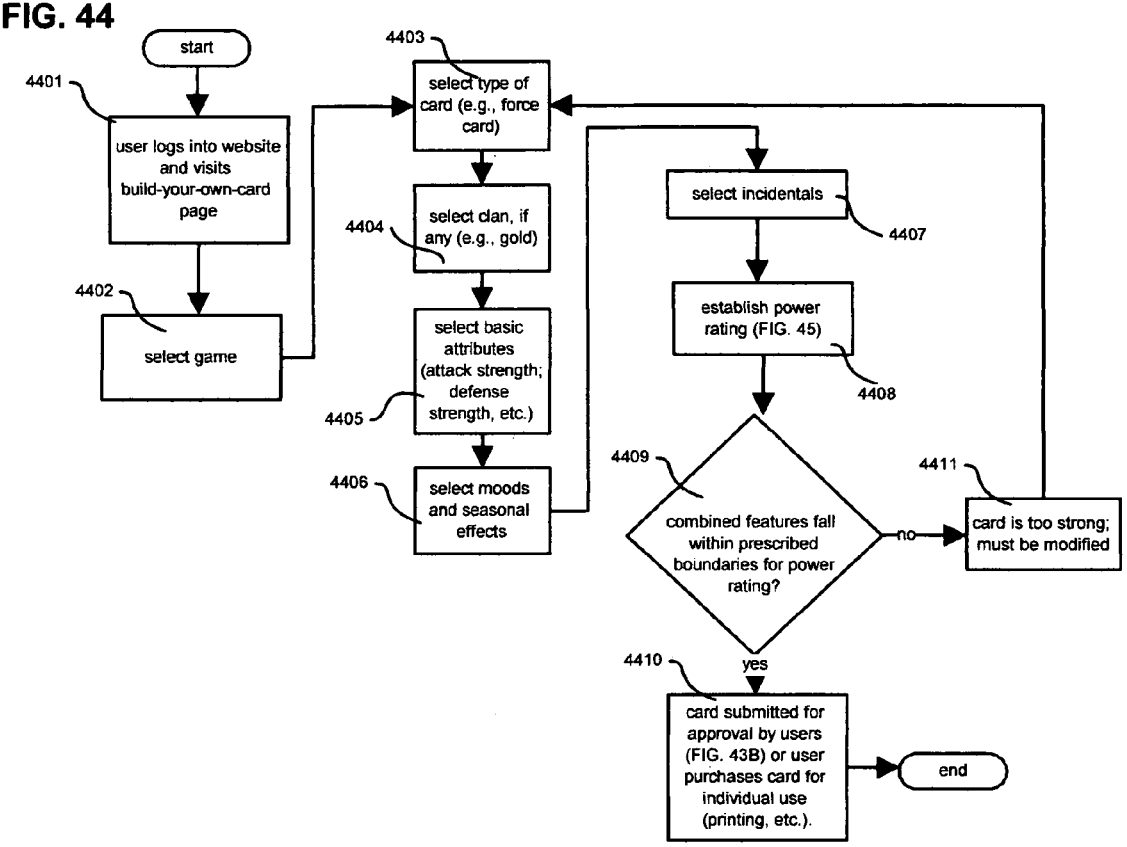
FIG. 44 is a flowchart depicting a method whereby a user creates a card according to the present invention.
Figure 45:
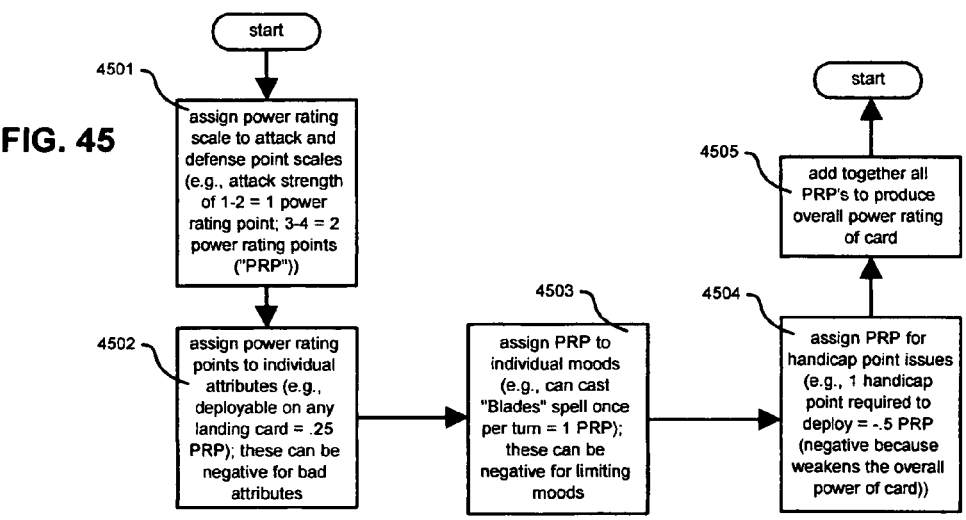
FIG. 45 is a flowchart depicting a method whereby a power rating is established for a card according to the present invention.

First, a user registers with a company through the process depicted in FIG. 42. A user may be required to purchase a noninfringement bond 4205 and/or indemnify the company against infringement liability if the user wishes to submit new card designs or participate in financial transactions, since the company will have no way of knowing whether the designs submitted by the user are violative of the rights of other intellectual property owners. Thereafter, a user follows the process depicted in FIG. 43A with reference to FIGS. 44 and 45 in order to create and submit a card for approval by the relevant card game community. If the user attempts to create a card that is too strong 4408 according to the power rating assigned to this card through the process in FIG. 45, the user's submission will be automatically rejected. This process minimizes the likelihood of creation of a "killer card" that would throw off the balance of the game and thereby make it uninteresting.

Figure 43B:
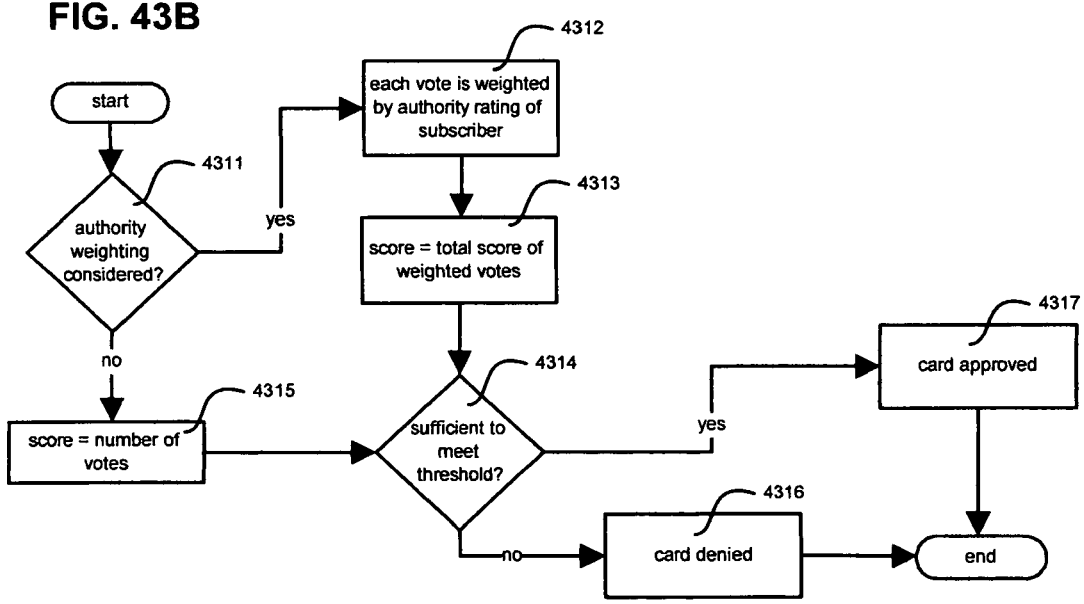
FIG. 43B is a flowchart depicting a method whereby a user-created card is approved or rejected for addition to a set of officially sanctioned cards according to the present invention.

The community can approve or disapprove the user's proposed card through the process depicted in FIG. 43B. The community approval process can be done by a one-person/one-vote approach, or individual users in the community can be granted special "authority weighting" that causes their votes to be counted more heavily than the votes of other members of the community. An authority weighting can be based on the length of time that a user has been a registered user, the number of card designs that the user has submitted that were later selected as an official card, or some other criterion. The score of a new card design is calculated either with 4313 or without 4315 authority weighting. If the proposed card, which has already survived the process depicted in FIG. 44, receives enough votes to meet or exceed a predetermined threshold, it is approved 4317 and automatically becomes an officially sanctioned card. Otherwise, the card fails to become approved 4316.

If the card is approved 4303, the card is added 4305 to the cards database (see FIG. 50) and made available to the public 4306 through the distribution process depicted in FIG. 46 The card is then used 4307, along with other cards created by the company or by other users, in playing games.

A card distribution process is depicted in FIG. 46. Once a user-submitted card has been approved, the card creator logs into the company website 4601 and sets a price 4602 at which copies of the card design created by the user are to be sold. The card creator then uploads his or her logo or other branding graphic 4603 to be included on copies of the card design (e.g., 3909 in FIG. 39). The card creator then sets the total quantity of cards to be made available and other criteria, such as whether the card will be made available through download from the company's website or printed in advance 4604.

If the card creator decides to make the card available through download 4605, a card purchaser can log into the company website 4606, upload his or her own branding seal 4607, purchase blank sheets for printing cards on 4608, download card printing software 4609, and purchase the card 4610.

The card image file is then created, including the barcode image of the unique serial number of the card 4611 to be printed, as well as the branding seal of the card creator and the branding seal of the card "pooler", i.e., the original purchaser of this particular card function. The resulting image file is then provided to the user for printing through the card printing software 4612 previously downloaded. The user prints the card 4613 and notifies the company that the card has printed successfully 4614, at which time the card and the registered user are added to the official registry database 4616. If the card is later sold 4617, the new owner updates the official card registry 4618.

If the card creator decides to go for a print rather than download approach, the cards are printed in the quantity specified 4619 by the creator, and typically, the creator is charged for the price of the print run 4622. The card is sold through retail channels 4621, and a royalty is paid to the card creator on each sale 4623; this is essentially a consignment model. Whenever a new purchaser buys a card through this model, the new owner registers that ownership in the official registry 4624.

Anti-Counterfeiting Techniques

Figure 47A:
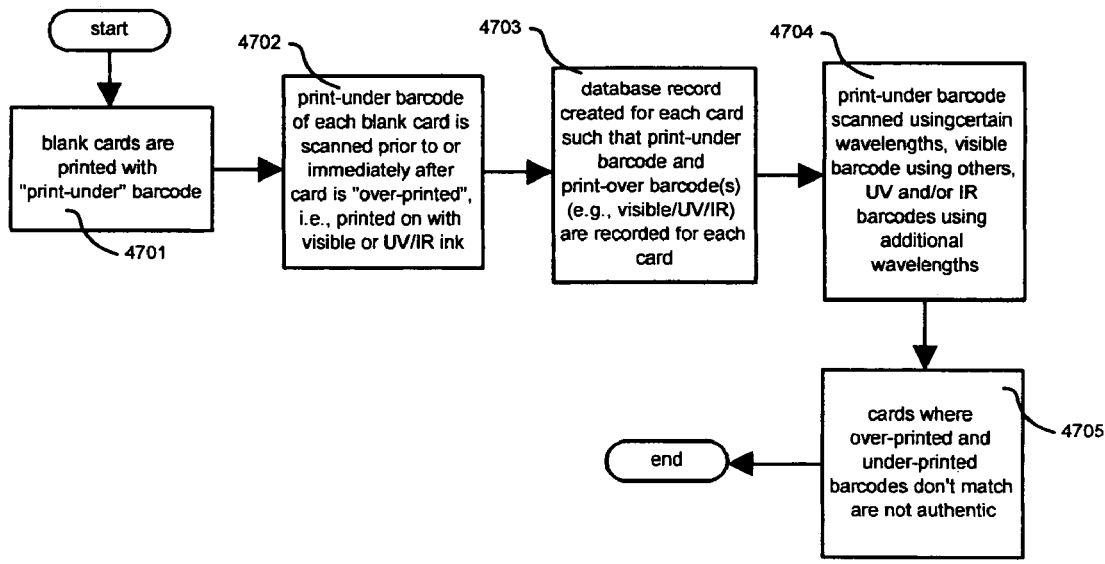
FIG. 47A is a flowchart depicting a method whereby a print-under barcode is used to identify unauthentic cards according to the present invention.
Figure 47B:
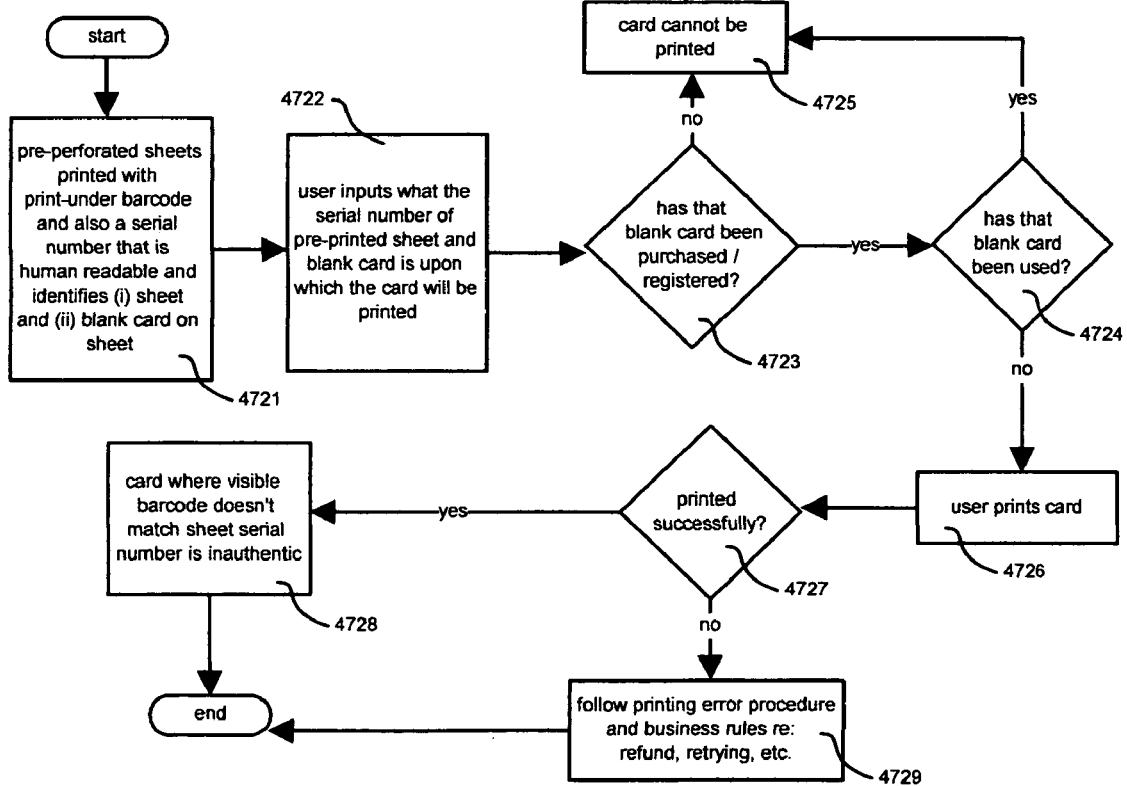
FIG. 47B is a flowchart depicting a method whereby a user prints a card according to the present invention.

FIG. 47A depicts a process for use in a function of the present invention that makes use of a "print-under" barcode, i.e., a barcode that can only be viewed with penetrating energy frequencies, e.g., X-rays, rather than reflective light, for protection against counterfeiting. FIG. 47B depicts a process whereby a print under barcode can be used for security purposes even after the card has been printed on, i.e., "overprinted," by a user.

Figure 48:
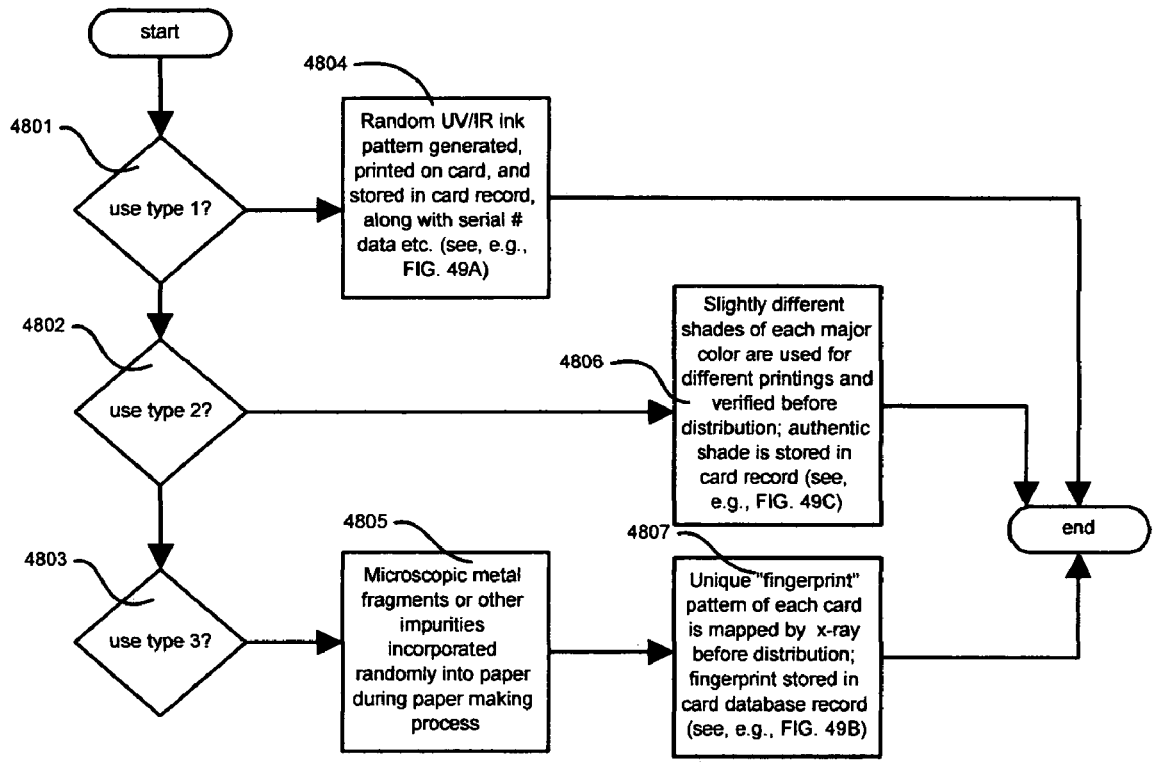
FIG. 48 is a flowchart depicting a method whereby one of three different antipiracy techniques is selected according to the present invention.
Figure 49A:
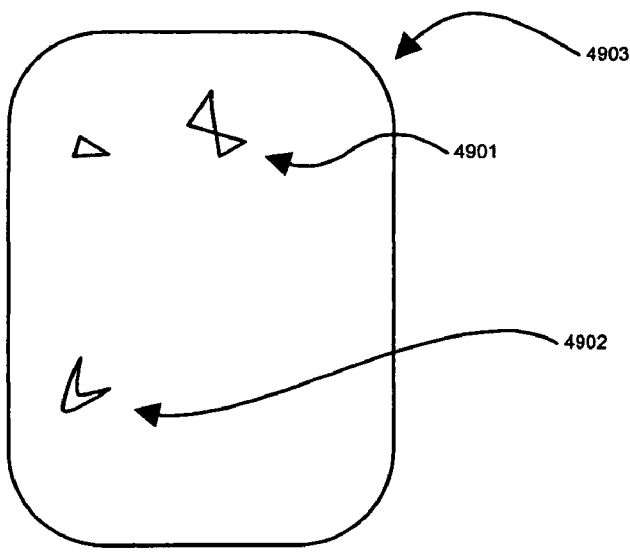
FIGS. 49A through 49C depict examples of techniques used in antipiracy according to the present invention.
Figure 49B:
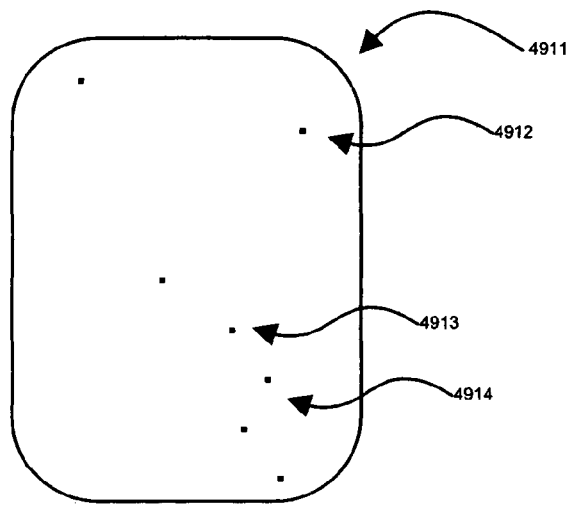
Figure 49C:
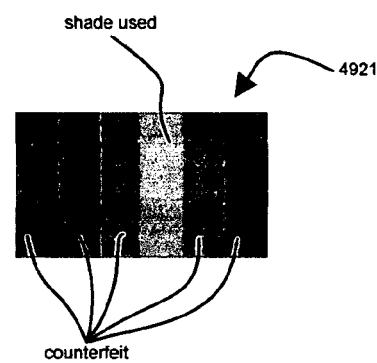

FIG. 48 depicts a process whereby one of three additional antipiracy techniques can be used. Under one technique, a random pattern is generated and printed on a card with ink (UV or IR) that is only visible with ultraviolet or infrared light 4804; an example of such a pattern appears in FIG. 49A. Under another technique, slightly different shades of ink are used during different printing runs and correlated with cards 4806; cards that appear to be identical but do not use the same shade of ink are counterfeit, as per the comparison depicted in FIG. 49C. Under another technique, impurities are added 4805 to the paper upon which cards are printed; these impurities are mapped using penetrating light so as to produce a unique fingerprint for each card 4807. This fingerprint may also be recorded in a barcode printed on the card itself and can be used to authenticate cards thereafter. An example of such a fingerprint is depicted in FIG. 49B.

Figure 50:
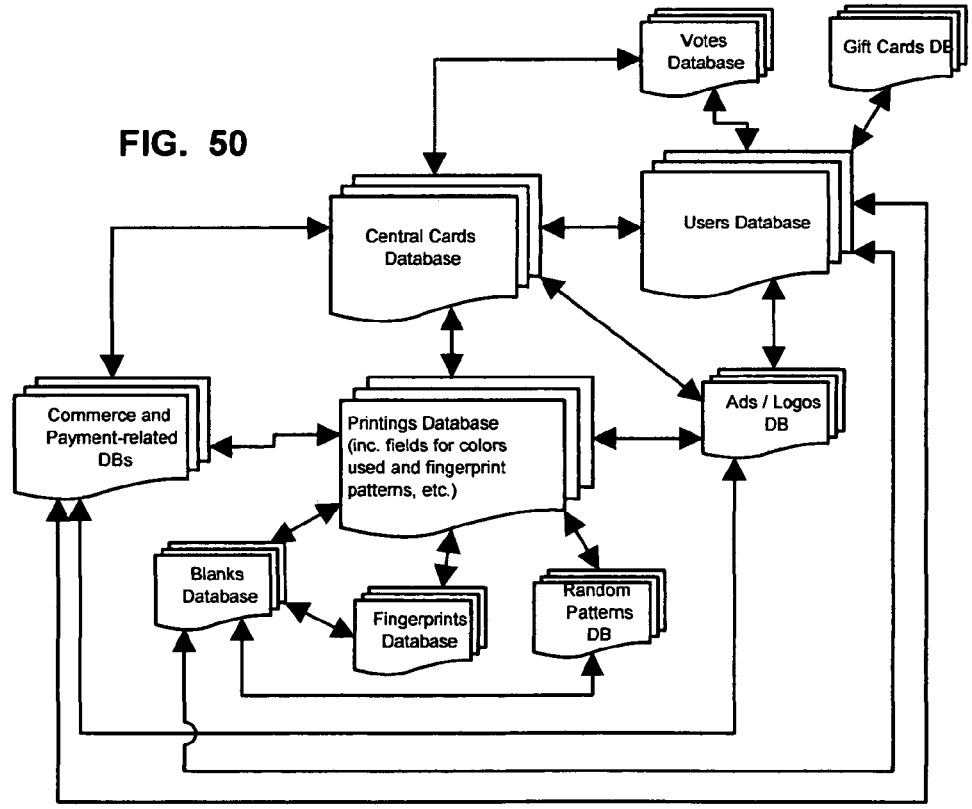
FIG. 50 is a schematic diagram depicting primary relationships between a series of databases according to the present invention.
Figure 51:
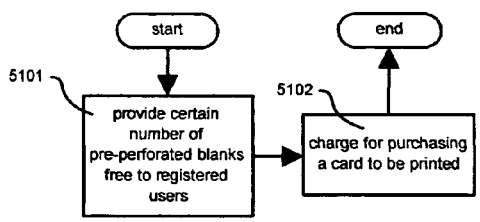
FIGS. 51 through 57 are flowcharts depicting methods whereby revenues are generated according to the present invention.
Figure 52:
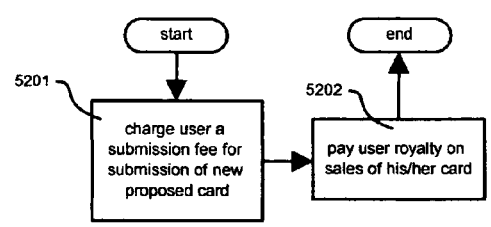
Figure 53:
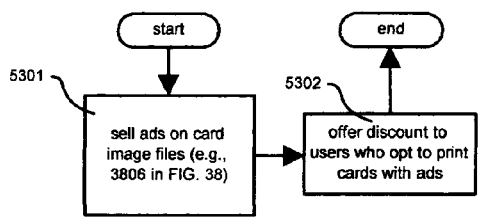
Figure 54:
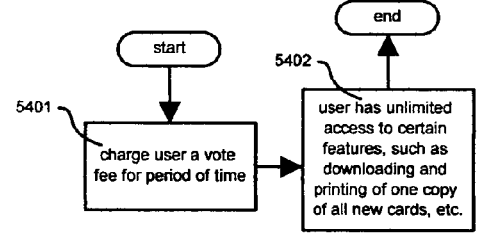
Figure 55:
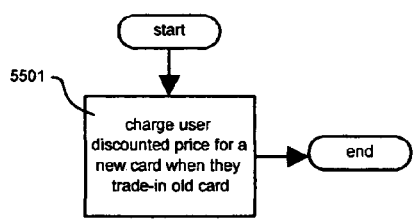
Figure 56:
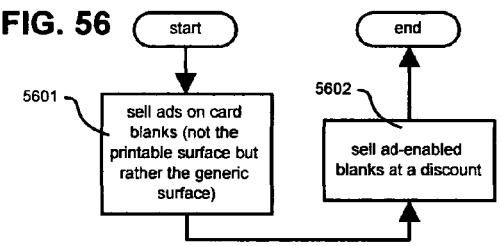
Figure 58:
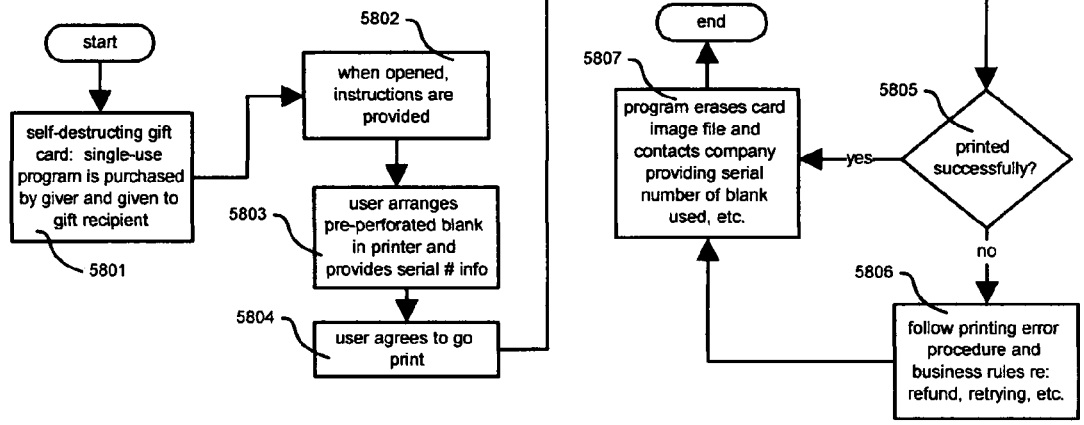
FIG. 58 is a flowchart depicting a method whereby a single-use computer program is used according to the present invention.

FIG. 50 depicts core databases and relationships therebetween for use in the user-created card system. FIGS. 51 through 57 depict some, although clearly not all, revenue models for use in commercializing the present invention. FIG. 58 depicts a method whereby a self-destructing, i.e., single-use, program is used to allow an electronic gift of a collectible card to be given without the risk of unauthorized duplication.

IV. Board Game System

A disclosed board game system includes a disclosed method whereby standard chess pieces (i.e., eight pawns, two rooks, two bishops, two knights, a king and a queen for each of two players) are used in a game of chess that incorporates novel processes. In particular, the chessboard itself is "played" one square at a time. Meanwhile, each chess piece can only get into the game by being deployed on an available square after that square has itself been deployed. After deployment, each chess piece is moved and victory is achieved according to the standard rules of chess, except that movement of a piece is limited to already-deployed tiles.

Figure 59:
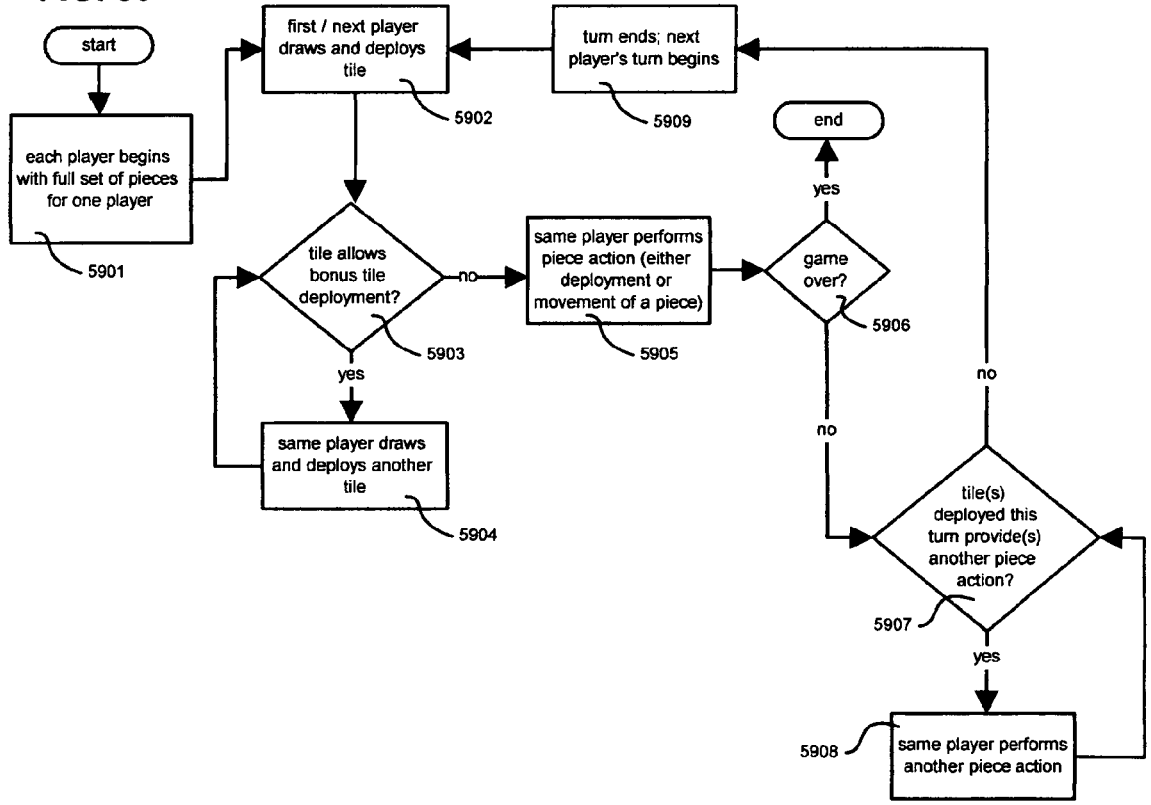
FIG. 59 is a flowchart depicting a method whereby a game is played according to the present invention.

A novel method of playing chess according to the present invention is depicted in FIG. 59. At the beginning of the game, each player has a complete set of chess pieces 5901, none of which are on the chessboard. A group of sixty-four tiles (one for each square of the chessboard) from which both players will draw one tile per turn is also provided, but none of these tiles are on the chessboard at the beginning of the game. Thirty-two black and thirty-two white tiles are provided.

During the first player's turn, he or she draws 5902 a tile from the common pool of tiles and places 5902 this tile somewhere on the chessboard in a square that matches the color of the tile. He or she may then be able to deploy a chess piece on the deployed tile 5905. However, non-pawn pieces (bishop, rook, knight, king, queen) can only be deployed, i.e., first brought onto the board, on a square that is in the back row of squares, i.e., the row of squares in which these pieces begin a standard game of chess. Pawns can only be deployed on a square in the second row of squares on the board, i.e., the row of squares in which pawns begin a standard game of chess.

The first chess piece that a player deploys in the game must be the player's king. Thereafter, there is no fixed order for deployment of pieces.

Once a player's turn is finished, the other player's turn begins. Play proceeds by turns until checkmate or stalemate is achieved as in a standard game of chess.

Figure 60A:
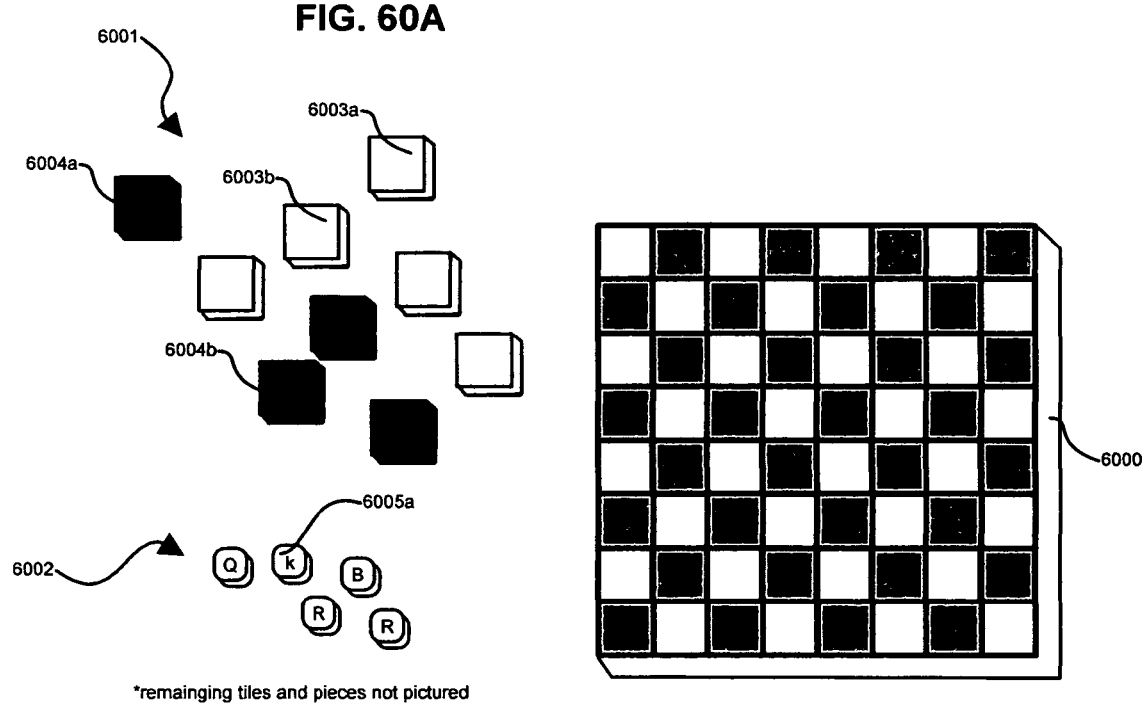
Figure 60B:
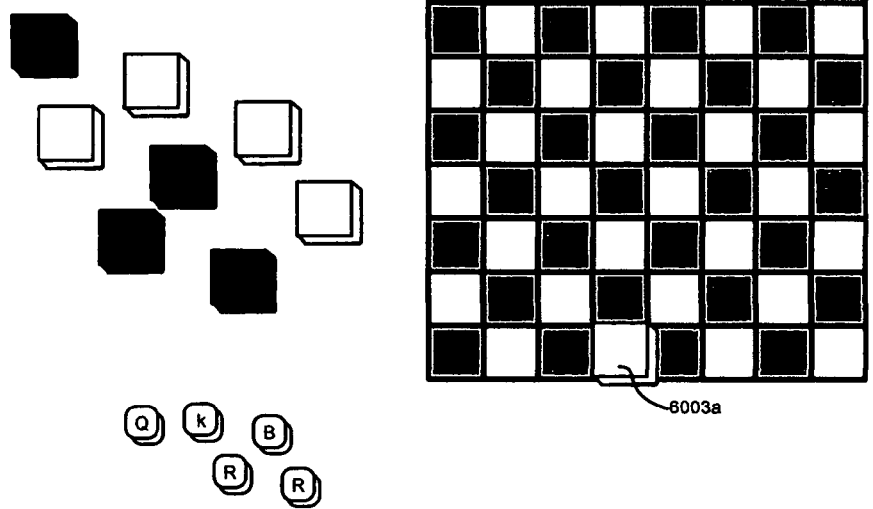

Thus, for illustration, an example chessboard 6000, a group of tiles 6001 (not all 64 tiles are depicted), and a group of chess pieces 6002 (not all thirty-two chess pieces are depicted) according to the present invention are shown in FIG. 60A. An example of a first move in a game is depicted in FIG. 60B: a white tile 6003a is deployed on a white square of the chessboard 6000.

An example of a second move in a game is depicted in FIG. 60C: the first player deploys his or her king 6002a on the already-deployed white tile 6003a. This move completes the first player's turn in our example. Each turn thus consists of a tile action (deployment of a tile) and a piece action (one of either (i) deployment or (ii) movement of a chess piece).

An example of a third move in a game is depicted in FIG. 60D: the second player, in his or her first turn, draws and deploys a black tile 6004a on a black square of the chessboard 6000.

Figure 60E:
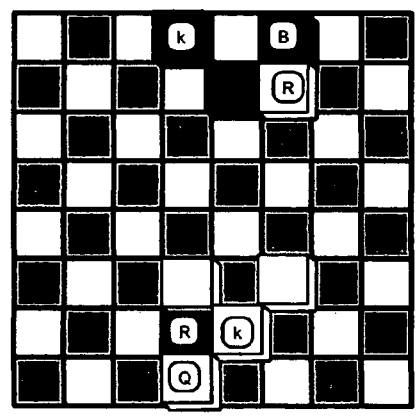
Figure 60F:
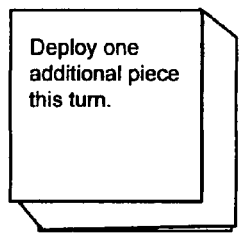
FIGS. 60F through 60K depict novel game pieces according to the present invention.
Figure 60G:
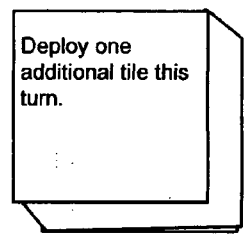
Figure 60H:
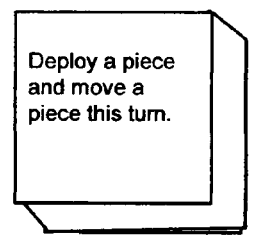

An example of the progress of the example game is depicted in FIG. 60E. At the depicted point in the game, the first player has deployed five tiles and three chess pieces, as well as used his or her piece action to move two of these chess pieces. The depicted scenario would be the result of the first player's first five turns as follows:

Turn 1: tile action: deploy white tile as per FIG. 60B; piece action: deploy king on white tile in back row as per FIG. 60C Turn 2: tile action: deploy white tile diagonally adjacent to previously deployed white tile; piece action: move king diagonally to most recently deployed white tile Turn 3: tile action: deploy black tile squarely adjacent to both previously deployed white tiles; piece action: deploy rook on white tile in back row Turn 4: tile action: deploy white tile squarely adjacent to already-deployed black tile; piece action: move rook to already-deployed black tile Turn 5: tile action: deploy white tile diagonally adjacent to white tile upon which king is currently situated; piece action: deploy queen on white tile in back row The second player in the depicted scenario has had four turns as follows:

Turn 1: tile action: deploy black tile as per FIG. 60D; piece action: deploy king Turn 2: tile action: deploy second black tile in back row; piece action: deploy rook Turn 3: tile action: deploy white tile squarely adjacent to second black tile in back row; piece action: move rook to white tile Turn 4: tile action: deploy black tile diagonally adjacent to both black tiles in back row; piece action: deploy bishop Certain tiles in the tile pool may include information on the face of the tile that is unique to the given tile and allows special actions to be taken during the turn in which the given tile is played. If a player plays 5903 a tile such as the tile depicted in FIG. 60G, that same player gets to draw and deploy another tile during the same turn before his or her piece action 5904. Similarly, if a player plays 5907 a tile such as the tile depicted in FIG. 60F, that same player gets to deploy an additional chess piece during his or her piece action of the same turn, but only, of course, if a tile is available upon which a chess piece can be deployed. FIG. 60H depicts another tile that allows special benefits.

Figure 60I:
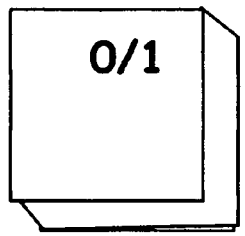
Figure 60J:
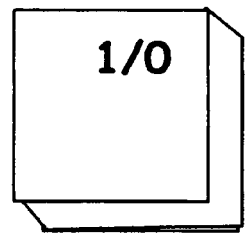
Figure 60K:
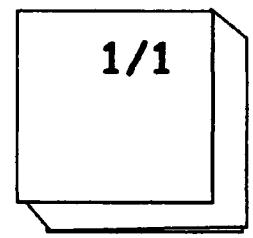

Alternately, special benefits can be indicated simply by a pair of numbers: the first number representing additional tile deployment benefits, and the second number representing additional piece action benefits. Thus, using this approach, the tile depicted in FIG. 60(I), which reads "0/1", would allow an additional piece action to be performed during the turn in which the depicted tile was deployed. The tile depicted in FIG. 60J, which reads "1/0", would allow an additional tile to be drawn and deployed during the turn in which the depicted tile was deployed. The tile depicted in FIG. 60K, which reads "1/1", would allow both an additional tile to be drawn and deployed and an additional piece action to be performed during the turn in which the depicted tile was deployed.

Figure 60L:
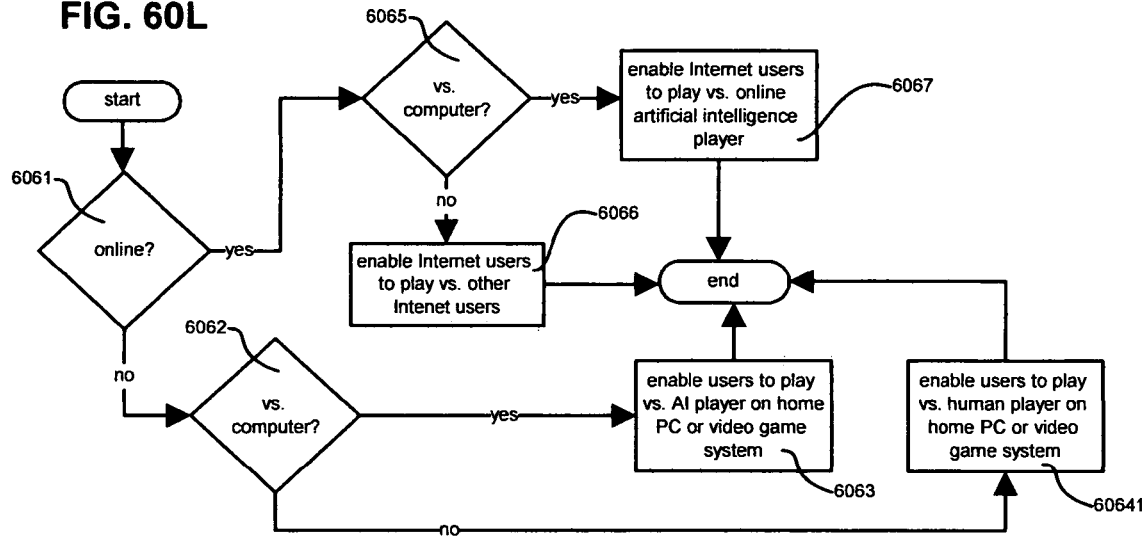
FIG. 60L is a flowchart depicting a method whereby a noncomputer game according to the present invention is converted to a software form suitable for use of the present invention by computer.

FIG. 60L depicts the process whereby a card game or chess game according to the present invention is converted to software form so that it can be played either (i) online against an artificial intelligence opponent 6065 or a live human opponent via the Internet 6064 or (ii) locally on a desktop or laptop computer or home computer game console against an artificial intelligence player 6066 or live human player 6067.

V. Random Number Replacement System

A method is disclosed whereby events in computer games or live role-playing games (RPG) that are conventionally resolved through the use of a random number, either through computer-generated random number in the case of computer games or through dice roll in the case of RPG, are instead resolved through user performance of a task. This task can be performed individually, which method is probably preferable in the context of a computer game, or collectively with other players, which method is probably preferable in the context of RPG. This task can be of a purely fun nature, as in the disclosed methods of using pre-existing games to produce random numbers, or of an educational, academic, or test preparation value, as in the disclosed methods of using questions which test and develop mental skills and knowledge.

Figure 61A:
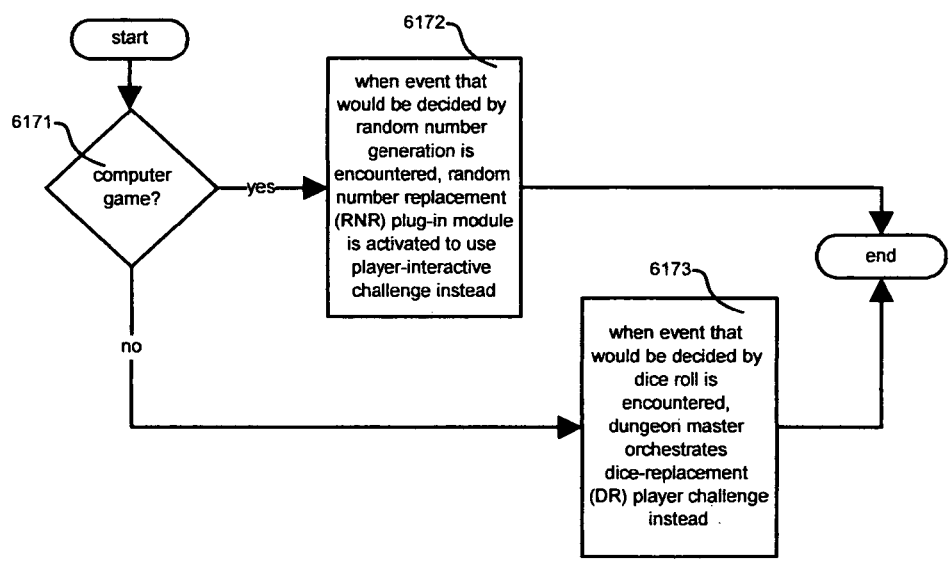
FIG. 61A is a flowchart depicting a method whereby a task is substituted for a random number in a game according to the present invention.

For instance, in the present invention, a threshold used in a RPG is determined conventionally according to the rules of the given role-playing game (e.g., armor classes, attack bonuses, strength bonuses, etc.), but instead of a dice roll being compared against the threshold, a player's performance at a particular task is measured and compared against the threshold to determine success or failure. Thus, the disclosed method is, in general terms:

1. Determine threshold (on a scale of 1 to 20, as usual in a d20 setting)
2. Have player perform task
3. Grade performance on scale of 1 to 20
4. Compare performance to threshold to determine success or failure FIG. 61A depicts the basic method whereby the present invention is used to replace the function served by a random number in a computer game 6172 or a RPG 6173. Specifically, when an event occurs in a computer game that would conventionally give rise to the use of a random number, a novel random-number-replacement ("RNR") software program according to the present invention is prompted to provide a number or result—by challenging the player of the computer game to perform an interesting task—to the computer game software that is then used by the computer game software to resolve or calculate the event giving rise to the need for a random number 6172. Similarly, when an event occurs in a role-playing game that would conventionally be resolved by dice roll, a number or result is instead generated by challenging the player who would otherwise be performing the dice roll to perform an interesting dice replacement ("DR") task instead 6173.

Typical situations in which a random number is used in a computer game or RPG context can be divided into two types: (i) binary result situations (win/lose, live/die, etc.) and (ii) graded result situations (a mediocre roll produces mediocre results, a very high roll produces excellent results, etc.).

Figure 61B:
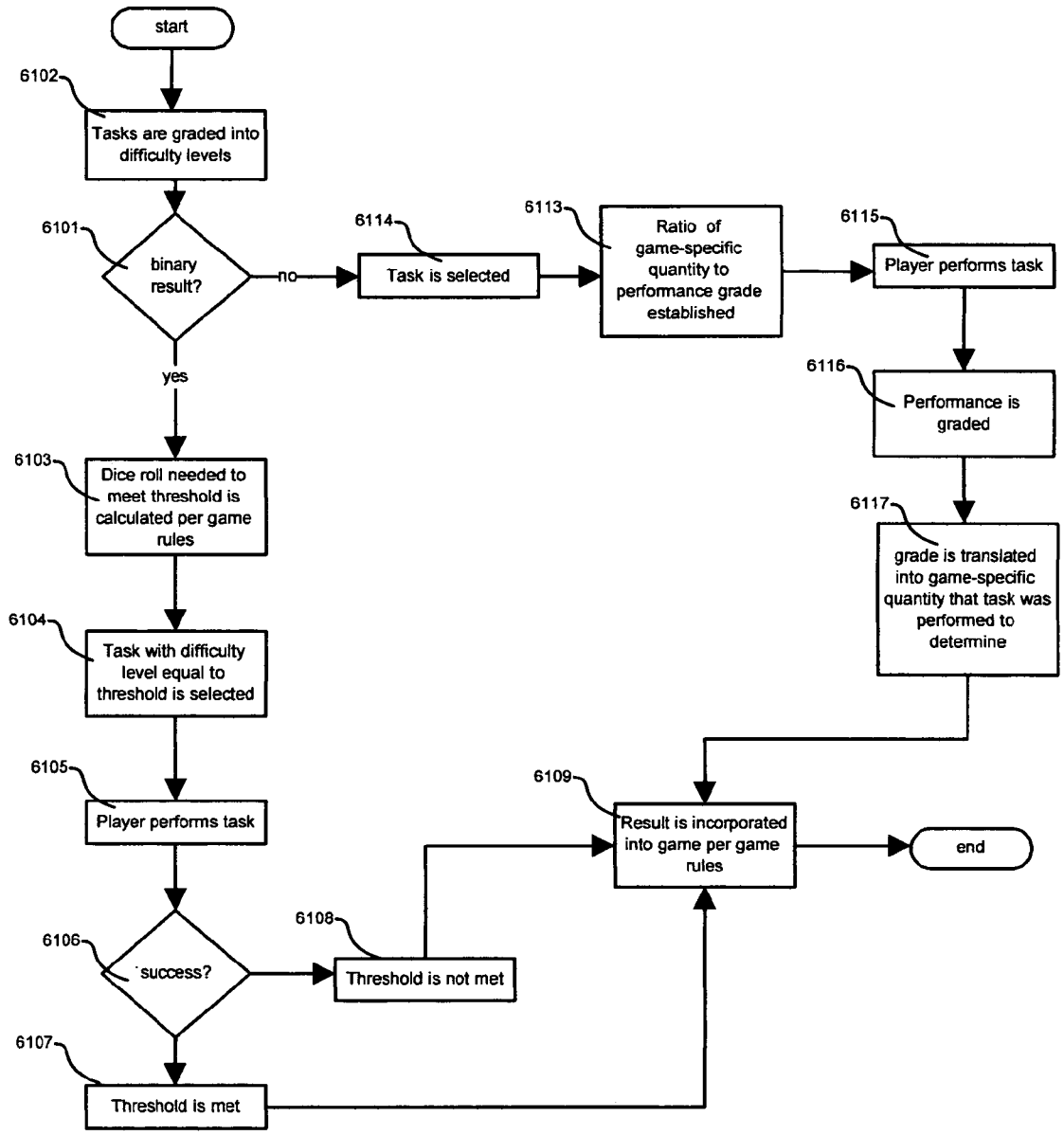
FIG. 61B is a flowchart depicting a method whereby a binary or a graded result is produced through user performance of a task according to the present invention.

FIG. 61B depicts a disclosed method whereby both situations are fully addressed by the present invention in the context of a RPG so that a binary result or a graded result can be produced through a user-performed task. First, potential tasks to be performed by a user are separated into various levels of difficulty 6102. If a binary result is needed 6101, a threshold according to the given game rules is calculated 6103 and a task with a difficulty level appropriate to the likelihood of success in meeting the threshold using a random number is selected 6104, i.e., if the event to be resolved would have a very low likelihood of success, a very difficult task is selected. The player then performs the task 6105. If the task is performed successfully 6106, the threshold has been met 6107; if the task is not performed successfully 6106, the threshold has not been met 6108. The binary result is then treated as it would have been treated in the context of the game had it been attained through the use of a random number 6109.

If a graded result is needed 6101, a ratio is established between the game-specific quantity that would usually be generated by random number (ability points, hit points, gold pieces, etc.) and potential performance grades 6113. A task is selected 6114, and the player performs the task 6115.

Performance is graded 6116, and the resulting performance grade is converted 6117 to the game-specific quantity according to the established game-quantity-to-performance-grade ratio. The graded result is then treated as it would have been treated in the context of the game had it been attained through the use of a random number 6109.

Figure 62:
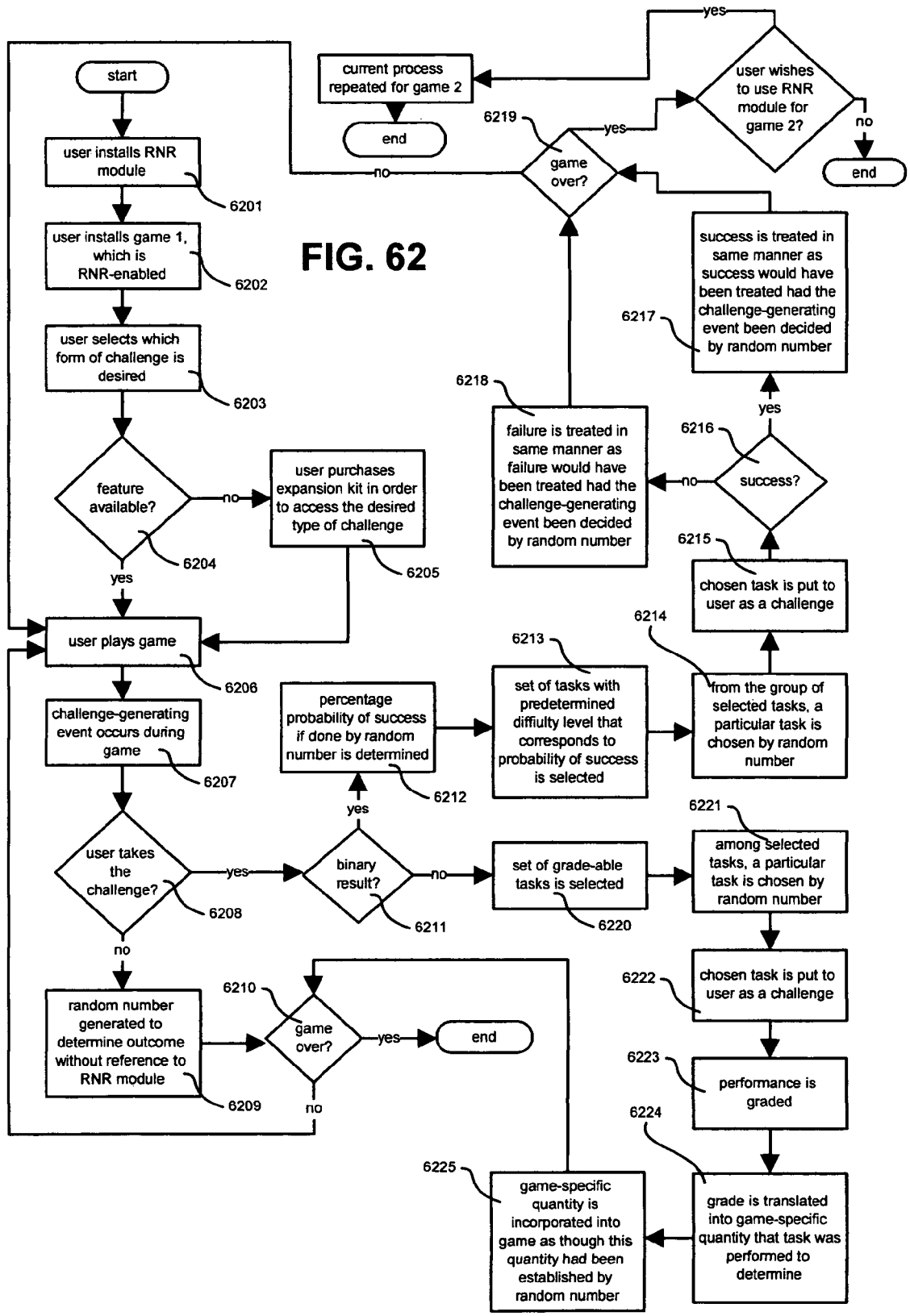
FIG. 62 is a flowchart depicting a method whereby a random number replacement plug-in software module is used in connection with a computer game according to the present invention.

FIG. 62 depicts a disclosed method whereby both situations are fully addressed by the present invention in the context of a computer game so that a binary result or a graded result can be produced through a user-performed task. First, a user installs a plug-in software RNR module 6201 and installs software for a first RNR-enabled computer game 6202. The user then, in the computer game software, indicates circumstances in which random number replacement is to be used and the types of challenge the user would like to face 6203. Provided that the types of challenges the user has selected are available 6204 using the given RNR module, the user then plays the game 6206. If the user has selected a type of challenges that is not available under the given RNR module 6204, e.g., the user has specified "English vocabulary questions" as his or her preferred type of challenge but does not own the English vocabulary module, he or she must purchase an expansion kit that would enable the preferred question type to be the type of challenge faced by the user 6205.

The types of modules are endless: English vocabulary; other language vocabulary; math; science; music; standardized test preparation (SAT, ACT, LSAT, GRE, MPRE, Bar Review, GMAT, MCAT, etc.) and many others.

Figure 72:
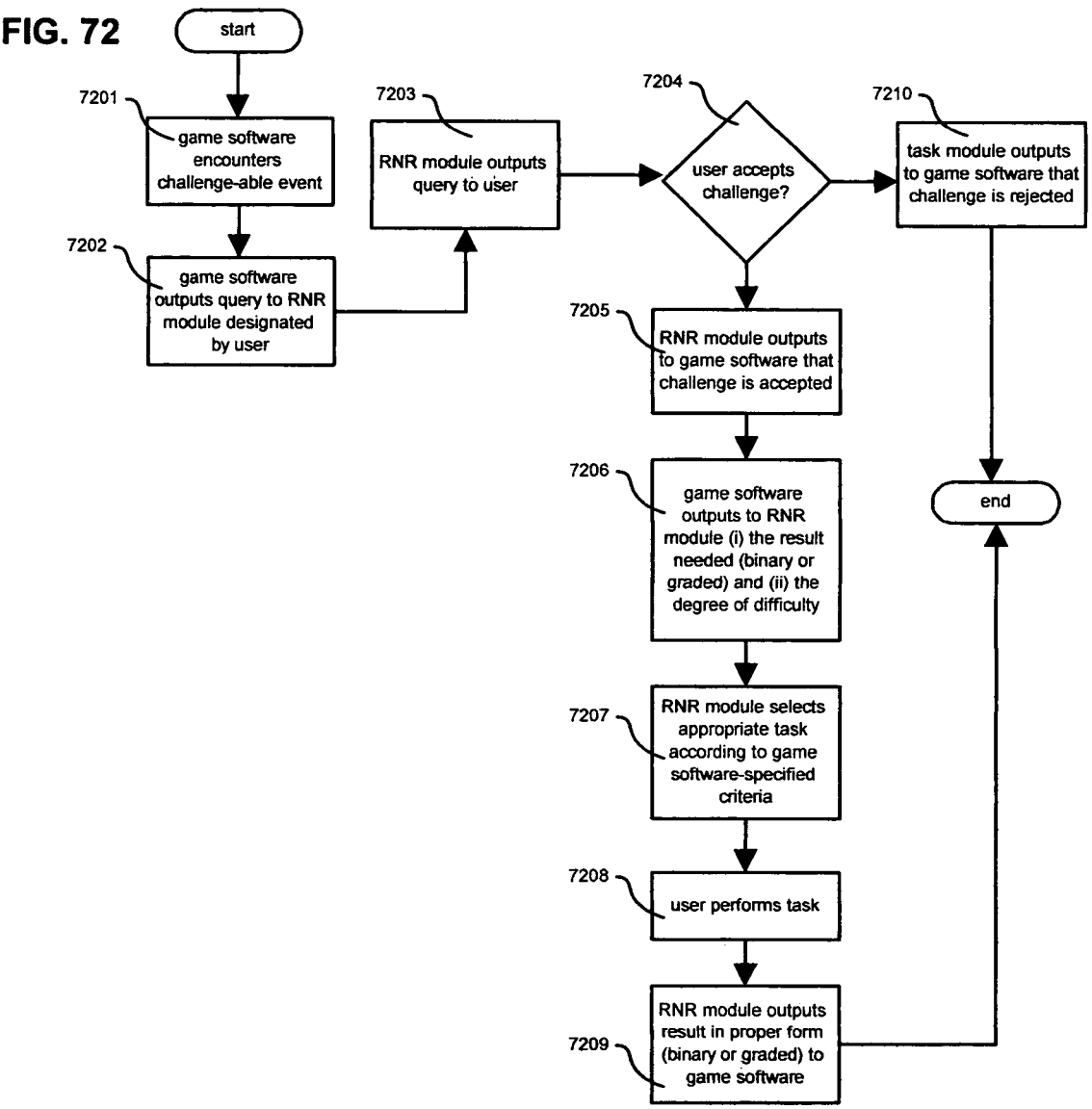
FIG. 72 is a flowchart depicting a method whereby game software communicates with random number replacement software according to the present invention.
Figure 73:
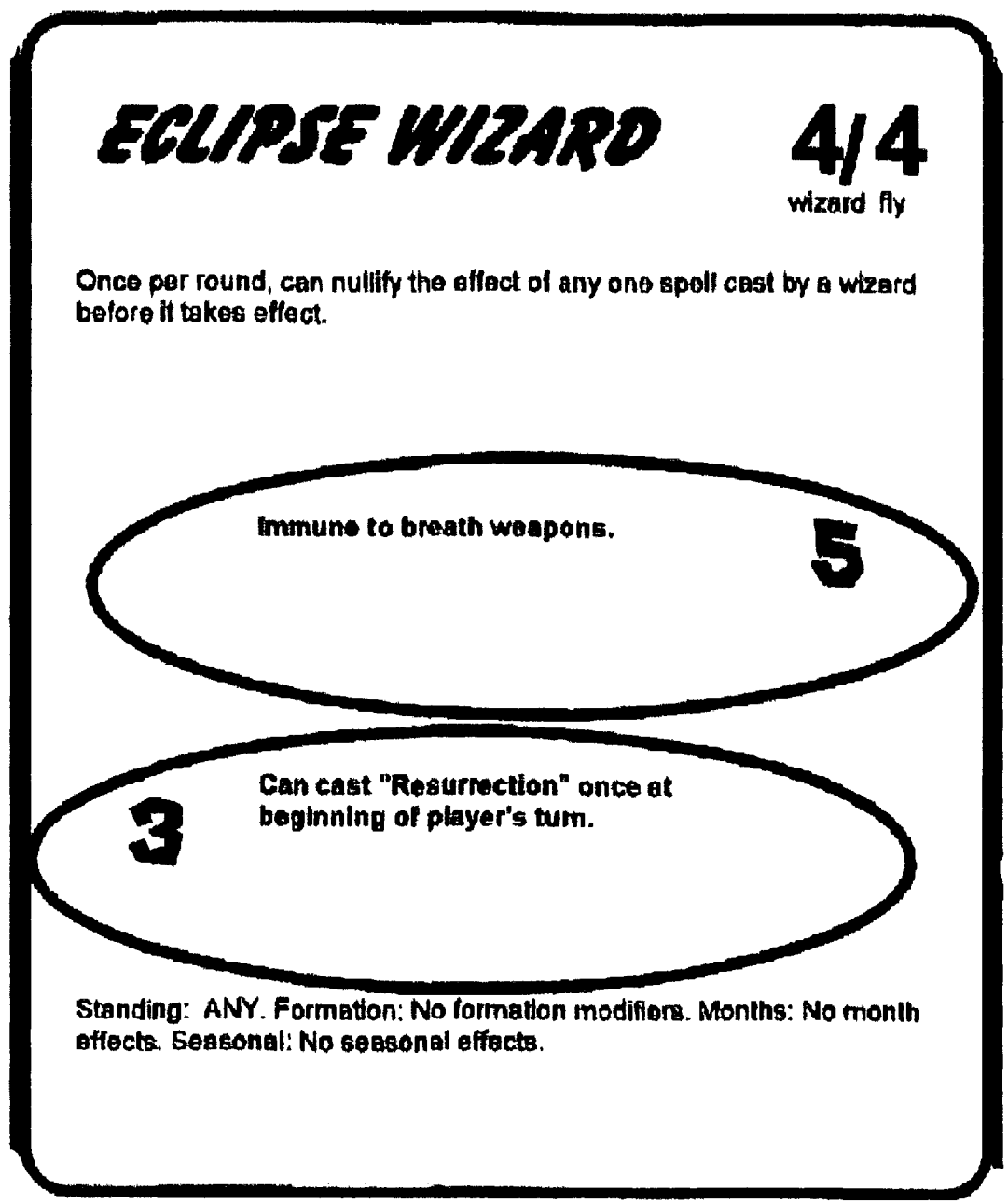
FIGS. 73 through 83 depict example cards for use in the card game system.
Figure 74:
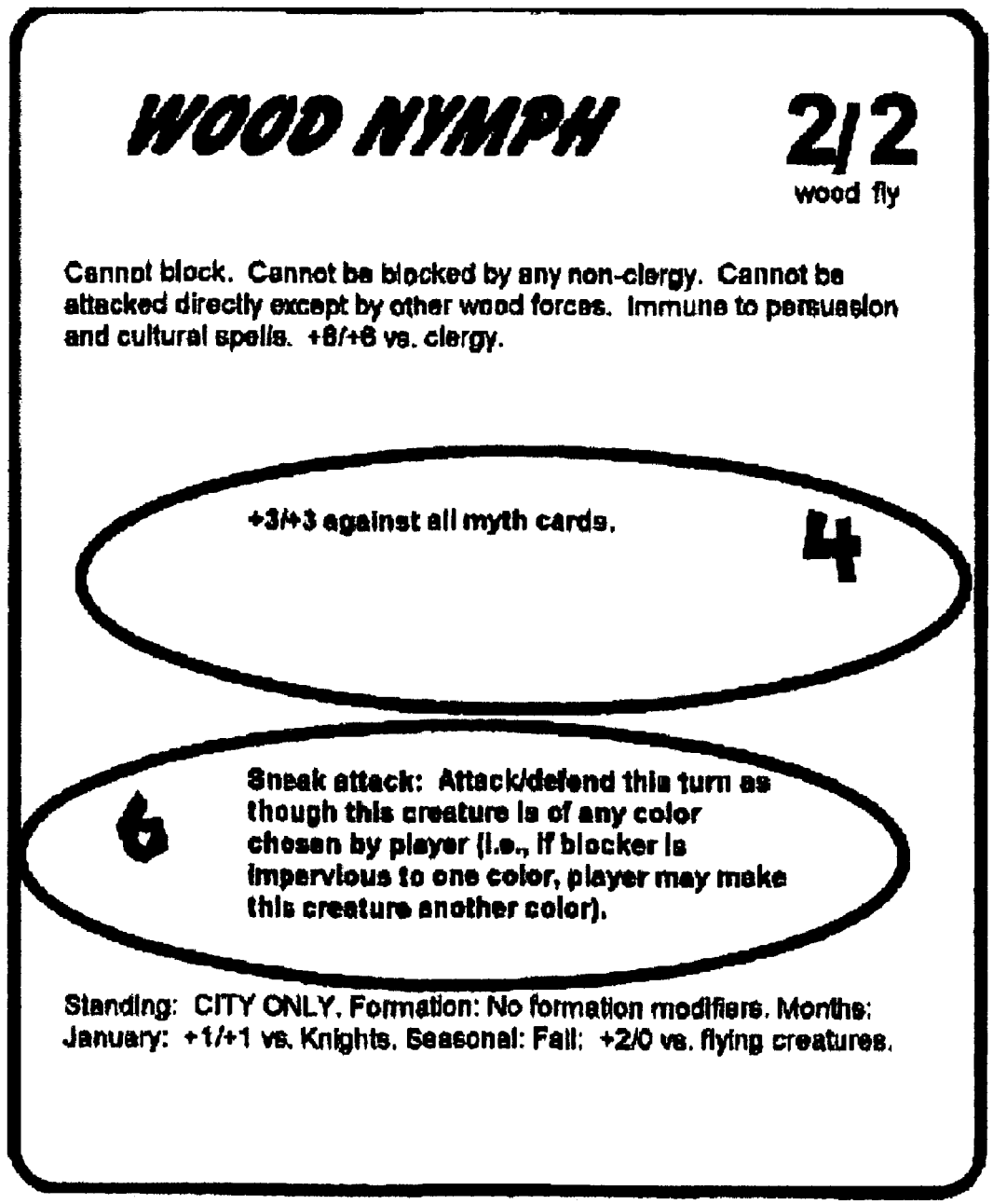
Figure 75:
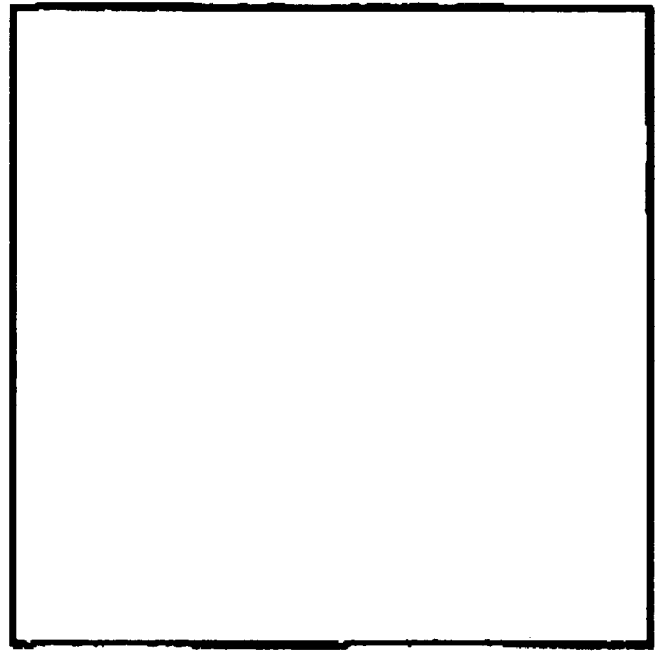
Figure 76:
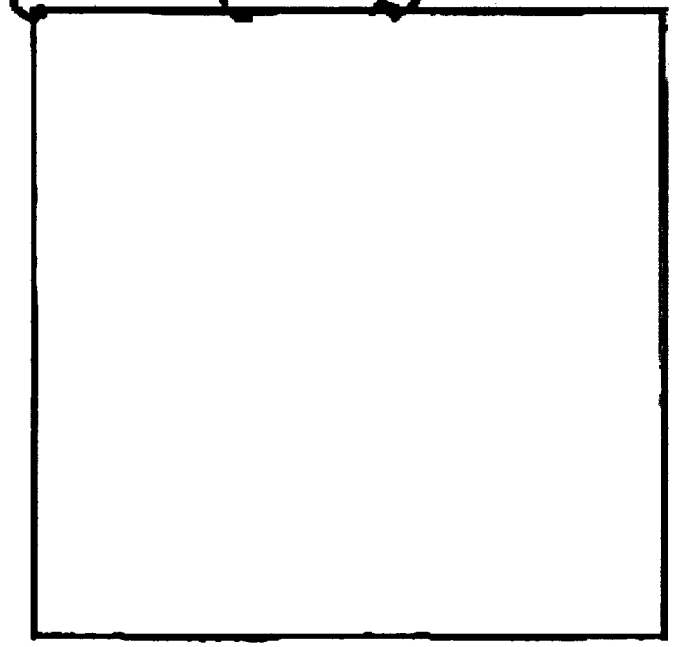
Figure 77:
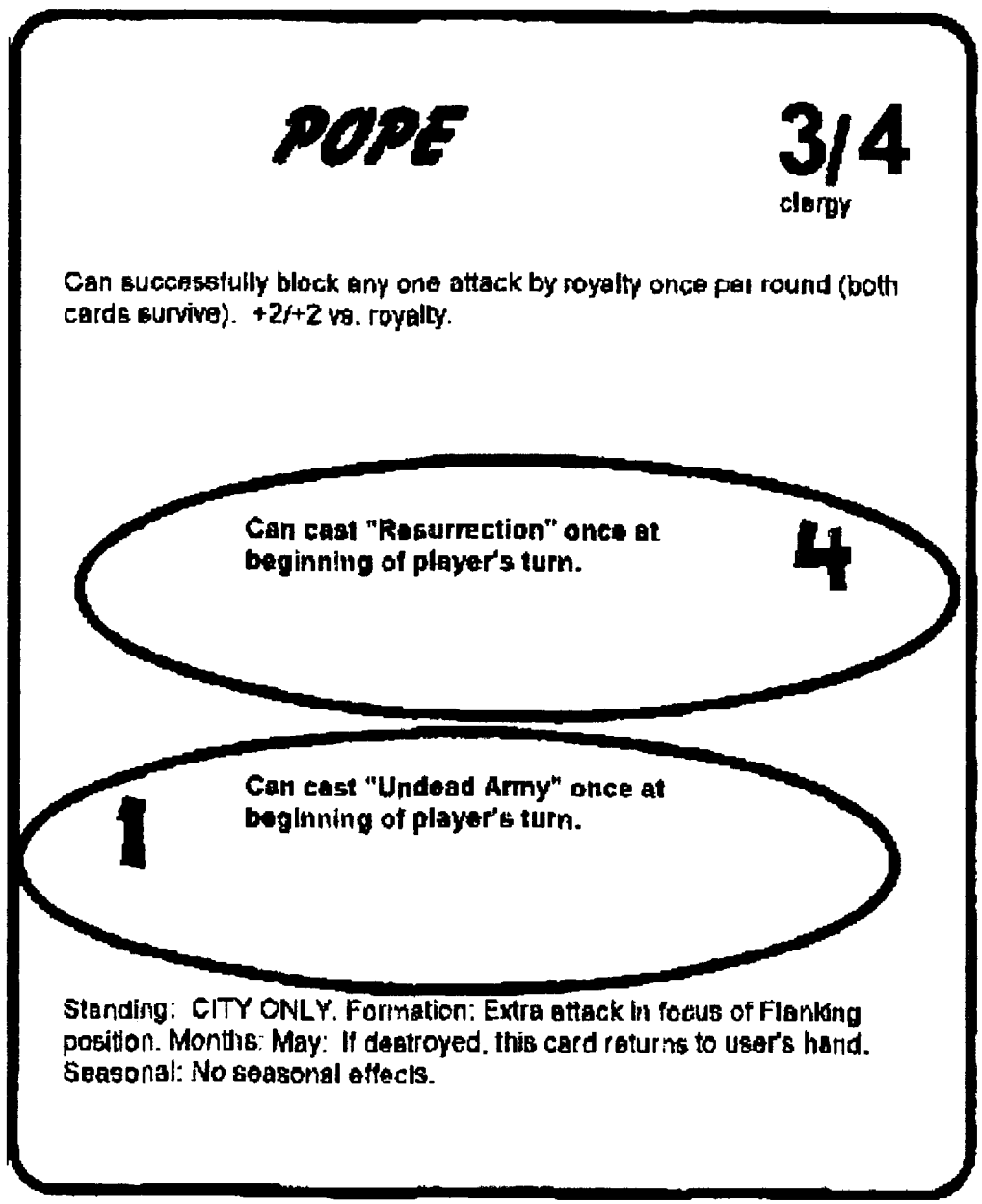
Figure 78:
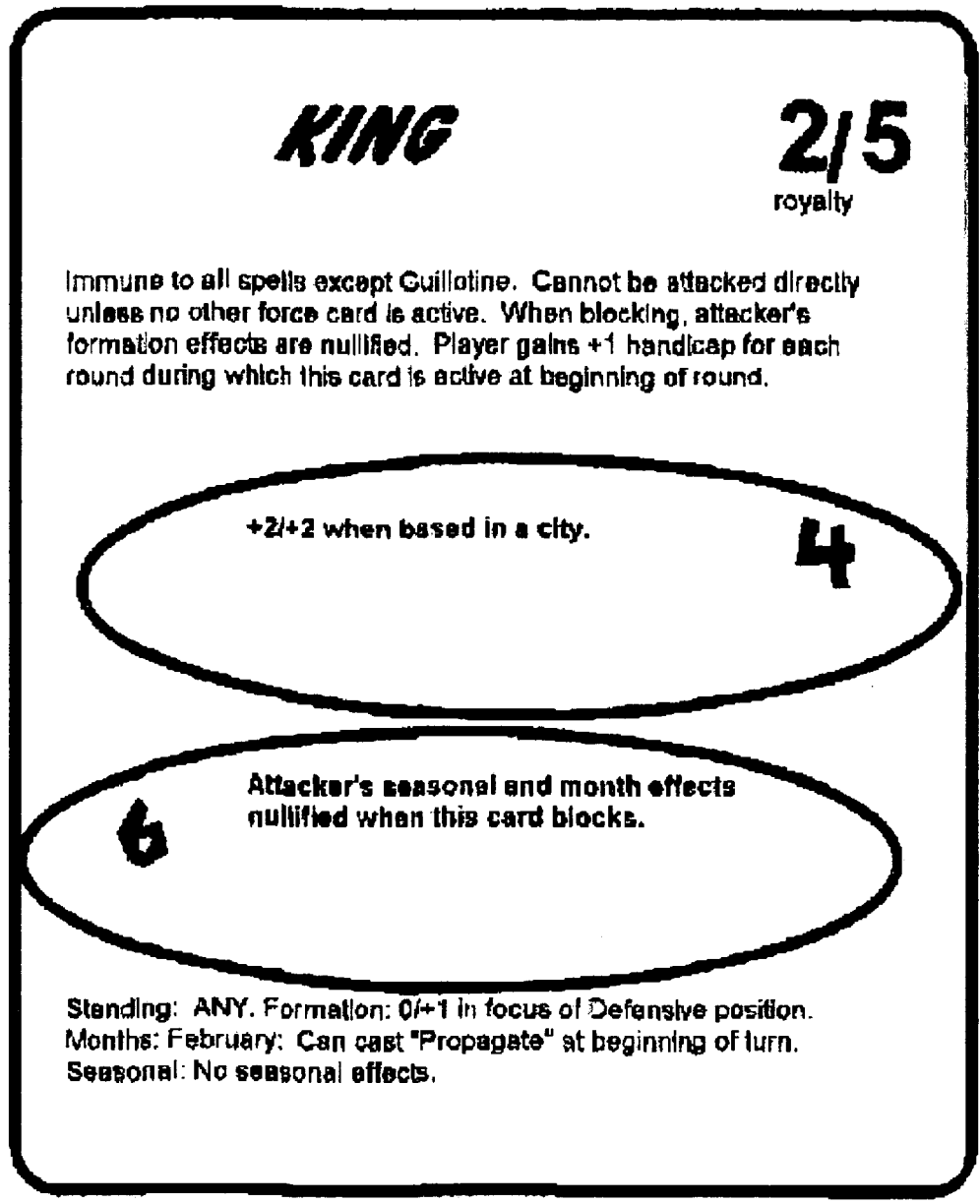
Figure 79:
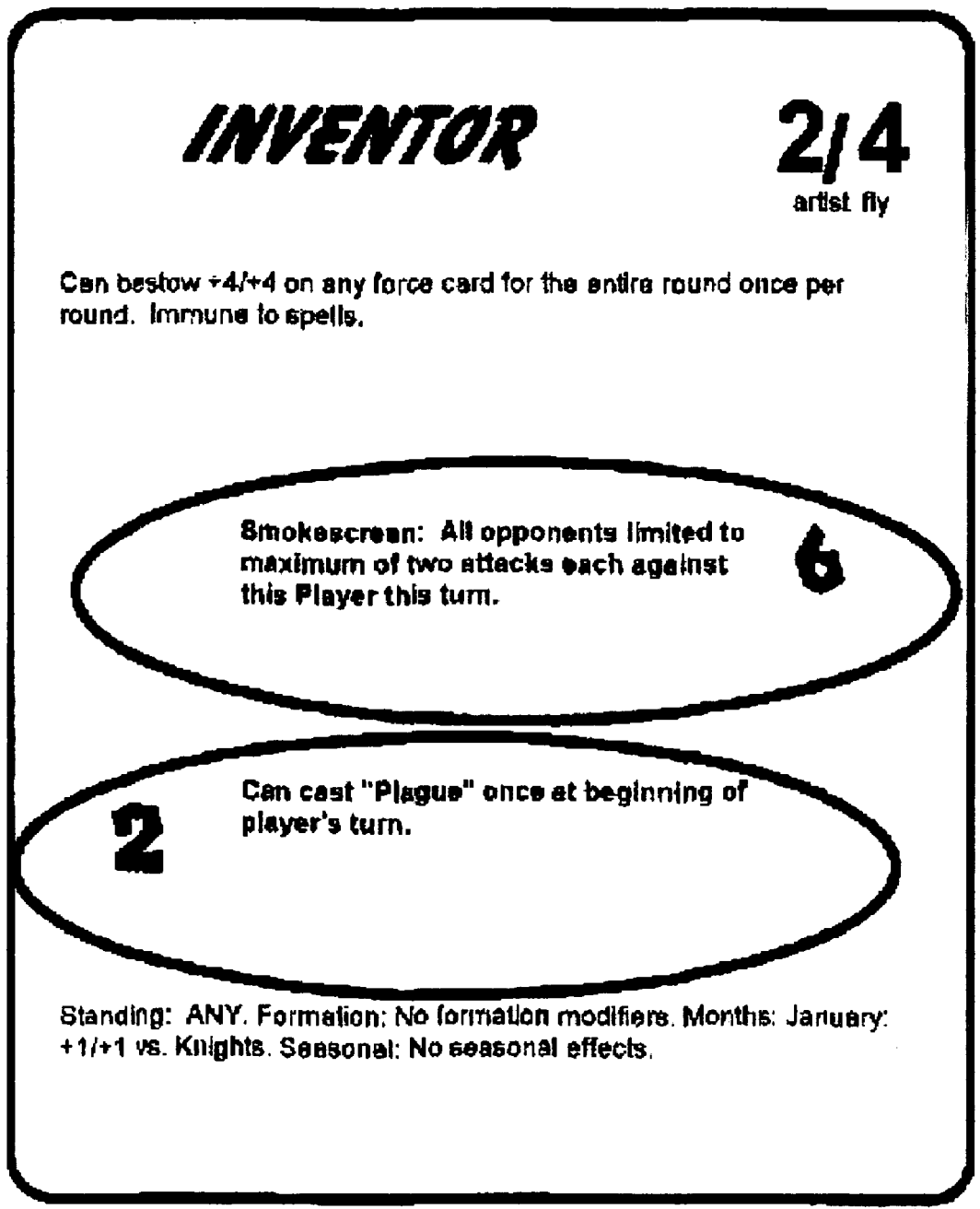
Figure 80:
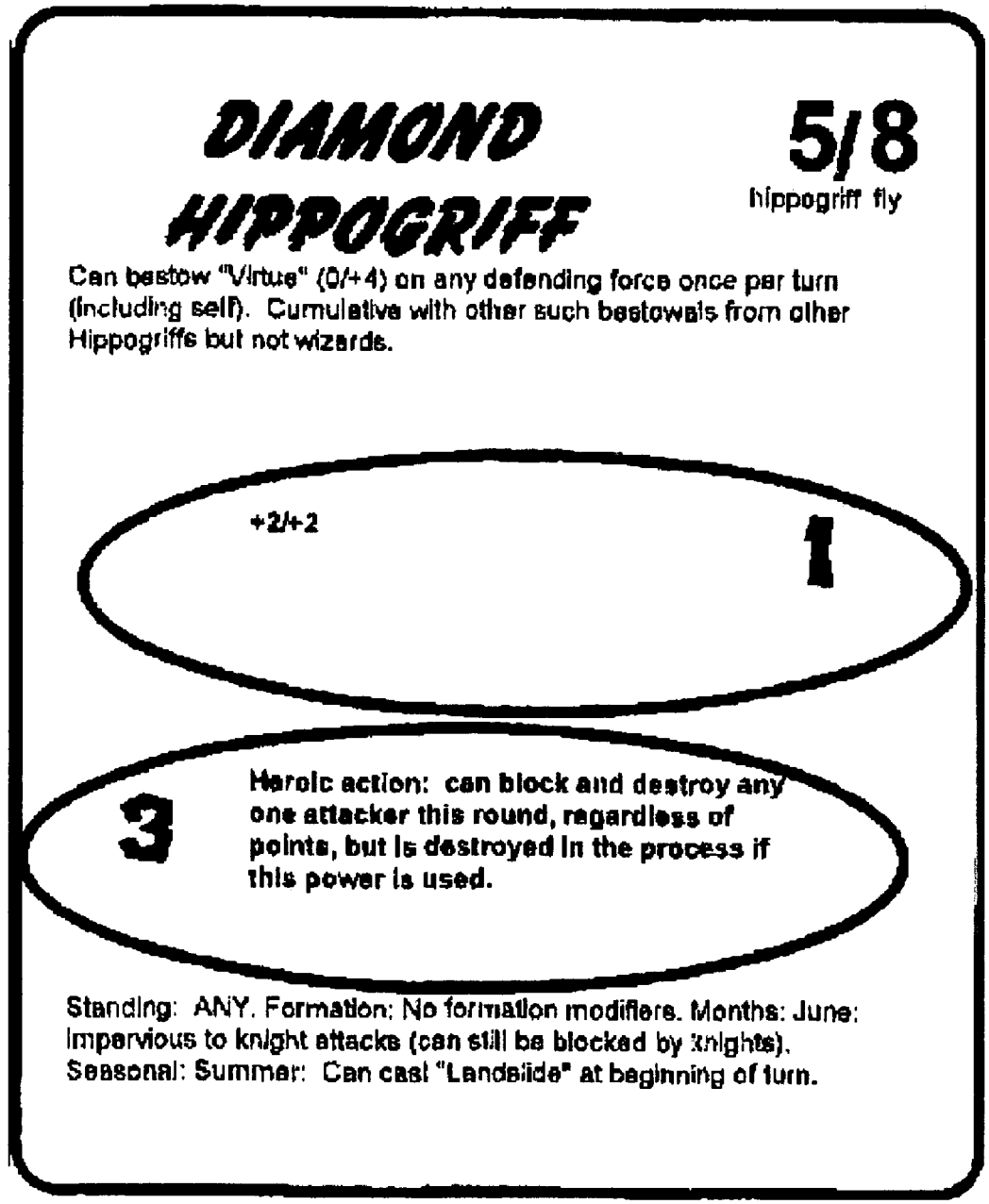
Figure 81:
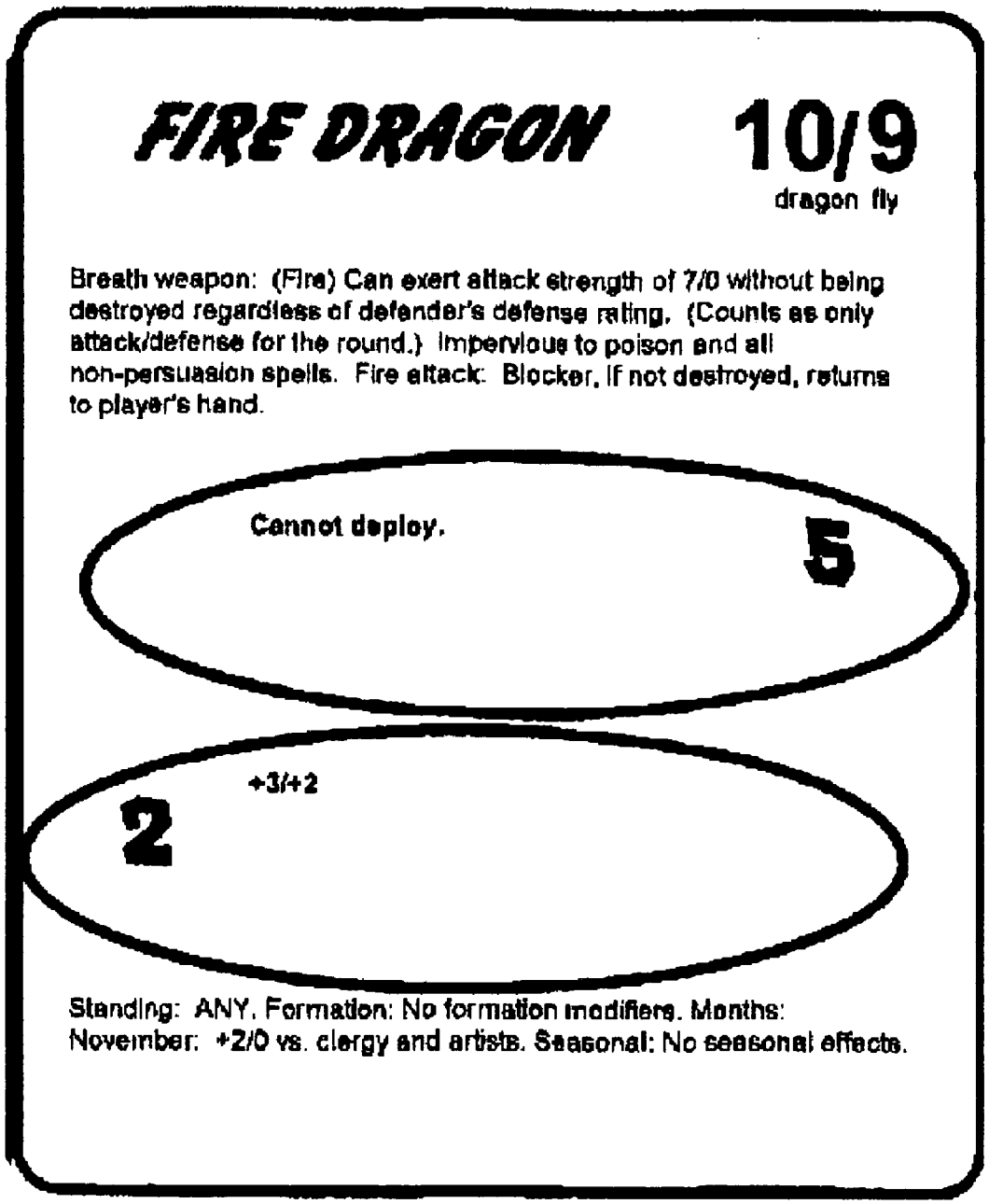
Figure 82:
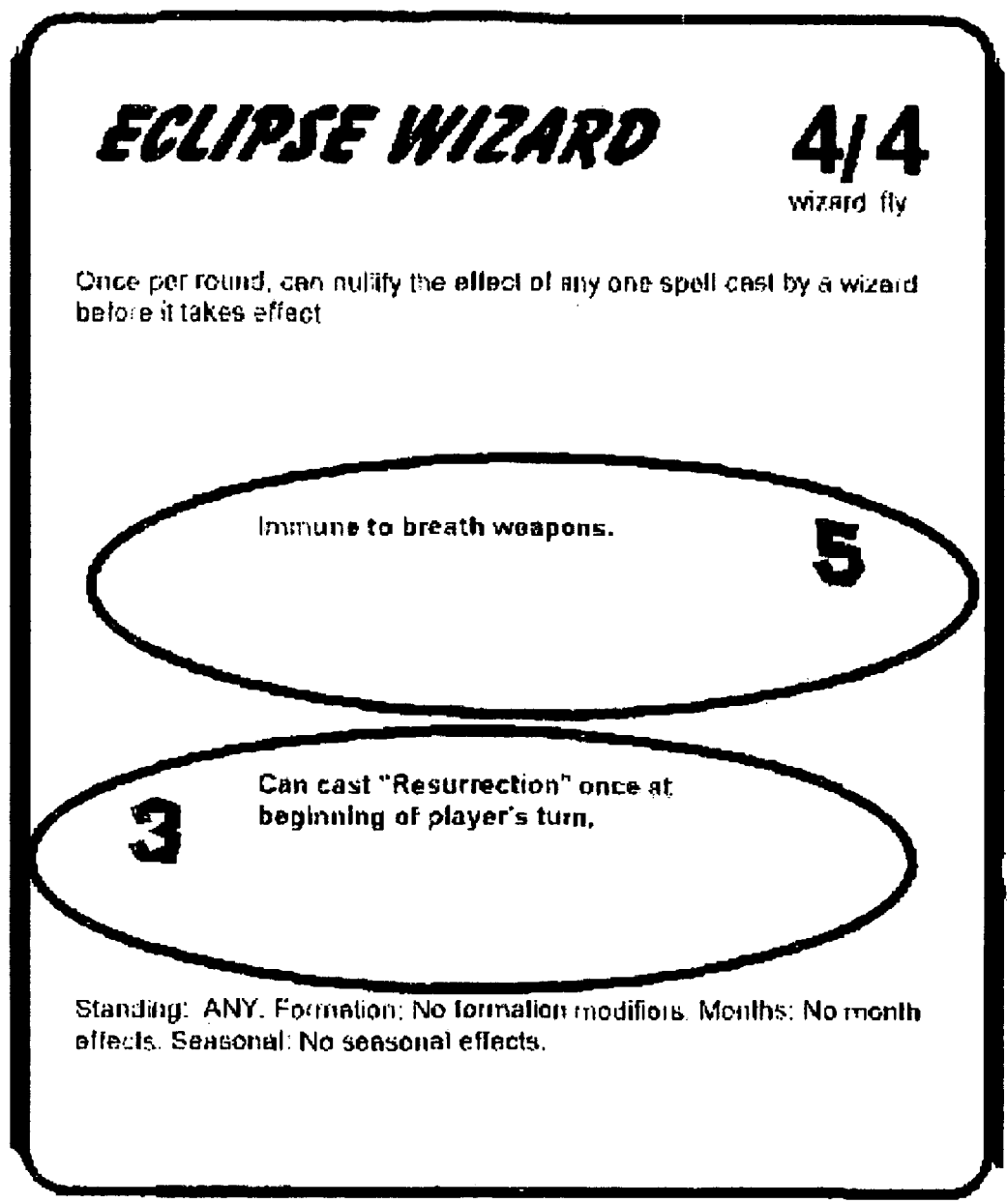
Figure 83:
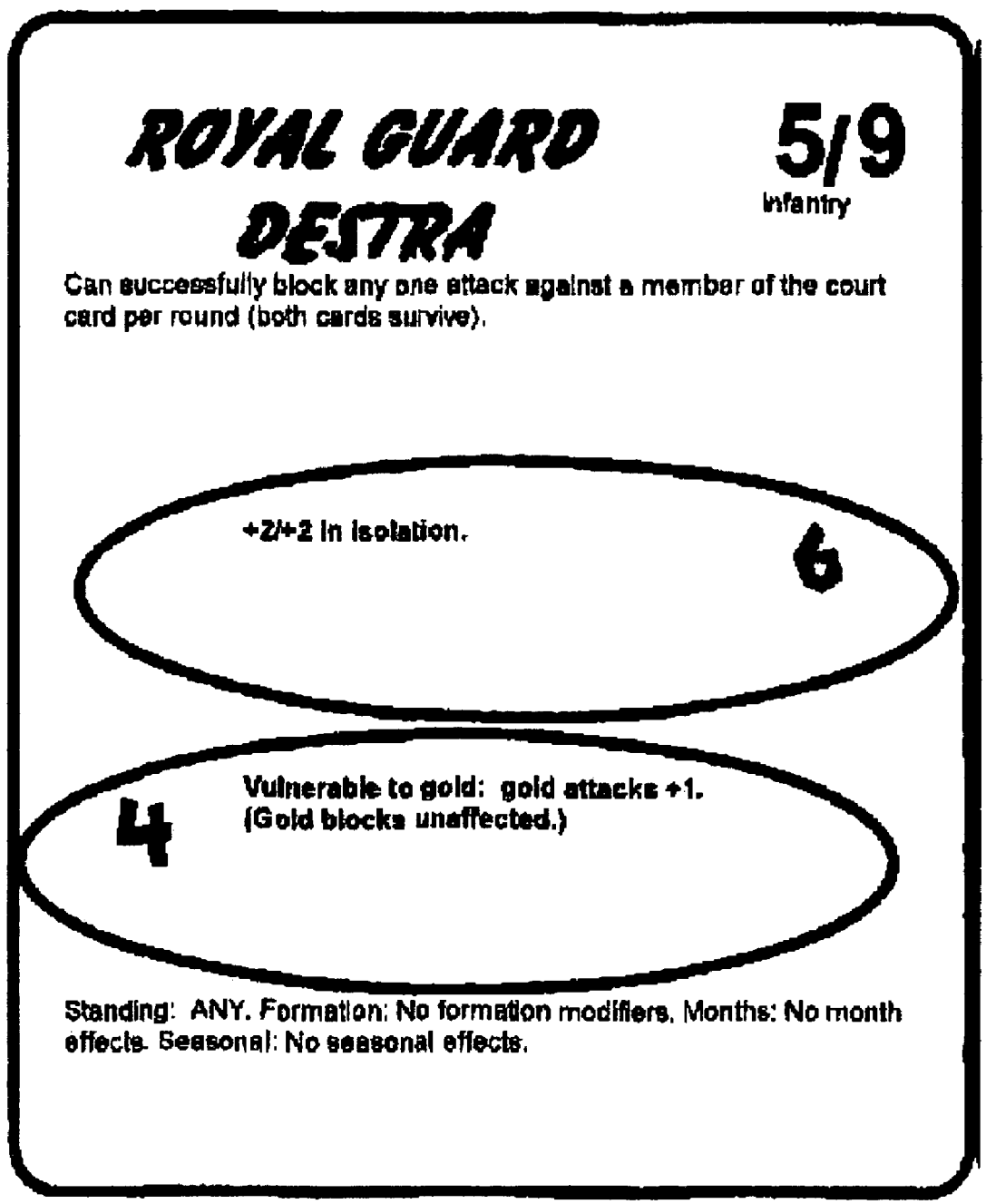

When a challenge-generating event occurs 6207 during the game, i.e., an event that would typically be resolved through the use of a random number and has been specified by the user as the kind of event that the user would prefer to resolve through the use of the RNR module, the computer software communicates with the RNR module per the process depicted in FIG. 72 so as to challenge the user to a user-performed task. If the user accepts the challenge 6208, a determination is made regarding whether a binary result or a graded result is needed 6211. If the user declines the challenge 6208, a random number is generated as usual to determine the outcome without reference to the RNR module 6209.

If a binary result is needed, the probability of success were the event resolved by random number is calculated 6212 and a set of tasks of a difficulty level that is appropriate to the determined likelihood of success is selected 6213. From the group of selected tasks (e.g., individual vocabulary questions), a particular task (e.g., a particular vocabulary question) is chosen by random number generated by the RNR module software 6214. The user then performs the task 6215. If it is successfully performed 6216, this result is communicated to the game software per the process depicted in FIG. 72, and it is treated in the context of the game just as success would have been treated if the success had been generated by random number 6217. Failure is communicated similarly and treated as failure would have been treated had it been the result of a random number 6218.

If a graded result is needed 6211, a set of grade-able tasks is selected 6220 in the RNR module software and a particular task is chosen from among this set by random number 6221.

The user then performs the task 6222, and his or her performance is graded 6223. The resulting grade is then translated into the game-specific quantity which the challenge was undertaken to establish 6224. The resulting game-specific quantity is then communicated per FIG. 72 and then incorporated into the game as though this quantity had been established by random number within the game software 6225.

FIG. 63A is an example of the kinds of events that would conventionally be resolved through reference to a computer-generated random number in an example, pre-existing computer game ("Civilization" in the depicted example) but which instead can be resolved by user challenge through the use of the RNR method of the present invention. Example game-specific events giving rise to both a binary challenge and a graded challenge and the results of these types of challenges are depicted.

FIG. 63B is an example of the kinds of events that would conventionally be resolved through a dice roll in an example, pre-existing role-playing game ("Dungeons and Dragons" in the depicted example) but which instead can be resolved through the dice replacement method of the present invention. Example game-specific events giving rise to both a binary challenge and a graded challenge and the results of these types of challenges are depicted.

FIG. 64A depicts example tasks for producing a binary result and a graded result according to the present invention, which tasks are drawn from pre-existing games like popular games such as "Trivial Pursuit" and "Taboo."

FIG. 64B depicts example tasks for producing a binary result and a graded result according to the present invention, which tasks are targeted toward developing particular academic, educational, or test taking skills like the skills needed for the LSAT or GRE.

A method of using a pre-existing game "Pictionary" to produce a binary result according to the present invention for dice replacement in a d20-based role-playing game is depicted in FIG. 65A. FIG. 65B is a chart depicting relationships between dice roll thresholds and corresponding seconds allowed to perform successfully a task under the method depicted in FIG. 65A.

FIG. 66 depicts a method for producing a graded result according to the present invention through the use of the pre-existing game "Taboo."

Alternately (not depicted), the spell-casting function described above can also be used as a dice replacement task. In this case, a user attempts to match a pattern of movement and way of saying the spell phrase as accurately as possible. The closer his performance is to the standard, the higher his score, again on a scale of 1 to 20. The same can also be achieved by using a sensor-equipped "sword" which measures velocity and position and compares a stroke taken by the player to an ideal stroke, rating it, and outputting a score.

Figure 67:
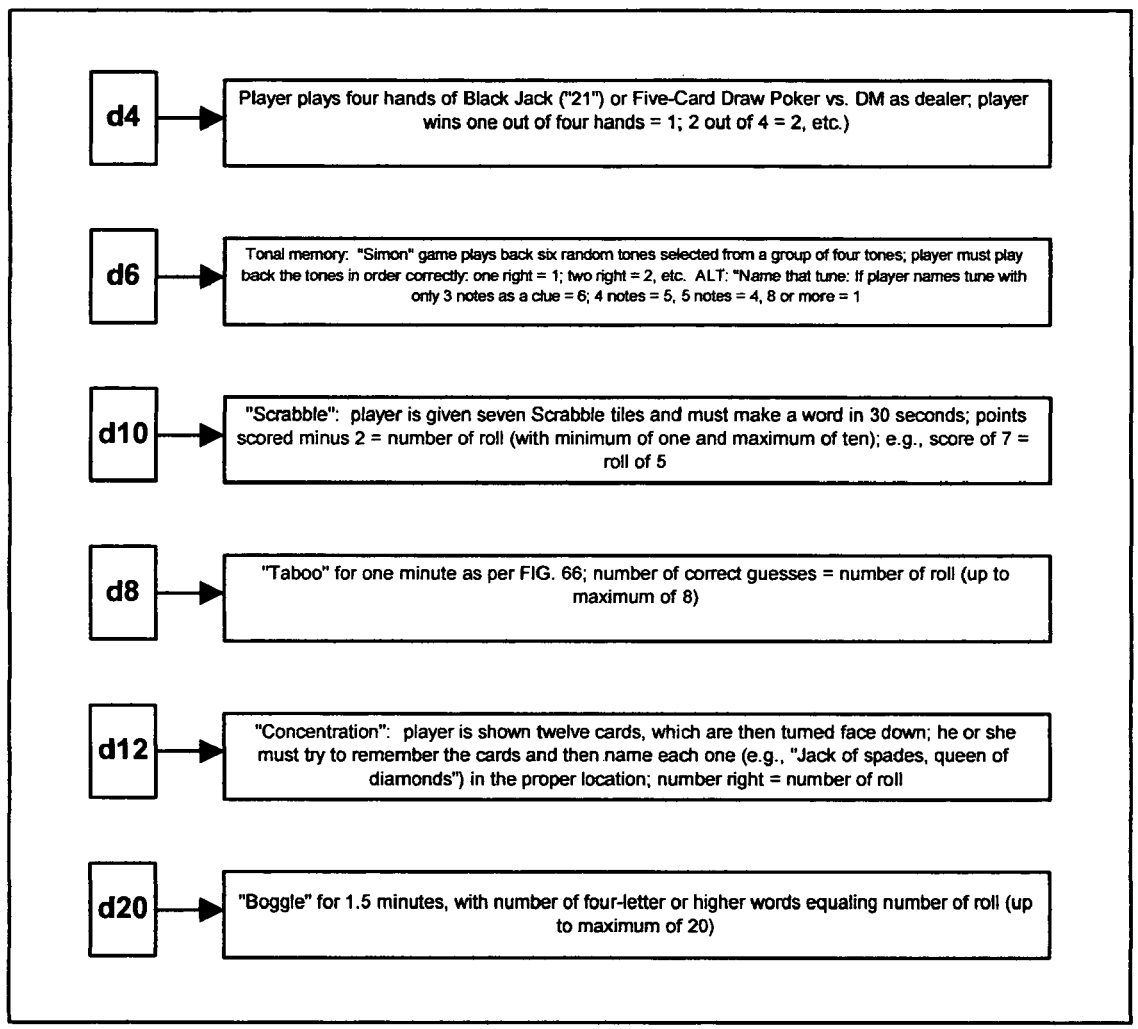
FIG. 67 is an example "kit" of methods for replacing all dice in a typical d20 gaming situation with tasks according to the present invention.

FIG. 67 depicts an entire suite of related methods whereby all the dice conventionally used in a d20-based role-playing game are replaced using pre-existing games.

Figure 68A:
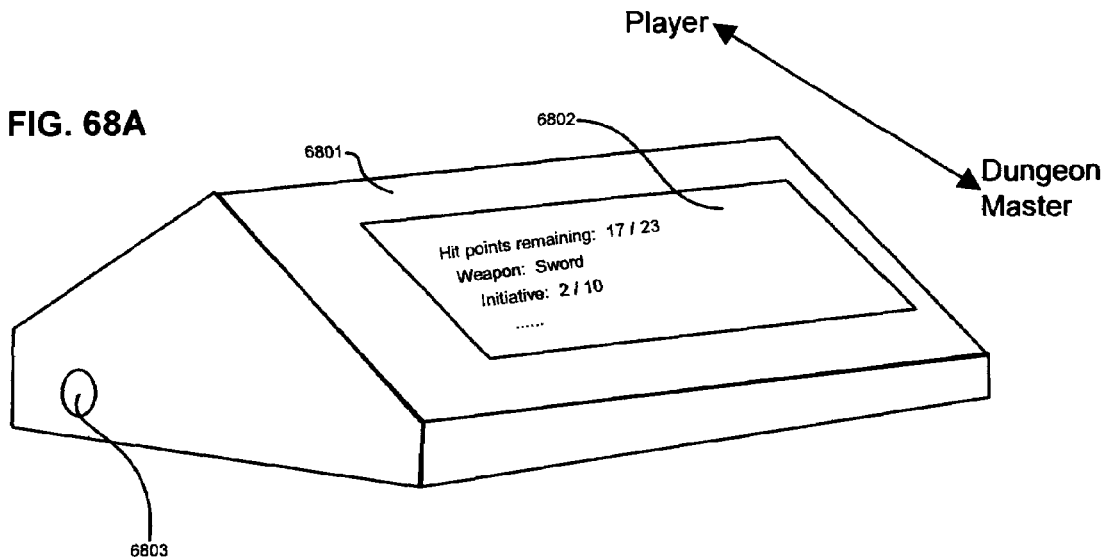
FIGS. 68A and 68B depict a dedicated dual monitor according to the present invention.
Figure 68B:
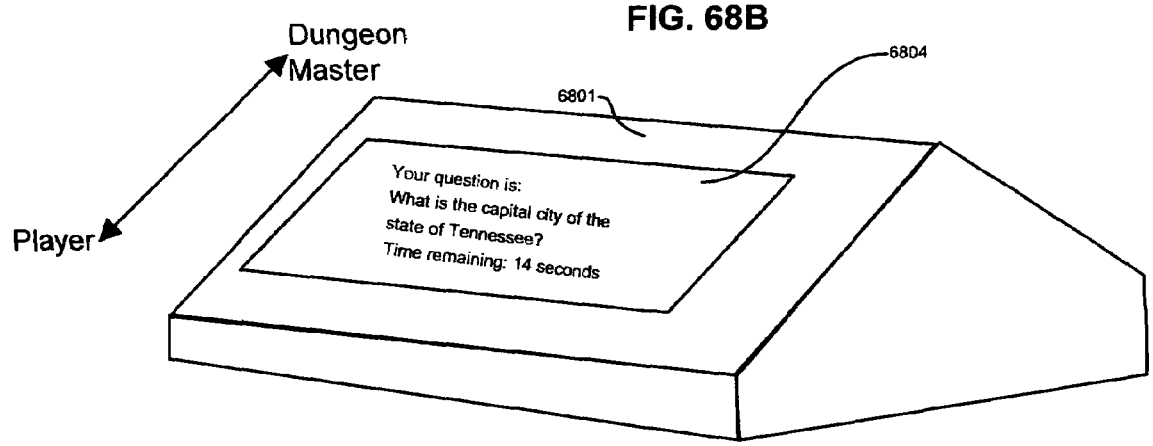

FIGS. 68A and 68B depict a dedicated dual monitor with enclosed computer processor for use in a live role-playing game setting. One display 6802 faces the dungeon master; the other display 6804 simultaneously faces the player. This dual monitor, preferably with touch screen displays, can be used to facilitate dice replacement as well as keeping track of all variables which dungeon masters and players must typically track. The display, for instance, can include output of the player character's current initiative roll, hit point level, weapon selection, etc., to be viewed by the dungeon master at a glance. All of these variables can be input and then updated on-the-fly by the player using a plug-in keyboard, point-and-click device, and Web browser interface, for instance.

Figure 69A:
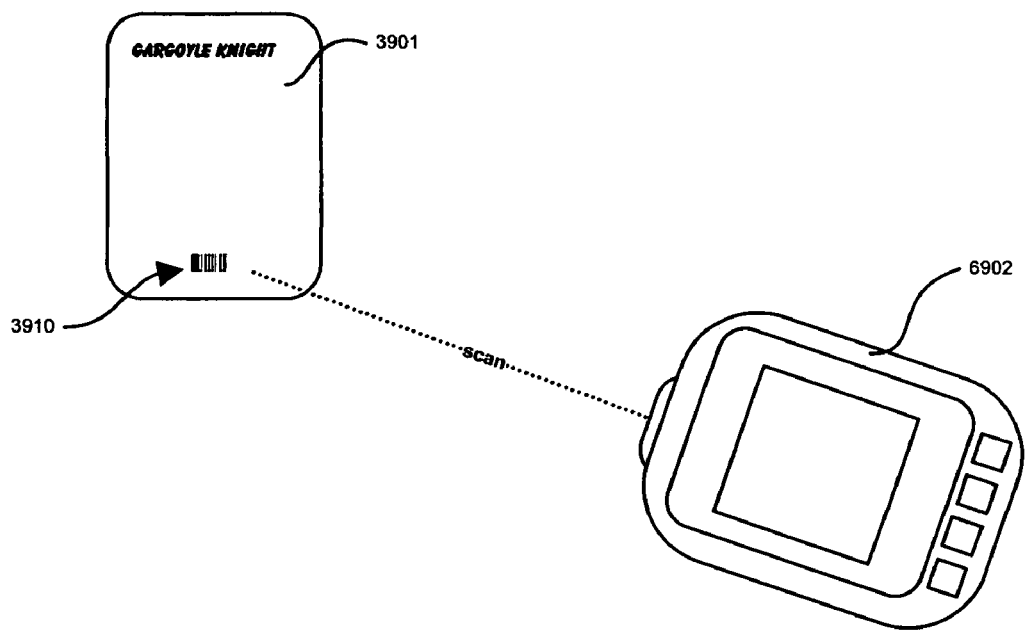
FIG. 69A depicts a scanner scanning a barcode on a card according to the present invention.
Figure 69B:
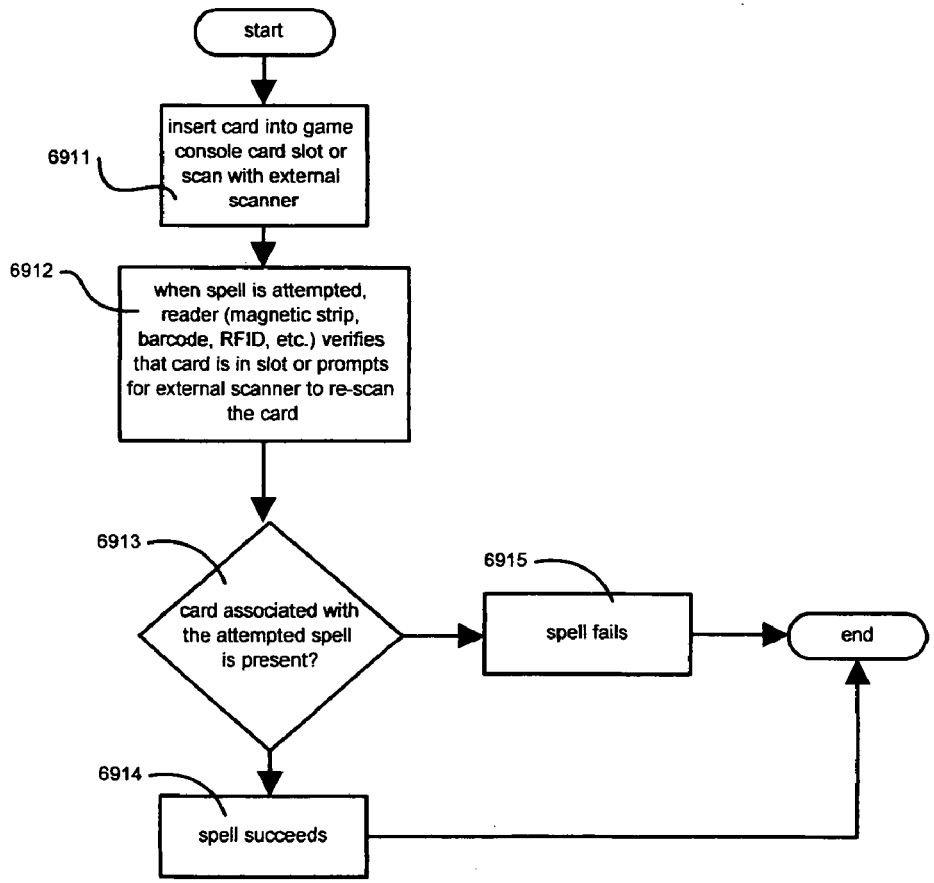
FIG. 69B is a flowchart depicting a method whereby a card is used in conjunction with a spell-casting computer system according to the present invention.
Figure 70:
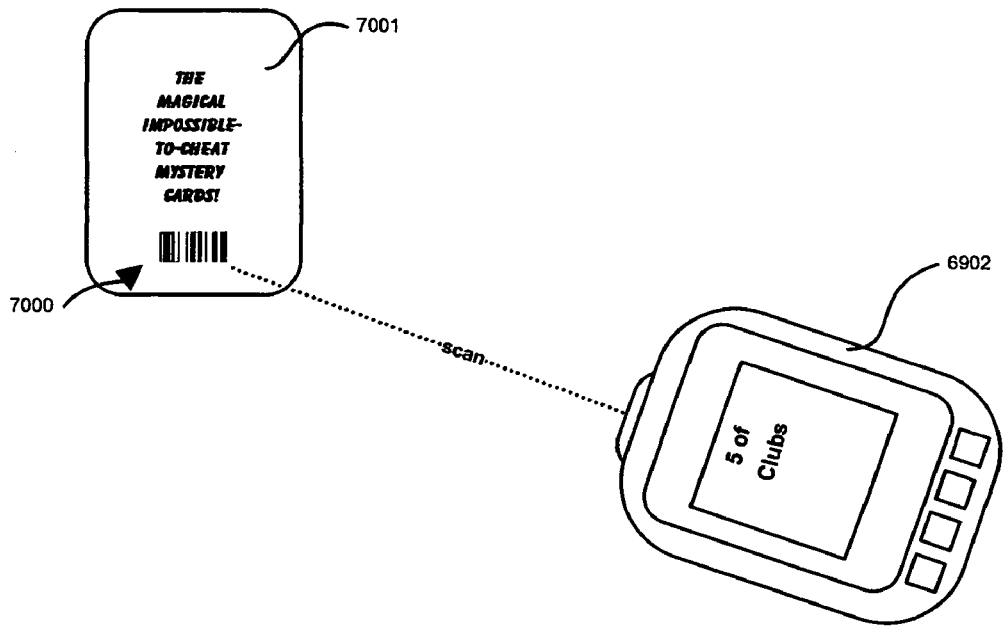
FIG. 70 is an anterior view of a scanner scanning a barcode on a "cheat-proof" card according to the present invention.

This dual monitor 6801 can also be used with an external scanner 6902 in FIG. 69A connected by way of a data exchange port 6803 to scan a barcode 3910 appearing on a card 3901 according to the present invention as per the process depicted in FIG. 69B so that a spell can only be cast according to the present invention when a card 3901 is present. In this way, the market for physical collectible cards is enhanced because of their functional value in the context of electronically enhanced role-playing games, computer games, or other electronic games. Instead of a barcode, other auto ID technology can be incorporated into the card and read, e.g., magnetic strip, RFID tag (not pictured), for this purpose.

The present invention also enables production of novel "cheat-proof" cards. Specifically, a scanner 6902 is used in conjunction with a card 700i upon which appears a barcode 7000 but no other indicia of the face value or other information of the card 7001. In this way, a user can look visually at another person's hand of cards and still be unable to tell what is in that person's hand. Meanwhile, a user uses the scanner 6902 on his own cards to tell their value. Thus, a game can be played in which users only reveal the value of their cards, e.g., their poker hand, at the end of the game through the use of a scanner. Such cheat-proof cards can be cards used for playing a game described herein or cards from a conventional deck of cards.

Although the description above contains many specificities, these should not be construed as limiting the scope of the invention but as merely providing illustrations of some of the presently preferred embodiments of this invention. Accordingly, the scope of the invention should be determined by the appended claims and their legal equivalents, rather than by the examples given. For instance, as is plain to one skilled in the art, it will be understood that features of one embodiment may be combined with features of other embodiments while other features may be omitted or replaced as being nonessential to the practice of the invention, regardless of whether such combination, omission or modification has been explicitly described.

Licensing information is available through http://www.inventerprise.com.

What is claimed is:

1. A game method, said game method comprising at comprising the following steps:

receiving a first verbal input into a first computer system;

receiving a first gesture input into said first computer system;

comparing said first verbal input to a first pattern;

comparing said first gesture input to a second pattern;

comparing said first verbal input and said first gesture input, taken together, to a third pattern;

triggering a first game event; and outputting through an audio or video device that said first game event has been triggered; wherein said first verbal input matches said first pattern according to an outcome of said step of comparing said first verbal input to said first pattern;

said first gesture input matches said second pattern according to an outcome of said step of comparing said first gesture input to said second pattern; and said first verbal input and said first gesture input, taken together, match said third pattern according to an outcome of said step of comparing said first verbal input and said first gesture input, taken together, to said third pattern.

2. The method in claim 1 additionally comprising at least one of the following steps: determining whether said first game event is available to a first character; and determining whether said first game event is available under game rules, wherein: said step of triggering said first game event is performed only when said first game event is available to said first character according to an outcome of said step of determining whether said first game event is available to said first character or said first game event is available under game rules according to an outcome of said step of determining whether said first game event is available under game rules.

3. The method in claim 1 wherein said first pattern is or comprises a first sound and said second pattern is or comprises a first position, motion, gesture, sequence or orientation.

4. The method in claim 1 wherein said first game event is the casting of a first magic spell, said first magic spell comprising at least one game effect.

5. The method in claim 4 wherein said first magic spell is in a first spellbook of a first character, said first spellbook comprising a plurality of magic spells available to said first character.

6. The method in claim 1 additionally comprising the following steps:
receiving log-in information from a first user; and
determining whether a first character is associated with said first user.

7. The method in claim 1 wherein said first gesture input is received through a first gesture interface device, said first gesture interface device being selected from the group consisting of a wand, a bottle, a cauldron, a utensil, a broomstick, a crystal ball, a hand gesture interface, and a voodoo doll.

8. The method in claim 1 wherein said first verbal input comprises a word or phrase in a first database record, said first database record being related to a second database record, said second database record comprising information pertaining to said first game event.

9. The method in claim 1 additionally comprising the following steps: scanning a first code; and
providing access to a first game function only after scanning said first code.

10. The method in claim 1 additionally comprising at least one of the following steps:
disregarding a second verbal input, said second verbal input being received after a first point in time; or
disregarding a second gesture input, said second gesture input being received after a second point in time.

11. The method in claim 1 additionally comprising the following step:
receiving a first game customization submission via a first computer network.

12. The method in claim 1 additionally comprising the following step:
receiving a first advertisement submission via a first computer network; and
including said first advertisement in a first game.

13. The method in claim 1 additionally comprising the following step:
paying a commission to a first user.

14. The method in claim 1 additionally comprising the following steps:
receiving an indication that a first user of a first game wishes to take at least one challenge to determine at least one variable in said first game;
providing a first challenge; and
triggering a second game event in said first game on the basis of an outcome of said first challenge.

15. The method in claim 14 additionally comprising the following step:
querying a first database via a first computer network, said first database comprising said first challenge; and
charging a first user.

16. The method in claim 14 wherein said first challenge is selected from the group consisting of
(i) an academic-related task, (ii) an education-related task, (iii) a standardized test-related task, and (iv) a task drawn from a second game, said second game being different from said first game.

17. The method in claim 1 wherein:
said first verbal input is received by way of a first microphone;
said first gesture input is received by way of a first sensor; and
said third pattern is a first integration pattern, said first integration pattern being or comprising a standard for a relationship between verbal input and gesture input.

18. A game method, said game method comprising the following steps:
providing a first device, said first device being configured to sense gesture information and being communicatively coupled to a first computer system;
providing a second device, said second device being configured to sense speech information;
receiving a first information combination, said first information combination comprising information received from said first device and from said second device;
comparing said first information combination to a first pattern in a first pattern database, said first pattern comprising a speech standard and a gesture standard, said first pattern database comprising a plurality of patterns, including said first pattern; and
outputting through an audio or video device first a result in a first game according to an outcome of said step of comparing said first information combination to said first pattern in said first pattern database.

19. A game method, said game method comprising the following steps:
receiving a first verbal stimulus into a data processing system;
receiving a first physical stimulus into said data processing system; and
outputting by way of a first audio or video device a first game result when (i) said first verbal stimulus matches a first pattern, (ii) said first physical stimulus matches a second pattern, and (iii) a first relationship matches a third pattern, said first relationship being between said first verbal stimulus and said first physical stimulus.

20. The method in claim 19 wherein
said first pattern is or comprises a standard for at least a first word or phrase;
said second pattern is or comprises a standard for at least a first gesture; and
said third pattern is or comprises a standard for a first temporal relationship between stimuli; and wherein said method additionally comprises the following step:
applying a first time criterion, said step of applying said first time criterion comprising a step of treating stimuli received after a first time differently from stimuli received before said first time, said first time pertaining to at least one of said first pattern, said second pattern and said third pattern.

* * * * *

UNITED STATES PATENT AND TRADEMARK OFFICE
CERTIFICATE OF CORRECTION

PATENT NO. : 7,704,135 B2 Page 1 of 1
APPLICATION NO. : 11/209489
DATED : April 27, 2010
INVENTOR(S) : Shelton E. Harrison, Jr.

It is certified that error appears in the above-identified patent and that said Letters Patent is hereby corrected as shown below:

Col. 28, line 34, delete "comprising at".

Col. 30, line 24, delete "from" and insert -- by way of --.

Col. 30, line 24, delete "from".

Col. 30, line 30, delete "first a" and insert -- a first --.

Signed and Sealed this

Fifteenth Day of June, 2010

David J. Kappos
*Director of the United States Patent and Trademark Office*